US008879873B2

(12) United States Patent
Goh et al.

(10) Patent No.: US 8,879,873 B2
(45) Date of Patent: Nov. 4, 2014

(54) OPTICAL MODULATOR

(75) Inventors: Takashi Goh, Atsugi (JP); Hiroshi Yamazaki, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/000,557

(22) PCT Filed: Feb. 24, 2012

(86) PCT No.: PCT/JP2012/001311
§ 371 (c)(1),
(2), (4) Date: Aug. 20, 2013

(87) PCT Pub. No.: WO2012/114777
PCT Pub. Date: Aug. 30, 2012

(65) Prior Publication Data
US 2013/0322809 A1 Dec. 5, 2013

(30) Foreign Application Priority Data

Feb. 25, 2011 (JP) ................................ 2011-040978

(51) Int. Cl.
*G02F 1/035* (2006.01)
*G02F 1/01* (2006.01)
*H04B 10/516* (2013.01)
*H04B 10/50* (2013.01)

(52) U.S. Cl.
CPC .......... *G02F 1/0115* (2013.01); *H04B 10/5161* (2013.01); *H04B 10/5053* (2013.01)
USPC ............................................. 385/3; 398/188

(58) Field of Classification Search
USPC ............................................. 385/3; 398/188
See application file for complete search history.

(56) References Cited

U.S. PATENT DOCUMENTS 6,650,458 B1 * 11/2003 Prosyk et al. ................. 359/276
6,961,166 B2 * 11/2005 Wooten et al. ................ 359/245

(Continued)

FOREIGN PATENT DOCUMENTS

JP   2009-198914   9/2009
JP   2012-063701   3/2012

OTHER PUBLICATIONS

International Preliminary Report on Patentability and Written Opinion dated Sep. 6, 2013 for related PCT Application No. PCT/JP2012/001311.

(Continued)

*Primary Examiner* — Peter Radkowski
(74) *Attorney, Agent, or Firm* — Workman Nydegger

(57) ABSTRACT

An optical modulator that supports a plurality of modulation formats is provided. The optical modulator includes: a distribution part including an optical demultiplexing/variable-branching switchable circuit; an optical modulator array; and an aggregation part including a combining ratio variable combining circuit and/or an optical multiplexing/variable-combining switchable circuit. The distribution part forms any or a combination of a variable 1×M demultiplexer/brancher, a combination of one or more fixed ILFs and an optical switch and a combination of a plurality of variable optical couplers and an optical switch; the optical modulator array includes a plurality of optical modulators; the aggregation part includes a structure of any or a combination of one or more variable optical couplers, a combination of a plurality of variable attenuators, an M×1 variable coupler, a variable M×1 demultiplexer/brancher and a combination of one or more fixed ILFs and an optical switch.

20 Claims, 50 Drawing Sheets

(56) References Cited

U.S. PATENT DOCUMENTS

| | | | | |
|---|---|---|---|---|
| 7,733,562 | B2* | 6/2010 | Doerr et al. | 359/337.1 |
| 8,050,351 | B2* | 11/2011 | Cho et al. | 375/295 |
| 2004/0240765 | A1* | 12/2004 | Wooten et al. | 385/2 |
| 2007/0133918 | A1* | 6/2007 | Cho et al. | 385/1 |
| 2007/0212075 | A1* | 9/2007 | Yin | 398/183 |
| 2008/0231944 | A1* | 9/2008 | Doerr et al. | 359/337.1 |
| 2010/0303469 | A1* | 12/2010 | Barton et al. | 398/184 |

OTHER PUBLICATIONS

International Search Report dated May 18, 2012, issued in PCT Application No. PCT/JP2012/001311.

Hiroshi Yamazaki et al., *64QAM Modulator with a Hybrid Configuration of Silica PLCs and LiNbO₃ Phase Modulators*, IEEE Photonics Technology Letters, vol. 22, No. 5, Mar. 1, 2010, pp. 344-346.

A. Sano et al., *13.4-Tb/s (134×11-Gb/s/ch) No-Guard-Interval Coherent OFDM Transmission Over 3,600 km of SMF with 19-ps Average PMD*, IEEE, vol. 7, No. 25, Sep. 2008, 2 pages.

Takashi Yamada et al., *Compact 111-Gbit/s Integrated RZ-DQPSK Modulator Using Hybrid Assembly Technique with Silica-Based PLCs and LiNbO₃ Devices*, Proceeding of OFC/NFOEC 2008, paper OTHC3, 3 pages.

Kaname Jinguji et al., *Synthesis of Coherent Two-Port Lattice-Form Optical Delay-Line Circuit*, Journal of Lightwave Technology, vol. 13, No. 1, Jan. 1, 1995, pp. 73-85.

Manabu Oguma et al., *Compact and Low-Loss Interleave Filter Employing Lattice-Form Structure and Silica-Based Waveguide*, Journal of Lightwave Technology, vol. 22, No. 3, Mar. 2004, pp. 895-902.

K. Takiguchi et al., *Integrated-Optic Eight-Channel OFDM Demultiplexer and Its Demonstration with 160 Gbit/s signal Reception*, Electronics Letters, vol. 46, No. 8, Apr. 15, 2010, pp. 575-576.

Hiroshi Yamazaki et al., *Modulation-level-selectable Optical Modulator with a Hybrid Configuration of Silica PLCs and LiNbO₃ Phase Modulators*, ECOC 2010, Sep. 19-23, 2010, 3 pages.

H. Yamazaki et al., *Multilevel Modulators with a Hybrid Configuration of Silica-Based PLCs and LiNbO₃ Phase Modulators*, 2010 Nen the Institute of Electronics, Information and communication Engineers Sogo Taikai Electronics Koen Ronbunshu 2, Mar. 2, 2010, 2 pages.

Takashi Goh et al., *Multi-Carrier Flexible-Format Optical Modulator Using PLC-LN Hybrid Integration Technology*, IEICE Technical Report, vol. 111, No. 111, Jun. 23, 2011, pp. 53-59.

Hiroshi Yamazaki et al., *Flexible format Optical Modulators with a Hybrid Configuration of Silica Planar Lightwave circuits and LiNbO₃ Phase Modulators*, NTT Technical Review, vol. 9, No. 4, Apr. 2011, pp. 1-8.

Takashi Goh et al., *Novel Flexible-Format Optical Modulator with Selectable combinations of Carrier Numbers and Modulation Levels Based on Silica-PLC and LiNbO₃ Hybrid Integration*, Optical Society of America, Mar. 6-11, 2011, 3 pages.

\* cited by examiner

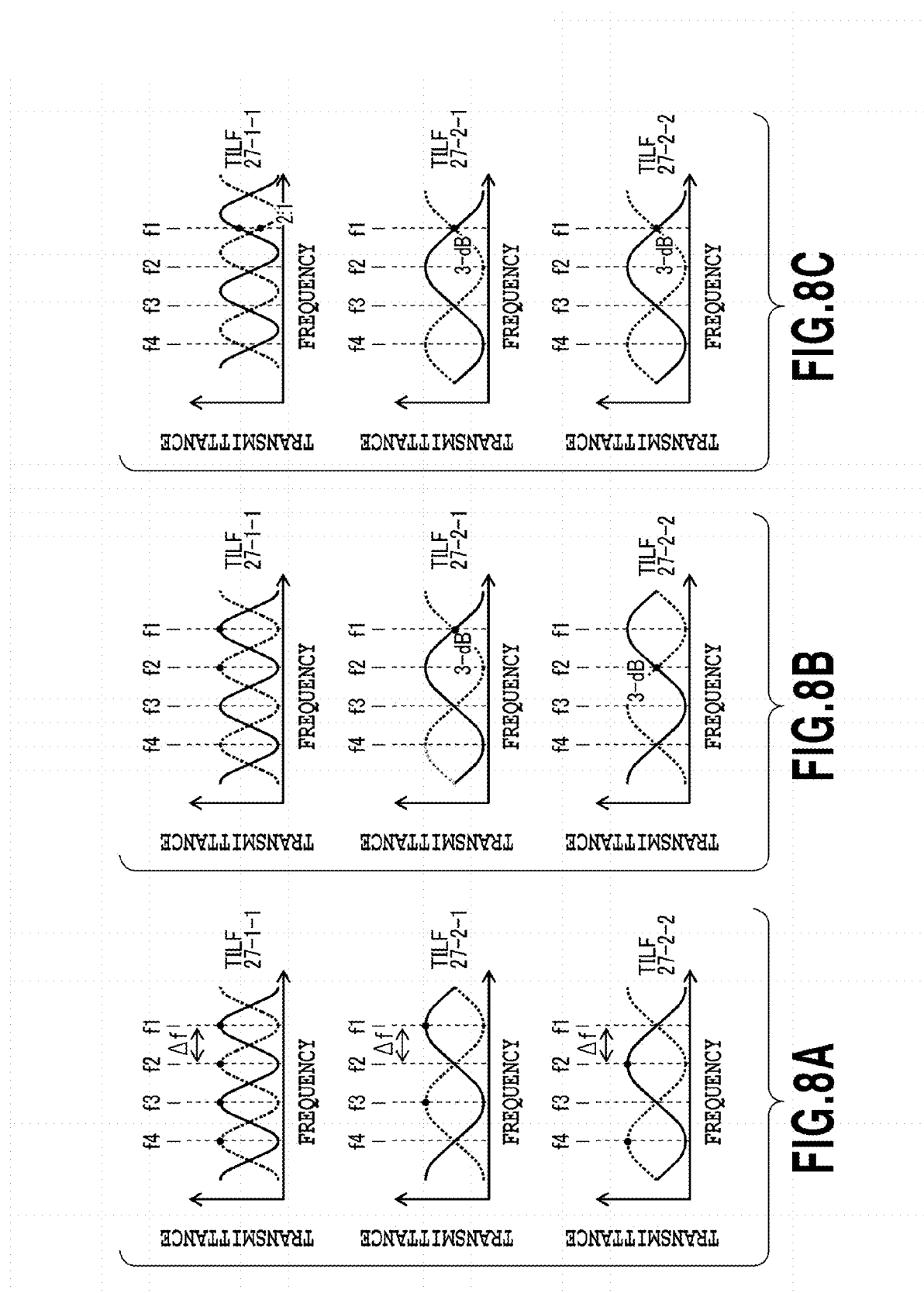

| OPERATION LIST WHEN M = 4 | | 4-CARRIER BPSK MODE | 2-CARRIER QPSK MODE | | 1-CARRIER 16QAM MODE | |
|---|---|---|---|---|---|---|
| | | | ADJACENT-CH OPERATION | 2-CH-INTERVAL OPERATION | OPERATION 1 | OPERATION 2 |
| OPERATION SETTING OF EACH ELEMENT | TLF1-1 | DEMULTIPLEXING | 3-dB COUPLING | 3-dB COUPLING | 2:1 COUPLING | 3-dB COUPLING |
| | TLF2-1 | DEMULTIPLEXING | 3-dB COUPLING | DEMULTIPLEXING | 3-dB COUPLING | 2:1 COUPLING |
| | TLF2-2 | DEMULTIPLEXING | 3-dB COUPLING | DEMULTIPLEXING | 3-dB COUPLING | 2:1 COUPLING |
| | VC 1-1 | 3-dB COUPLING | 3-dB COUPLING | 3-dB COUPLING | 2:1 COUPLING | 3-dB COUPLING |
| | VC 2-1 | 3-dB COUPLING | 3-dB COUPLING | 3-dB COUPLING | 3-dB COUPLING | 2:1 COUPLING |
| | VC 2-2 | 3-dB COUPLING | 3-dB COUPLING | 3-dB COUPLING | 3-dB COUPLING | 2:1 COUPLING |
| MODULATION FORMAT FOR EACH CARRIER SIGNAL | f1 | BPSK MODULATION WITH PSK 1 | QPSK MODULATION WITH PSKS 1 AND 2 (SET AT PHASE DIFFERENCE OF 90°) | QPSK MODULATION WITH PSKS 1 AND 3 (SET AT PHASE DIFFERENCE OF 90°) | 16QAM MODULATION WITH PSKS 1 TO 4 LARGE QPSK MODULATION WITH PSKS 1 AND 2 SMALL QPSK MODULATION WITH MPSKS 3 AND 4 | 16QAM MODULATION WITH PSKS 1 TO 4 LARGE QPSK MODULATION WITH PSKS 1 AND 3 SMALL QPSK MODULATION WITH PSKS 2 AND 4 |
| | f2 | BPSK MODULATION WITH PSK 3 | QPSK MODULATION WITH PSKS 3 AND 4 (SET AT PHASE DIFFERENCE OF 90°) | NONE | NONE | NONE |
| | f3 | BPSK MODULATION WITH PSK 2 | NONE | QPSK MODULATION WITH PSKS 2 AND 4 (SET AT PHASE DIFFERENCE OF 90°) | NONE | NONE |
| | f4 | BPSK MODULATION WITH PSK 4 | NONE | NONE | NONE | NONE |

| FIG.13A | FIG.13B | FIG.13C |
|---|---|---|

OPERATION LIST WHEN M = 8

| | | 8-CARRIER BPSK MODE | ADJACENT-CH OPERATION |
|---|---|---|---|
| OPERATION SETTING OF EACH ELEMENT | TILF1-1 | DEMULTIPLEXING | DEMULTIPLEXING |
| | TILF2-1 | DEMULTIPLEXING | DEMULTIPLEXING |
| | TILF2-2 | DEMULTIPLEXING | DEMULTIPLEXING |
| | TILF3-1 | DEMULTIPLEXING | 3-dB COUPLING |
| | TILF3-2 | DEMULTIPLEXING | 3-dB COUPLING |
| | TILF3-3 | DEMULTIPLEXING | 3-dB COUPLING |
| | TILF3-4 | DEMULTIPLEXING | 3-dB COUPLING |
| | VC1-1 | 3-dB COUPLING | 3-dB COUPLING |
| | VC2-1 | 3-dB COUPLING | 3-dB COUPLING |
| | VC2-2 | 3-dB COUPLING | 3-dB COUPLING |
| | VC3-1 | 3-dB COUPLING | 3-dB COUPLING |
| | VC3-2 | 3-dB COUPLING | 3-dB COUPLING |
| | VC3-3 | 3-dB COUPLING | 3-dB COUPLING |
| | VC3-4 | 3-dB COUPLING | 3-dB COUPLING |
| MODULATION FORMAT FOR EACH CARRIER SIGNAL | f1 | BPSK MODULATION WITH PSK 1 | QPSK MODULATION WITH PSKS 1 AND 2 |
| | f2 | BPSK MODULATION WITH PSK 5 | QPSK MODULATION WITH PSKS 5 AND 6 |
| | f3 | BPSK MODULATION WITH PSK 3 | QPSK MODULATION WITH PSKS 3 AND 4 |
| | f4 | BPSK MODULATION WITH PSK 7 | QPSK MODULATION WITH PSKS 7 AND 8 |
| | f5 | BPSK MODULATION WITH PSK 2 | NONE |
| | f6 | BPSK MODULATION WITH PSK 6 | NONE |
| | f7 | BPSK MODULATION WITH PSK 4 | NONE |
| | f8 | BPSK MODULATION WITH PSK 8 | NONE |

FIG.13A

| 4-CARRIER QPSK MODE | | | | 2-CARRIER 16QAM MODE | |
|---|---|---|---|---|---|
| 2-CH-INTERVAL OPERATION | 4-CH-INTERVAL OPERATION FOR EVERY 2CH | ADJACENT-CH OPERATION 1 | ADJACENT-CH OPERATION 2 | 2-CH-INTERVAL OPERATION 1 | 2-CH-INTERVAL OPERATION 2 |
| 3-dB COUPLING | DEMULTIPLEXING | DEMULTIPLEXING | DEMULTIPLEXING | 2:1 COUPLING | 3-dB COUPLING |
| DEMULTIPLEXING | 3-dB COUPLING | 2:1 COUPLING | 3-dB COUPLING | DEMULTIPLEXING | DEMULTIPLEXING |
| DEMULTIPLEXING | 3-dB COUPLING | 2:1 COUPLING | 3-dB COUPLING | DEMULTIPLEXING | DEMULTIPLEXING |
| DEMULTIPLEXING | DEMULTIPLEXING | 3-dB COUPLING | 2:1 COUPLING | 3-dB COUPLING | 2:1 COUPLING |
| DEMULTIPLEXING | DEMULTIPLEXING | 3-dB COUPLING | 2:1 COUPLING | 3-dB COUPLING | 2:1 COUPLING |
| DEMULTIPLEXING | DEMULTIPLEXING | 3-dB COUPLING | 2:1 COUPLING | 3-dB COUPLING | 2:1 COUPLING |
| DEMULTIPLEXING | DEMULTIPLEXING | 3-dB COUPLING | 2:1 COUPLING | 3-dB COUPLING | 2:1 COUPLING |
| 3-dB COUPLING | 3-dB COUPLING | 3-dB COUPLING | 3-dB COUPLING | 2:1 COUPLING | 3-dB COUPLING |
| 3-dB COUPLING | 3-dB COUPLING | 2:1 COUPLING | 3-dB COUPLING | 3-dB COUPLING | 3-dB COUPLING |
| 3-dB COUPLING | 3-dB COUPLING | 2:1 COUPLING | 3-dB COUPLING | 3-dB COUPLING | 3-dB COUPLING |
| 3-dB COUPLING | 3-dB COUPLING | 3-dB COUPLING | 2:1 COUPLING | 3-dB COUPLING | 2:1 COUPLING |
| 3-dB COUPLING | 3-dB COUPLING | 3-dB COUPLING | 2:1 COUPLING | 3-dB COUPLING | 2:1 COUPLING |
| 3-dB COUPLING | 3-dB COUPLING | 3-dB COUPLING | 2:1 COUPLING | 3-dB COUPLING | 2:1 COUPLING |
| 3-dB COUPLING | 3-dB COUPLING | 3-dB COUPLING | 2:1 COUPLING | 3-dB COUPLING | 2:1 COUPLING |
| QPSK MODULATION WITH PSKS 1 AND 5 | QPSK MODULATION WITH PSKS 1 AND 3 | 16QAM MODULATION WITH PSKS 1 TO 4 | 16QAM MODULATION WITH PSKS 1, 2, 5 AND 6 | | |
| NONE | QPSK MODULATION WITH PSKS 5 AND 7 | 16QAM MODULATION WITH PSKS 5 TO 8 | NONE | | |
| QPSK MODULATION WITH PSKS 3 AND 7 | NONE | NONE | 16QAM MODULATION WITH PSKS 3, 4, 7 AND 8 | | |
| NONE | NONE | NONE | NONE | | |
| QPSK MODULATION WITH PSKS 2 AND 6 | QPSK MODULATION WITH PSKS 2 AND 4 | NONE | NONE | | |
| NONE | QPSK MODULATION WITH PSKS 6 AND 8 | NONE | NONE | | |
| QPSK MODULATION WITH PSKS 4 AND 8 | NONE | NONE | NONE | | |
| NONE | NONE | NONE | NONE | | |

FIG.13B

| 4-CH-INTERVAL OPERATION 1 | 4-CH-INTERVAL OPERATION 2 | 1-CARRIER 256QAM MODE ||||||
|---|---|---|---|---|---|---|---|
| | | OPERATION 1 | OPERATION 2 | OPERATION 3 | OPERATION 4 | OPERATION 5 | OPERATION 6 |
| 2:1 COUPLING | 3-dB COUPLING | 4:1 | 4:1 | 2:1 | 2:1 | 3-dB | 3-dB |
| 3-dB COUPLING | 2:1 COUPLING | 2:1 | 3-dB | 3-dB | 4:1 | 4:1 | 2:1 |
| 3-dB COUPLING | 2:1 COUPLING | 2:1 | 3-dB | 3-dB | 4:1 | 4:1 | 2:1 |
| DEMULTIPLEXING | DEMULTIPLEXING | 3-dB | 2:1 | 4:1 | 3-dB | 2:1 | 4:1 |
| DEMULTIPLEXING | DEMULTIPLEXING | 3-dB | 2:1 | 4:1 | 3-dB | 2:1 | 4:1 |
| DEMULTIPLEXING | DEMULTIPLEXING | 3-dB | 2:1 | 4:1 | 3-dB | 2:1 | 4:1 |
| DEMULTIPLEXING | DEMULTIPLEXING | 3-dB | 2:1 | 4:1 | 3-dB | 2:1 | 4:1 |
| 2:1 COUPLING | 3-dB COUPLING | 4:1 | 4:1 | 2:1 | 2:1 | 3-dB | 3-dB |
| 3-dB COUPLING | 2:1 COUPLING | 2:1 | 3-dB | 3-dB | 4:1 | 4:1 | 2:1 |
| 3-dB COUPLING | 2:1 COUPLING | 2:1 | 3-dB | 3-dB | 4:1 | 4:1 | 2:1 |
| 3-dB COUPLING | 3-dB COUPLING | 3-dB | 2:1 | 4:1 | 3-dB | 2:1 | 4:1 |
| 3-dB COUPLING | 3-dB COUPLING | 3-dB | 2:1 | 4:1 | 3-dB | 2:1 | 4:1 |
| 3-dB COUPLING | 3-dB COUPLING | 3-dB | 2:1 | 4:1 | 3-dB | 2:1 | 4:1 |
| 3-dB COUPLING | 3-dB COUPLING | 3-dB | 2:1 | 4:1 | 3-dB | 2:1 | 4:1 |
| 16QAM MODULATION WITH PSKS 1, 3, 5 AND 7 | 256QAM MODULATION WITH PSKS 1 TO 8 | | | | | | |
| NONE | NONE | | | | | | |
| NONE | NONE | | | | | | |
| NONE | NONE | | | | | | |
| 16QAM MODULATION WITH PSKS 2, 4, 6 AND 8 | NONE | | | | | | |
| NONE | NONE | | | | | | |
| NONE | NONE | | | | | | |
| NONE | NONE | | | | | | |

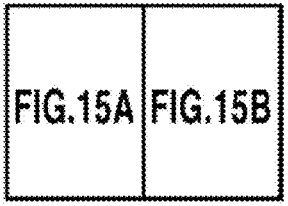

FIG.15A

OPERATION LIST WHEN M = 12

| | | 12-CARRIER BPSK MODE |
|---|---|---|
| OPERATION SETTING OF EACH ELEMENT TILF/VC | 1-1 | DEMULTIPLEXING/ 3-dB COUPLING |
| | 2-1 | DEMULTIPLEXING/ 3-dB COUPLING |
| | 2-2 | DEMULTIPLEXING/ 3-dB COUPLING |
| | 3-1 | DEMULTIPLEXING/ 2:1 COUPLING |
| | 3-2 | DEMULTIPLEXING/ 2:1 COUPLING |
| | 3-3 | DEMULTIPLEXING/ 2:1 COUPLING |
| | 3-4 | DEMULTIPLEXING/ 2:1 COUPLING |
| | 4-1 | DEMULTIPLEXING/ 3-dB COUPLING |
| | 4-2 | DEMULTIPLEXING/ 3-dB COUPLING |
| | 4-3 | DEMULTIPLEXING/ 3-dB COUPLING |
| | 4-4 | DEMULTIPLEXING/ 3-dB COUPLING |
| MODULATION FORMAT FOR EACH CARRIER SIGNAL | f1 | BPSK MODULATION WITH PSK 1 |
| | f2 | BPSK MODULATION WITH PSK 7 |
| | f3 | BPSK MODULATION WITH PSK 4 |
| | f4 | BPSK MODULATION WITH PSK 10 |
| | f5 | BPSK MODULATION WITH PSK 3 |
| | f6 | BPSK MODULATION WITH PSK 9 |
| | f7 | BPSK MODULATION WITH PSK 6 |
| | f8 | BPSK MODULATION WITH PSK 12 |
| | f9 | BPSK MODULATION WITH PSK 2 |
| | f10 | BPSK MODULATION WITH PSK 8 |
| | f11 | BPSK MODULATION WITH PSK 5 |
| | f12 | BPSK MODULATION WITH PSK 11 |

| 6-CARRIER QPSK MODE | 3-CARRIER 16QAM MODE | 2-CARRIER 64QAM MODE |
|---|---|---|
| 3-dB COUPLING/ 3-dB COUPLING | 2:1 COUPLING/ 2:1 COUPLING | DEMULTIPLEXING/ 3-dB COUPLING |
| DEMULTIPLEXING/ 3-dB COUPLING | 3-dB COUPLING/ 3-dB COUPLING | 3-dB COUPLING/ 3-dB COUPLING |
| DEMULTIPLEXING/ 3-dB COUPLING | 3-dB COUPLING/ 3-dB COUPLING | 3-dB COUPLING/ 3-dB COUPLING |
| DEMULTIPLEXING/ 2:1 COUPLING | DEMULTIPLEXING/ 2:1 COUPLING | 3:4 COUPLING/ 3:4 COUPLING |
| DEMULTIPLEXING/ 2:1 COUPLING | DEMULTIPLEXING/ 2:1 COUPLING | 3:4 COUPLING/ 3:4 COUPLING |
| DEMULTIPLEXING/ 2:1 COUPLING | DEMULTIPLEXING/ 2:1 COUPLING | 3:4 COUPLING/ 3:4 COUPLING |
| DEMULTIPLEXING/ 2:1 COUPLING | DEMULTIPLEXING/ 2:1 COUPLING | 3:4 COUPLING/ 3:4 COUPLING |
| DEMULTIPLEXING/ 3-dB COUPLING | DEMULTIPLEXING/ 3-dB COUPLING | 1:2 COUPLING/ 1:2 COUPLING |
| DEMULTIPLEXING/ 3-dB COUPLING | DEMULTIPLEXING/ 3-dB COUPLING | 1:2 COUPLING/ 1:2 COUPLING |
| DEMULTIPLEXING/ 3-dB COUPLING | DEMULTIPLEXING/ 3-dB COUPLING | 1:2 COUPLING/ 1:2 COUPLING |
| DEMULTIPLEXING/ 3-dB COUPLING | DEMULTIPLEXING/ 3-dB COUPLING | 1:2 COUPLING/ 1:2 COUPLING |
| QPSK MODULATION WITH PSKS 1 AND 7 | 16QAM MODULATION WITH PSKS 1, 4, 7 AND 10 | 64QAM MODULATION WITH PSKS 1 TO 6 |
| NONE | NONE | 64QAM MODULATION WITH PSKS 7 TO 12 |
| QPSK MODULATION WITH PSKS 4 AND 10 | NONE | NONE |
| NONE | NONE | NONE |
| QPSK MODULATION WITH PSKS 3 AND 9 | 16QAM MODULATION WITH PSKS 3, 6, 9 AND 12 | NONE |
| NONE | NONE | NONE |
| QPSK MODULATION WITH PSKS 6 AND 12 | NONE | NONE |
| NONE | NONE | NONE |
| QPSK MODULATION WITH PSKS 2 AND 8 | 16QAM MODULATION WITH PSKS 2, 5, 8 AND 11 | NONE |
| NONE | NONE | NONE |
| QPSK MODULATION WITH PSKS 5 AND 11 | NONE | NONE |
| NONE | NONE | NONE |

FIG.15B

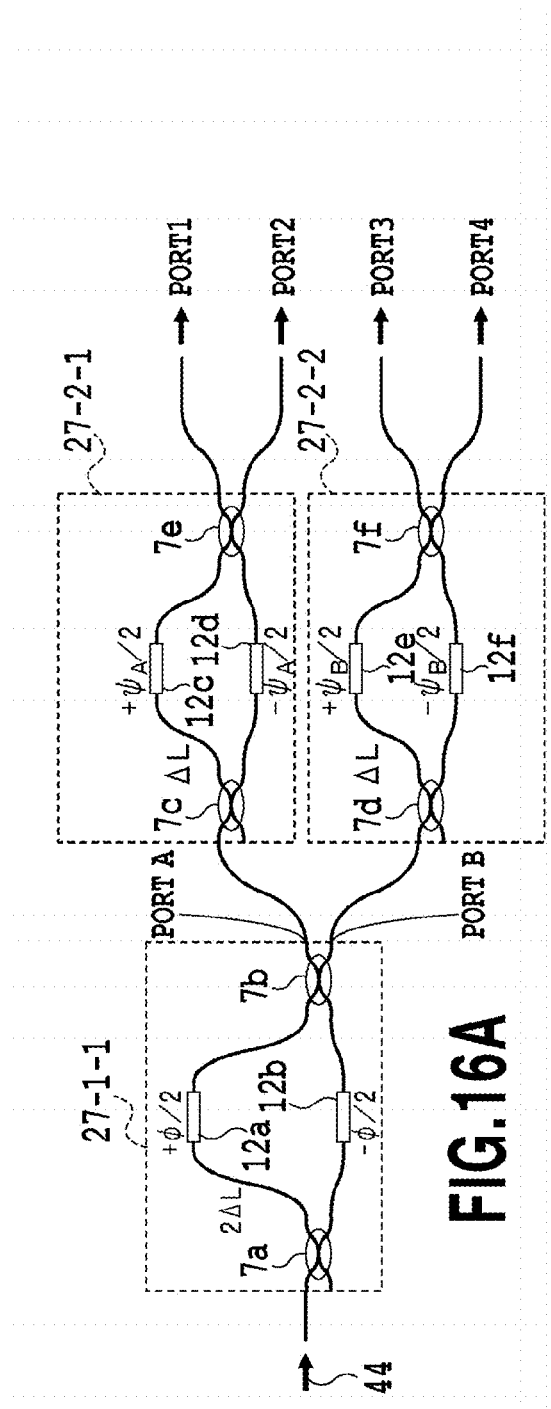
FIG.16A
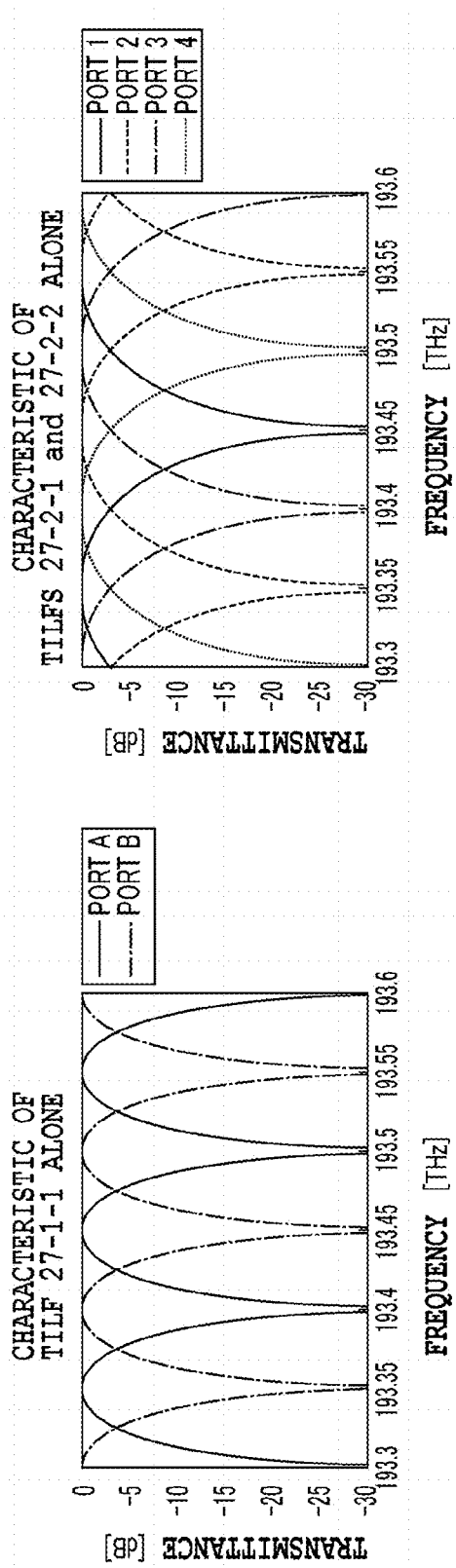
FIG.16B
FIG.16C

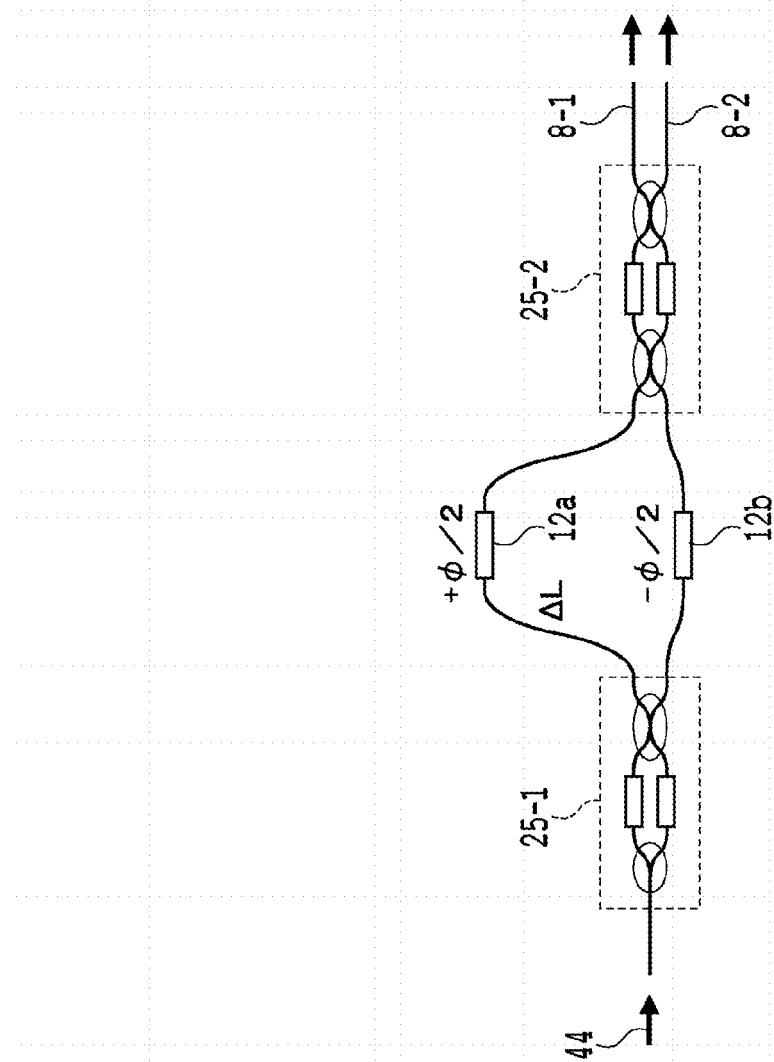

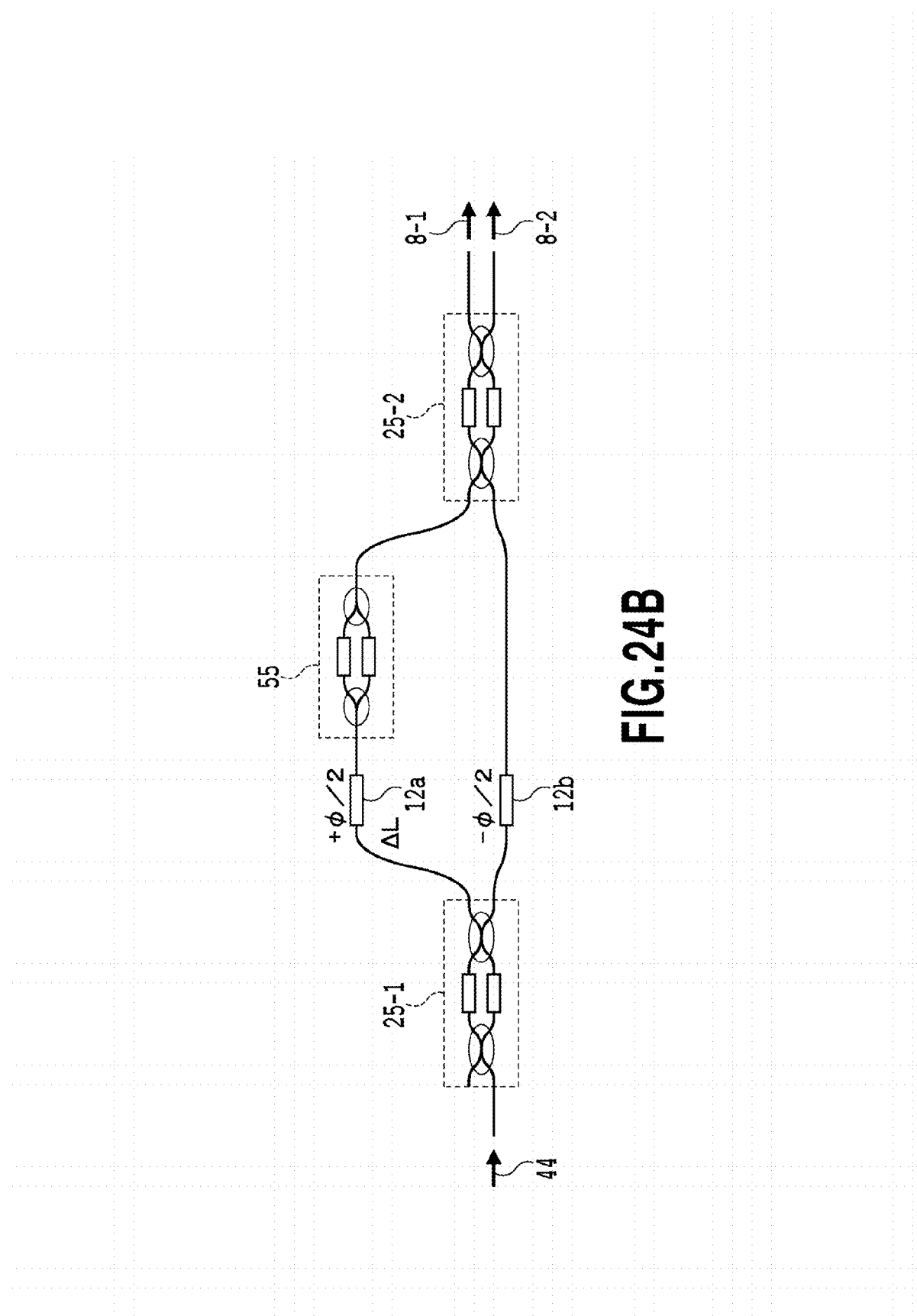

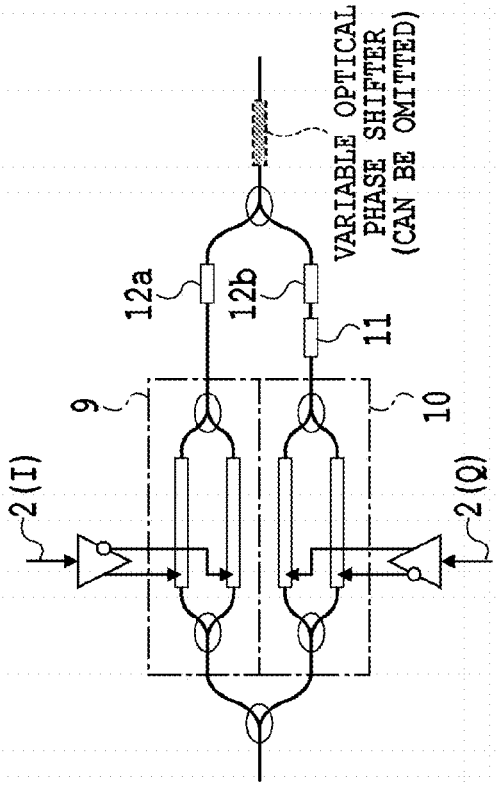

FIG.32C

CASE WHERE NEST-MZI OPTICAL MODULATOR IS USED

VARIABLE OPTICAL PHASE SHIFTER (CAN BE OMITTED)

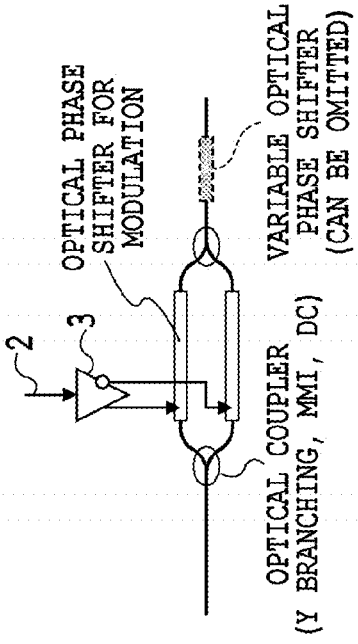

FIG.32A

CASE WHERE SINGLE MZI OPTICAL MODULATOR IS USED

OPTICAL PHASE SHIFTER FOR MODULATION

VARIABLE OPTICAL PHASE SHIFTER (CAN BE OMITTED)

OPTICAL COUPLER (Y BRANCHING, MMI, DC)

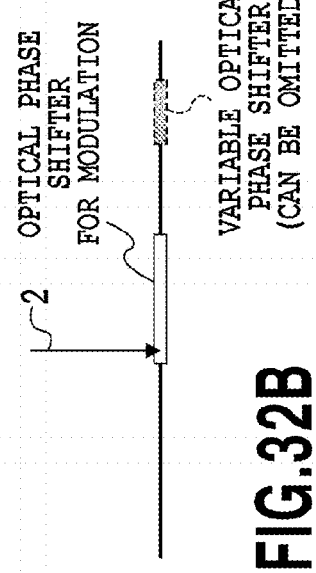

FIG.32B

CASE WHERE SIMPLE PHASE MODULATOR IS USED

OPTICAL PHASE SHIFTER FOR MODULATION

VARIABLE OPTICAL PHASE SHIFTER (CAN BE OMITTED)

OPTICAL MODULATOR

TECHNICAL FIELD

The present invention relates to an optical modulator, and more particularly relates to an optical modulator that can change the combination of the number of carriers of a modulation signal and a modulation multilevel number.

BACKGROUND ART

At present, in a 100-G transmission system being put into practical use in an optical fiber communication system, a quaternary phase modulation (Quadrature Phase-Shift Keying: QPSK modulation) system which is one type of multilevel modulation technology and a polarization multiplexing system which is one type of multiplexing technology are used to realize a high speed transmission rate of 128 Gbps per channel. The multilevel modulation technology is a technology in which not only the amplitude of an optical signal but also phase information is utilized and thus a large number of pieces of information are transmitted with one symbol. In the QPSK modulation system, symbols are allocated to four levels, that is, four types of phase states, and thus information of 2 bits is transmitted with one symbol. The polarization multiplexing system is a technology in which polarization is utilized to multiplex and simultaneously transmit signals in 2 series, and it is possible to obtain twice as high a transmission rate as in the transmission system using normal single polarization. Hence, in a 100 G transmission system in the polarization multiplexing QPSK modulation system, it is possible to transmit information of a total of 4 bits per symbol and reduce a symbol rate to 32 Gbaud which is one-fourth of the bit rate. Whether the symbol rate is high or low affects not only the magnitude of transmission degradation such as polarization mode dispersion but also a requirement for characteristic of a modulator and a demodulator, and thus becomes an indicator that significantly affects the realization of the system.

In research and development for future transmission system exceeding 100 G, in order for the transmission rate to be increased while the symbol rate is kept low, a QAM modulation system in which the multilevel number is further increased and a subcarrier multiplexing system using a plurality of transmission carriers are examined. For example, in a 16QAM modulation system, symbols are allocated to 16-ary, that is, 16 types of phase amplitude states on a signal space diagram, and thus it is possible to transmit information of four bits with one symbol. In a 2-subcarrier multiplexing system, since information can be transmitted independently in two carriers, it is possible to transmit twice as high a rate as in a normal 1 carrier transmission system. The subcarrier multiplexing system is also said to be Orthogonal Frequency-Division Multiplexing (OFDM) when carriers are arranged at the minimum spacing which maintains an orthogonal relationship between the carriers, that is, the same carrier intervals as the symbol rate.

Before the description of modulators that generate optical signals of these systems, a QPSK modulator that forms a basic configuration of these modulators will first be described with reference to FIGS. 1A to 3D. FIG. 1A shows an example of the configuration of the QPSK modulator; FIG. 1B shows, as the outline of the operation of the QPSK modulator of FIG. 1A, the intensity waveform and the signal constellation of the optical signal at each of points A to G in the QPSK modulator. A QPSK modulator 1 has a configuration called a nest MZI modulator in which a MZI modulator (child MZI modulator) is nested into each arm waveguide part of a Mach-Zehnder Interferometer (MZI), which will be called a parent MZI.

FIGS. 2A to 2D show the operation of the child MZI, that is, single MZI modulator in detail. Although in FIGS. 1A and 2A, the modulator is assumed to be an LN modulator using a Z-cut substrate of lithium niobate ($LiNbO_3$; LN), the same operation is basically performed also when an X-cut substrate is used. As shown in FIG. 2A, when the Z-cut substrate is used, a drive electrical data signal $V_{drv}2$ is divided into two outputs by a differential output drive circuit 3, differential input signal ($+V_{drv}/2$ for a lower arm, $-V_{drv}/2$ for the lower arm) is fed to an upper arm optical phase shifter for modulation 4 and a lower arm optical phase shifter for modulation 5 of the modulator and so-called push-pull driving is performed. When the X-cut substrate is used, since a drive electrode is normally arranged between the modulator arms, and opposite electric fields are applied to the upper and lower arms, the push-pull driving is automatically performed. Continuous (Continuous Wave; CW) light 6 launched to the single MZI modulator is branched into two by a 3 dB optical coupler 7a, and then the branched lights are phase-modulated in the respective upper and lower arm optical phase shifters for modulation 4 and 5 and are combined again at a 3 dB optical coupler 7f. The aspect of the phase modulation in signal space diagram at this time is shown in FIG. 2B. An arrow shown in FIG. 2B indicates an electric field vector of an output signal light 8. Since the light through the upper arm is phase-modulated in a positive direction, its electric field vector tracks a counterclockwise trajectory (cross→white circle→black circle), whereas the light through the lower arm is phase-modulated in a negative direction, its electric field vector tracks a clockwise trajectory. Since the resultant vector of both electric field vectors is the electric field vector of the output signal light, the output signal light tracks a straight trajectory on the real axis. Here, as shown in FIG. 2C, when the single MZI modulator is driven by a data electrical signal so that the phase difference between the arm waveguides is changed by $2\pi$, the output light is phase-modulated at phase 0 and phase $\pi$, and is modulated into two phase values in which the intensity of the signal light is a constant value at signal timing. As described above, the single MZI modulator operates as an optical phase modulator. In the optical phase modulation by the single MZI modulator described above, as compared with the optical phase modulation by an optical phase modulator including only a simple optical phase shifter, even if the drive amplitude of the electrical data signal is slightly varied, an optical signal output advantageously little varies by the nonlinear behavior of the MZI as is found from FIG. 2C, and, since a property in which the a modulation spectrum is narrowed is provided, it is suitably used as a modulator that generates a phase modulation (Phase-Shift Keying: PSK) signal. FIG. 2D is a diagram schematically showing a single MZI modulator 13.

In the nest MZI modulator, as shown in FIGS. 1A and 1B, the CW lights branched by a 3 dB coupler 7a are respectively binary phase-modulated by the child MZI modulators (an MZI modulator for Ich 9 and an MZI modulator for Qch 10) (see D and E in FIG. 1B) and take a 90° phase shift with a $\pi/2$ optical phase shifter 11 (see F in FIG. 1B), and those modulation signals are combined by a 3 dB coupler 7f to give a quaternary phase-modulated QPSK signal light as shown in G of FIG. 1B. Note that, the $\pi/2$ optical phase shifter is actually realized by the adjustment with a subsequent phase adjuster (variable optical phase shifter) 12, and the $\pi/2$ optical phase shifter is often omitted without being individually provided.

FIGS. 3A to 3D show detailed configurations when the single MZI modulator is fabricated on an LN substrate with an optical waveguide (LN waveguide) formed by titanium diffusion. FIGS. 3A and 3B show configurations using the Z-cut substrate; FIGS. 3C and 3D show configurations using the X-cut substrate; FIG. 3B shows a cross-sectional view taken along line IIIB of FIG. 3A; FIG. 3D shows a cross-sectional view taken along line IIID of FIG. 3C. In the Z-cut substrate 14, a high-frequency center electrode 16 is provided in an upper part of the waveguide 15, and a GND electrode 17 is provided around the high-frequency center electrode 16. When a voltage is applied to the high-frequency center electrode 16, as shown in FIG. 3B, in the vicinity of a waveguide core 18, an electric field occurs in a vertical direction. Since this direction is a polarization direction 19 of the Z-cut substrate, a refractive index is changed by Pockels effect, with the result that the phase of the light which propagates through the waveguide is changed. In the X-cut substrate 20, the high-frequency center electrode 16 is provided in an upper part of the middle of the both-arm waveguide 15 of the MZI, and the GND electrode 17 is provided in an upper part around the both-arm waveguide. With such electrode arrangement, as shown in FIG. 3D, in the vicinity of the core, an electric field can be made to occur in a horizontal direction which is the polarization direction 19 of the X-cut substrate, and it is possible to perform phase control on the propagated light as same as with the Z-cut substrate. Note that, in the high-frequency center electrode 16, in order to correspond to the direction in which the light propagates within the waveguide, one end is used as a signal input terminal, and a termination resister 21 is connected to the other end to form a traveling wave electrode structure, thereby enabling extremely high-speed modulation. Moreover, although not shown in this figure, separately from this high-frequency electrode, an electrode of a lumped constant electrode structure may be provided for the adjustment of an operating point. Furthermore, in the subsequent figures, regardless of the Z-cut substrate or the X-cut substrate, as necessary, the single MZI modulator will be simply shown as in FIG. 2D.

The configuration and the operation of a conventional 16QAM modulator will now be described with reference to FIGS. 4A and 4B. FIG. 4A shows the configurations of the 16QAM modulator; FIG. 4B shows the signal constellation of a light signal at points A to C in the modulator of FIG. 4A. The 16QAM modulator includes: a 2:1 optical coupler 22a having one input and two outputs; two QPSK modulators 1a and 1b; two optical phase adjusters (variable optical phase shifters) 12e and 12f and a 2:1 optical coupler 22b having two inputs and one output. The input CW light 6 is branched by the 2:1 optical coupler 22a, and the branched CW lights are respectively QPSK-modulated by the QPSK modulators 1a and 1b to be combined by the 2:1 optical coupler 22b. Since the ratio of the electric field amplitude of a QPSK signal 1 through the QPSK modulator 1a to that of a QPSK signal 2 through the QPSK modulator 1b is 2:1, the relative phase of the QPSK signal 1 and the QPSK signal 2 is appropriately adjusted by the phase adjusters 12e and 12f, and thus it is possible to generate a 16QAM signal as shown in FIG. 4B (NPL 1).

The configuration and the operation of a 2-subcarrier multiplexing QPSK modulator will now be described with reference to FIGS. 5A and 5B. FIG. 5A shows the configuration of a conventional 2-subcarrier multiplexing QPSK modulator; FIG. 5B shows the spectrum and the signal constellation of signals at points A to F in the modulator of FIG. 5A. The 2-subcarrier multiplexing QPSK modulator includes: an interleaving optical filter (ILF) 23 having one input and two outputs; two QPSK modulators 1a and 1b; two optical phase adjusters (variable optical phase shifters) 12e and 12f; and a 3 dB optical coupler 7g having two inputs and one output. The ILF includes a delay line of an optical length difference ΔL inserted between the two 3 dB optical couplers 7a and 7b and has a periodical transmission characteristic in which a free spectral range (FSR) is c/ΔL (here, c is the speed of light) by known interference principles, and it is possible to demultiplex the interleaved input light with frequency interval Δf=FSR/2 and output it. A transmission characteristic $T_B$ to the B side and a transmission characteristic $T_C$ to the C side are expressed as formula below.

$$T_B = \frac{1}{2} \cdot \left\{1 + \sin\left(2\pi \frac{f}{FSR}\right)\right\}$$
$$T_C = \frac{1}{2} \cdot \left\{1 - \sin\left(2\pi \frac{f}{FSR}\right)\right\}$$

Formula 1

The CW light of two wavelengths in which frequencies are Δf apart is input to this modulator as a subcarrier. Here, when it is assumed that the wavelengths of the CW light are f1 and f2, f1=k·FSR and f2=(k−0.5) FSR where k is an integer. As shown in FIG. 5B, the input subcarrier of the two wavelengths is demultiplexed by the ILF 23, and the demultiplexed waves are individually QPSK-modulated by the respective QPSK modulators 1a and 1b to be combined by the 3 dB optical coupler 7g. In this way, it is possible to generate a subcarrier multiplexed signal (NPL 2).

CITATION LIST

Non Patent Literature

NPL 1: H. Yamazaki et al., "64QAM modulator with a hybrid configuration of Silica PLCs and LiNbO3 phase modulators," IEEE Photon. Technol. Lett., vol. 22, no. 5, pp. 344-346.
NPL 2: A. Sano et al., "13.4-Tb/s (134×111-Gb/s/ch) no-guard-interval coherent OFDM transmission over 3,600 km of SMF with 19-ps average PMD," proc. of ECOC 2008, paper Th.3.E.1.
NPL 3: T. Yamada et al., "Compact 111-Gbit/s integrated RZ-DQPSK modulator using hybrid assembly technique with silica-based PLCs and LiNbO3 devices," proc. of OFC/NFOEC 2008, paper OThC3.
NPL 4: K. Jinguji et al., "Synthesis of coherent two-port lattice-form optical delay-line circuit," J. of Lightwave Technol., vol. 13, no. 1, pp. 73-82.
NPL 5: M. Oguma et al., "Compact and low-loss interleave filter employing lattice-form structure and silica-based waveguide," J. of Lightwave Technol., vol. 22, no. 3, pp. 895-902.
NPL 6: K. Takiguchi et al., "Integrated-optic eight-path OFDM demultiplexer and its demonstration with 160 Gbit/s signal reception," Electronics Lett., vol. 46, no. 8, pp. 575-576.

SUMMARY OF INVENTION

Technical Problem

In a multilevel modulation signal having a higher-order multilevel number like a 16QAM modulation signal, although the amount of information transmitted with one symbol can be increased without any increase in occupied frequency bandwidth, since the spacing between signal points on a signal space diagram is narrowed, robustness to noise, that is, robustness to the degradation of a signal-to-noise intensity ratio (SNR) is disadvantageously degraded. On the other hand, in the subcarrier multiplexed signal, since the distance between signal points on a signal space diagram is not changed, robustness to the SNR degradation is hardly decreased at all; but since multiplexing is performed on a frequency axis, the occupied frequency bandwidth is disadvantageously increased. These problems are the essential problems that are deduced from Shannon's theorem on communication capacity, and it is impossible to avoid these problems. In other words, in order to ensure a certain constant communication capacity, at least either of keeping the SNR high or taking a wide occupied bandwidth is needed. Since the SNR is degraded by spontaneous emission light noise generated by an optical amplifier provided in a transmission path, as, in the transmission path, the transmission distance is longer and the number of times the optical amplifier is passed through is larger, the SNR is decreased. Hence, in terms of the efficient use of the transmission path, it is preferable to select and use these modulation formats according to the SNR of the transmission path determined by the transmission distance and the like. In other words, in a transmission path where the transmission distance is short and a high SNR can be ensured, it is preferable to use a signal format such as the 16QAM modulation format, where the occupied bandwidth is narrow though robustness to the SNR degradation is not significantly high. On the other hand, in a transmission path where the transmission distance is long and the SNR is poor, although a wide occupied frequency bandwidth is needed such as the subcarrier multiplexed signal format, it is preferable to use a signal format having highly robustness to the SNR degradation. As described above, the appropriate modulation formats are selected and used, and thus it is possible to maximize the utilization efficiency of an optical fiber.

However, the conventional modulator is configured to be specific for each modulation format, and, when the efficient use described above is performed, the modulator is disadvantageously prepared individually for each format. Moreover, when a flexible network is used in which the transmission path is dynamically switched according to the traffic state of the network, since it is necessary to replace the modulator according to the change of the length of the transmission path, the modulator dedicated for a fixed format disadvantageously cannot be capable of adapting to such a situation.

The present invention is made in view of the foregoing problems; an object of the present invention is to provide an optical modulator that supports a plurality of modulation formats with the same modulator.

Solution to Problem

To achieve the above object, the present invention provides the following measures. The basic configuration is shown in FIG. 6. The modulator of the present invention includes a distribution part 28, an optical modulator array 29 that individually modulates output light from the distribution part 28 and an aggregation part 30 that combines the output light from the optical modulator array 29. The distribution part includes an optical demultiplexing/branching switchable circuit 31 that can switch and use an optical demultiplexing function and an optical branching function. The aggregation part includes a variable combining circuit that can combine signal lights at an arbitrary ratio and/or an optical multiplexing/combining switchable circuit 32 that can switch and use an optical multiplexing function and an optical combining function.

The distribution part performs the optical demultiplexing function according to the number of carrier lights to be modulated, thereby demultiplexing the carrier light, thus the present modulator can output the signal light modulated for each wavelength, and can generate a carrier multiplexed signal. The distribution part also performs the variable branching function according to a modulation multilevel number, and adjusts a power distribution ratio to each optical modulator together with the variable combining function of the aggregation part, thus the present modulator can generate a multilevel modulation signal by an electric field synthesis. As described above, the operation of the distribution part and the aggregation part is changed, and thus it is possible to switch and generate a plurality of modulation formats in which the number of carriers and the modulation multilevel number are different.

As a specific example, the distribution part includes a variable 1×M demultiplexer/brancher configured by connecting one variable ILF or a plurality of variable ILFs in multiple stages and/or a 1×M variable FFT type interferometer and/or an ILF, a variable optical coupler and an optical switch, and includes a structure in which the ILF and the variable optical coupler are switched with the optical switch and/or a structure in which the variable optical couplers are connected in a tree structure and a 2×1 optical switch is inserted into one of the outputs of respective variable optical couplers. The optical modulator array includes a plurality of optical modulators. The aggregation part includes a structure of one or a plurality of variable optical couplers connected in an inverted tree structure, and/or a structure of a plurality of variable attenuators connected in an inverted tree structure, and/or a structure of one or a plurality of variable optical couplers and a plurality of variable attenuators connected in an inverted tree structure, and/or a structure of a single stage M×1 variable couplers, and/or a structure in which a variable M×1 demultiplexer/combiner configured by connecting one variable ILF or a plurality of variable ILFs in multiple stages, and/or an M×1 variable FFT type interferometer and/or the ILF and the variable optical coupler are switched by the optical switches. With the above configuration, the distribution part can switch between the optical demultiplexing function and the variable optical branching function, and the aggregation part can combine the signal lights from the modulators at an arbitrary ratio and/or can switch between the optical multiplexing function and the variable optical combining function.

Advantageous Effects of Invention

In the optical modulator of the present invention, a plurality of optical modulators can be used as a modulator for each carrier or as an electric field synthesis type multilevel modulator, and it is also possible to freely change a ratio between the number of carriers to be modulated and the modulation multilevel number. Hence, it is possible to support, with the modulator of the same configuration, a plurality of modulation formats, in particular, a plurality of modulation formats where the occupied bandwidth and the SNR degradation resistance characteristics are different, and it is further possible to switch dynamically these modulation formats.

BRIEF DESCRIPTION OF DRAWINGS

FIG. 8A is a graph showing a relationship between the frequency and the transmittance of each carrier light passing through each variable 1×2 ILF in a variable 1×N demultiplexing filter according to the first embodiment of the present invention, wherein the relationship is one when it is made to operate as a 4-carrier BPSK modulator and in the graph of each variable ILF, a solid line represents the transmittance of one of two outputs to an output port and a broken line represents the transmittance to the other port;

FIG. 8B is a graph showing a relationship between the frequency and the transmittance of each carrier light passing through each variable 1×2 ILF in the variable 1×N demultiplexing filter according to the first embodiment of the present invention, wherein the relationship is one when it is made to operate as a 2-carrier QPSK modulator and in the graph of each variable ILF, a solid line represents the transmittance of one of two outputs to an output port and a broken line represents the transmittance to the other port;

FIG. 8C is a graph showing a relationship between the frequency and the transmittance of each carrier light passing through each variable 1×2 ILF in the variable 1×N demultiplexing filter according to the first embodiment of the present invention, wherein the relationship is one when it is made to operate as a 1-carrier 16QAM modulator and in the graph of each variable ILF, a solid line represents the transmittance of one of two outputs to an output port and a broken line represents the transmittance to the other port;

FIG. 11 is a table organizing the operation settings of the individual elements of a branching part and a combining part and a method of modulating each carrier when each modulation format of the optical modulator (when M=4) of the present invention is generated;

FIG. 13 is a diagram showing a relationship among FIGS. 13A, 13B and 13C;

FIG. 13A is a table organizing the operation settings of the individual elements of the branching part and the combining part and the method of modulating each carrier when each modulation format of the optical modulator (when M=8) of the present invention is generated; FIGS. 13A, 13B and 13C constitute one table;

FIG. 13B is a table organizing the operation settings of the individual elements of the branching part and the combining part and the method of modulating each carrier when each modulation format of the optical modulator (when M=8) of the present invention is generated; FIGS. 13A, 13B and 13C constitute one table;

FIG. 13C is a table organizing the operation settings of the individual elements of the branching part and the combining part and the method of modulating each carrier when each modulation format of the optical modulator (when M=8) of the present invention is generated; FIGS. 13A, 13B and 13C constitute generated table;

FIG. 15 is a diagram showing a relationship between FIGS. 15A and 15B;

FIG. 15A is a table organizing the operation settings of the individual elements of the branching part and the combining part and the method of modulating each carrier when each modulation format of the optical modulator (when M=12) of the present invention is generated; FIGS. 15A and 15B constitute the table;

FIG. 15B is a table organizing the operation settings of the individual elements of the branching part and the combining part and the method of modulating each carrier when each modulation format of the optical modulator (when M=12) of the present invention is generated; FIGS. 15A and 15B constitute the table;

FIG. 16A is a detailed configuration diagram of a distribution part according to the first embodiment of the present invention;

FIG. 16B is a diagram showing a calculated transmission characteristic of a TILF 1-1 alone when an ideal directional coupler of the distribution part according to the first embodiment of the present invention is used;

FIG. 16C is a diagram showing a calculated transmission characteristic of TILFs 2-1 and 2-2 alone when the ideal directional coupler of the distribution part according to the first embodiment of the present invention is used;

FIG. 24A is a diagram showing an example of the configuration of the TILFs of the distribution part according to the first embodiment of the present invention in which the TILF is a variable coupler incorporated TILF based on the single MZI;

FIG. 24B is a diagram showing an example of the configuration of the TILFs of the distribution part according to the first embodiment of the present invention in which the TILF is a high light-distinguishing ratio version of variable coupler incorporated TILF based on the single MZI;

FIG. 32A is a configuration diagram when a single MZI optical modulator of an optical modulator array part according to the first embodiment of the present invention is used;

FIG. 32B is a configuration diagram when a phase modulator of the optical modulator array part according to the first embodiment of the present invention is used;

FIG. 32C is a configuration diagram when a nest MZI optical modulator of the optical modulator array part according to the first embodiment of the present invention is used;

DESCRIPTION OF EMBODIMENTS

First Embodiment

Basic Concept

Figure 7:
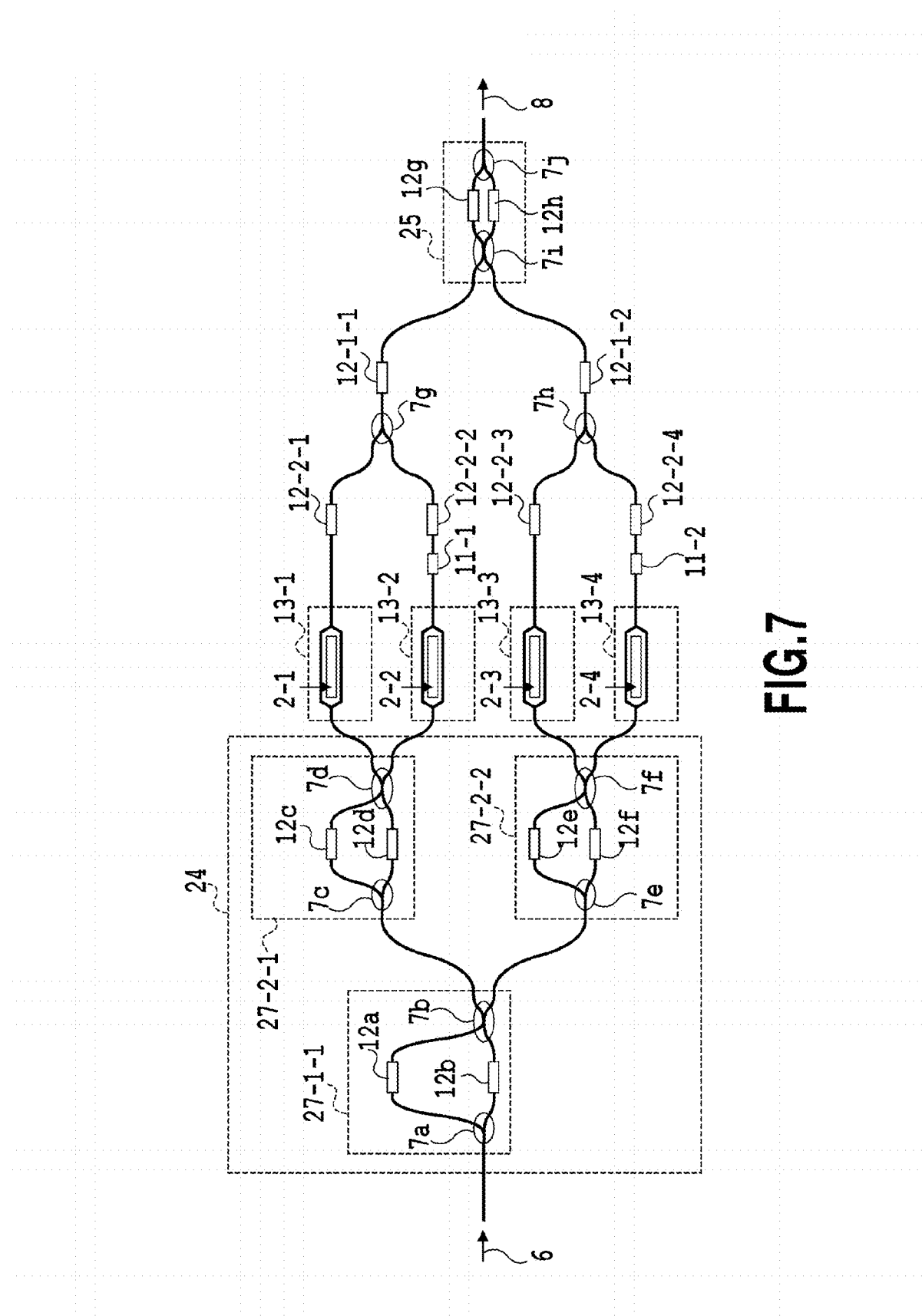
FIG. 7 is a diagram showing a configuration of a format variable optical modulator when M=4 according to a first embodiment of the present invention.

FIG. 7 shows the configuration of a format variable optical modulator according to a first embodiment of the present invention. The configuration of the modulator of the present embodiment includes a variable 1×M demultiplexing filter 24 obtained by connecting variable 1×2 ILFs in multi-stages, M phase modulators (PSK modulators) 13-1 to 13-4, M/2 2-input 1-output optical couplers 7g and 7h and a (M/2)-input 1-output variable optical coupler 25. FIG. 7 shows an example of M=4.

Variable ILFs (Tunable ILF; TILF) 27-1-1 to 27-1-2 include delay lines of an optical path length difference ΔL (here, the optical path length difference is not a waveguide length difference but a value converted into a length in a vacuum with consideration given to the refractive index of the waveguide) sandwiched between two 3 dB optical couplers 7a to 7f and variable optical phase shifters 12a to 12f, and a periodical transmission characteristic in which a free spectral range (FSR) is c/ΔL (here, c is the speed of light) is provided by known interference principles. Hence, it is possible to alternately demultiplex the light of a frequency spacing Δf=FSR/2. The absolute position of this period on the frequency axis can be shifted by adjusting the relative phase of 2 optical paths with the variable phase shifters 12a to 12f. The variable optical coupler (VC) 25 includes variable optical phase shifters 12g and 12h sandwiched between two 3 dB optical couplers 7i and 7j; a combining ratio can be set at the desired value by adjusting the relative phase of 2 optical paths with the variable phase shifters 12g and 12h. The transmission characteristic of this variable optical coupler 25 can be expressed by known interference principles as formula below. Here, $T_1$ is the transmission characteristic of light transmitted to an output port from the side of a variable optical phase shifter 12-1-1, and $T_2$ is the transmission characteristic of light transmitted to an output port from the side of a variable optical phase shifter 12-1-2. Additionally, φ is a phase difference of an interference arm sandwiched between two 3 dB optical couplers (a phase difference of light on the upper arm side with reference to light on the lower arm side), and is controlled by the variable phase shifters 12g and 12h.

$$T_1 = \frac{1}{2} \cdot (1 - \sin\phi)$$

$$T_2 = \frac{1}{2} \cdot (1 + \sin\phi)$$

Formula 2

The VC configured as described above is called an interferometer variable optical coupler; another form, for example, a configuration in which the coupling rate of a directional coupler is changed or a configuration in which waveguide structure of Y branching is changed, may be naturally used.

It should be noted that the 1-input 2-output or 2-input 1-output optical coupler, variable optical coupler (VC) and variable ILF (TILF) may be configured with the configuration of two inputs and two outputs such that unnecessary input/output ports are not connected to a main signal path. In addition, π/2 optical phase shifters 11-1 and 11-2 arranged in the subsequent stage of PSK modulators 13-2 and 13-4 can be realized by adjustment using variable optical phase shifters 12-2-1 to 12-2-4 arranged in the subsequent end of the π/2 optical phase shifter, and thus they may be omitted. Since the variable optical phase shifters 12a to 12f that are paired in the respective TILFs adjust the relative phases in the TILFs, only any one of the paired variable optical phase shifters 12a to 12f may be provided. Likewise, since the variable optical phase shifters 12-2-1 and 12-2-2 that are paired in the PSK modulators 13-1 and 13-2 adjust the relative phase of output lights of the PSK modulators 13-1 and 13-2, only any one of the variable optical phase shifters 12-2-1 and 12-2-2 may be provided. The same is true for variable optical phase shifters 12-2-3 and 12-2-4 of PSK modulators 13-3 and 13-4 and the variable optical phase shifters 12-1-1 and 12-1-2 arranged in the preceding stage of the VC 25. Since these variable phase shifters 12-2-1 to 12-2-4, 12-1-1 and 12-1-2 modify, when the relative phase of the output lights of the PSK modulators is shifted from the desired value, such shift, if such shift is not present due to the enhancement of fabrication accuracy, the application of trimming technology or the like, these variable phase shifters can be omitted. With respect to the omission and the replacement, the same is true for the subsequent embodiments and examples unless otherwise specified.

The present modulator (M=4) operates as a 4-carrier BPSK modulator, a 2-carrier QPSK modulator or a 1-carrier 16QAM modulator. Since the present invention is applicable including a case where a carrier interval is greater than a symbol rate, regardless of the OFDM system in particular, a general description will be given including a system of multiplexing a plurality of carriers; hence, unless otherwise specified, the "subcarrier" is assumed to be included in the "carrier".

The optical path length difference between the delay lines of the TILFs 27-1-1 to 27-2-2 is designed such that the FSR of the TILF 27-1-1 is twice as much as the carrier spacing Δf and the FSR of the TILFs 27-2-1 and 27-1-2 is four times as much as the carrier spacing Δf. When the present modulator is made to operate as the 4-carrier BPSK modulator, the variable optical phase shifters 12a to 12f are adjusted such that the transmission characteristic of the TILF is a characteristic shown in FIG. 8A. In other words, the TILF 27-1-1 is adjusted such that the carrier light of frequencies f1 and f3 is demultiplexed to a port on the side of the TILF 27-2-1 and the carrier light of frequencies f2 and f4 is demultiplexed to a port on the side of the TILF 27-2-2. The TILF 27-2-1 is adjusted such that the carrier light of f1 is demultiplexed to a port on the side of the PSK modulator 13-1 and the carrier light of f3 is demultiplexed to a port on the side of the PSK modulator 13-2. The TILF 27-1-2 is adjusted such that the carrier light of f2 is demultiplexed to a port on the side of the PSK modulator 13-3 and the carrier light of f4 is demultiplexed to a port on the side of the PSK modulator 13-4. In the VC 25, the variable phase shifters 12g and 12h are adjusted such that the coupling rate is 3 dB. When, in this operation state, the light of four wavelengths where the frequencies whose carrier spacing is Δf are f1 to f4 is input to the input port as carriers, four carrier lights that have been input are demultiplexed by these TILFs, are then BPSK-modulated by the four PSK modulators respectively and are uniformly combined by the 3 dB couplers 7g and 7h and the VC 25, with the result that four carrier BPSK modulation signals are output.

When the present modulator shown in FIG. 7 is made to operate as the 2-carrier QPSK modulator, the variable optical phase shifters 12a to 12f are adjusted such that the transmission characteristic of the TILF is a characteristic shown in FIG. 8B. In other words, the TILF 27-1-1 is adjusted such that the carrier light of f1 is demultiplexed to the port on the side of the TILF 27-2-1 and the carrier light of f2 is demultiplexed to the port on the side of the TILF 27-2-2; the TILFs 27-2-1 and 27-1-2 are adjusted to operate as 3 dB couplers of the carrier frequencies f1 and f2, respectively. The relative phase difference of output optical signals from the PSK modulators 13-1 and 13-2 is adjusted as necessary with the variable optical phase shifters 12-2-1 and 12-2-2 such that the relative phase difference is π/2. Likewise, output optical signals from the PSK modulators 13-3 and 13-4 are adjusted as necessary with the variable optical phase shifters 12-2-3 and 12-2-4. The individual elements are operated as described above, and thus the TILF 27-2-1, the PSK modulators 13-1 and 13-2 and the 3 dB optical coupler 7g are collectively operated as one QPSK modulator A, and the TILF 27-2-2, the PSK modulators 13-3 and 13-4 and the 3 dB optical coupler 7h are also collectively operated as another QPSK modulator B. In the VC 25, the variable phase shifters 12g and 12h are adjusted such that the coupling rate is 3 dB. The operation adjustment described above is performed, and thus the present modulator is equivalent to a configuration in which the QPSK modulators A and B are connected in parallel between the TILF 27-1-1 and the VC 25 of the 3 dB coupler. When, in this operation state, the light of two wavelengths where the frequencies whose carrier spacing is Δf are f1 and f2 is input to the input port, two carrier lights that have been input are demultiplexed by the TILF 27-1-1, are then QPSK-modulated by the two QPSK modulators A and B and are thereafter uniformly combined by the VC 25, with the result that two carrier QPSK modulation signals are output.

Figure 4A:
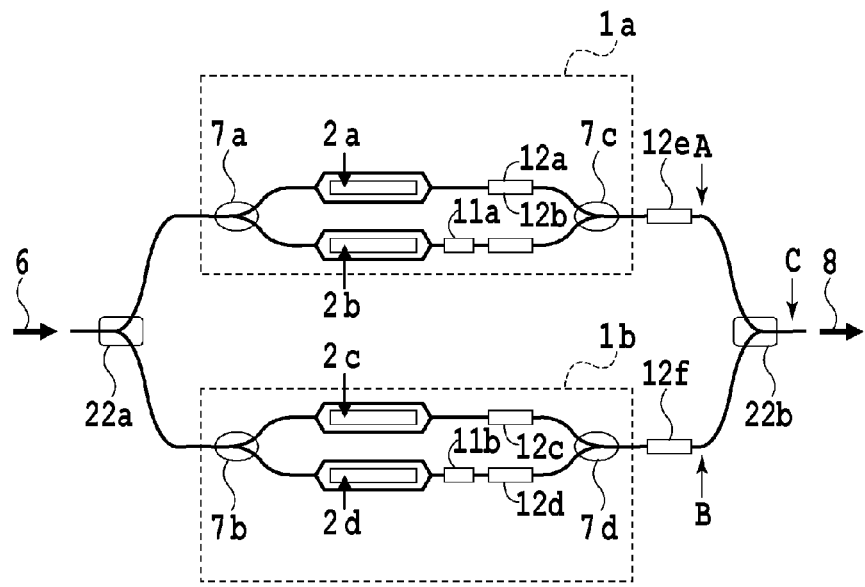
FIG. 4A is a diagram showing a configuration of a conventional 16QAM modulator.
Figure 4B:
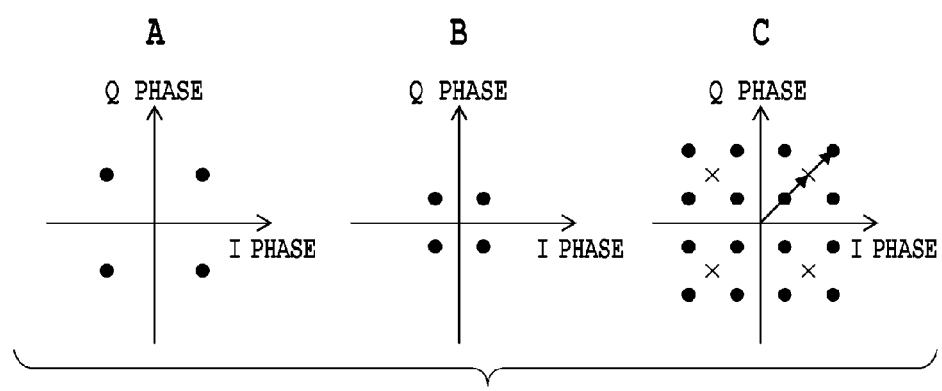
FIG. 4B is a signal constellation diagram of optical signals at respective points A to C of the waveguide of FIG. 4A.
Figure 5A:
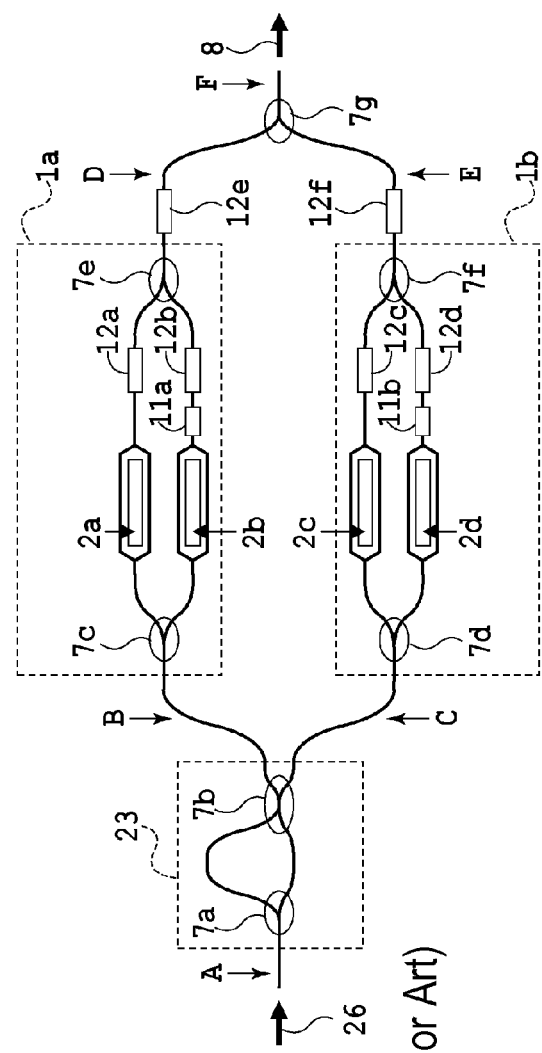
FIG. 5A is a diagram showing a configuration of a conventional 2-subcarrier multiplexing QPSK modulator.
Figure 5B:
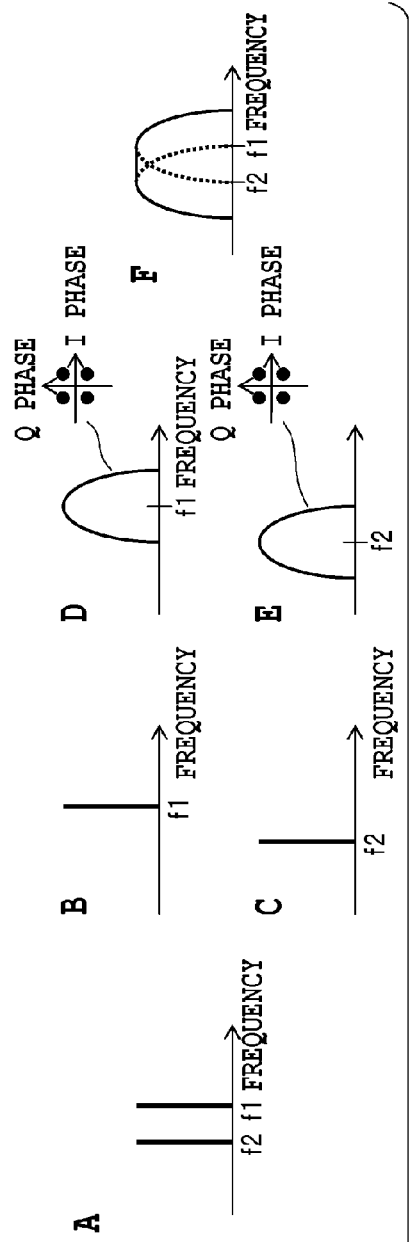
FIG. 5B is a diagram showing spectrums of optical signals at respective points A to F of the waveguide of FIG. 5A and signal constellation.
Figure 6:
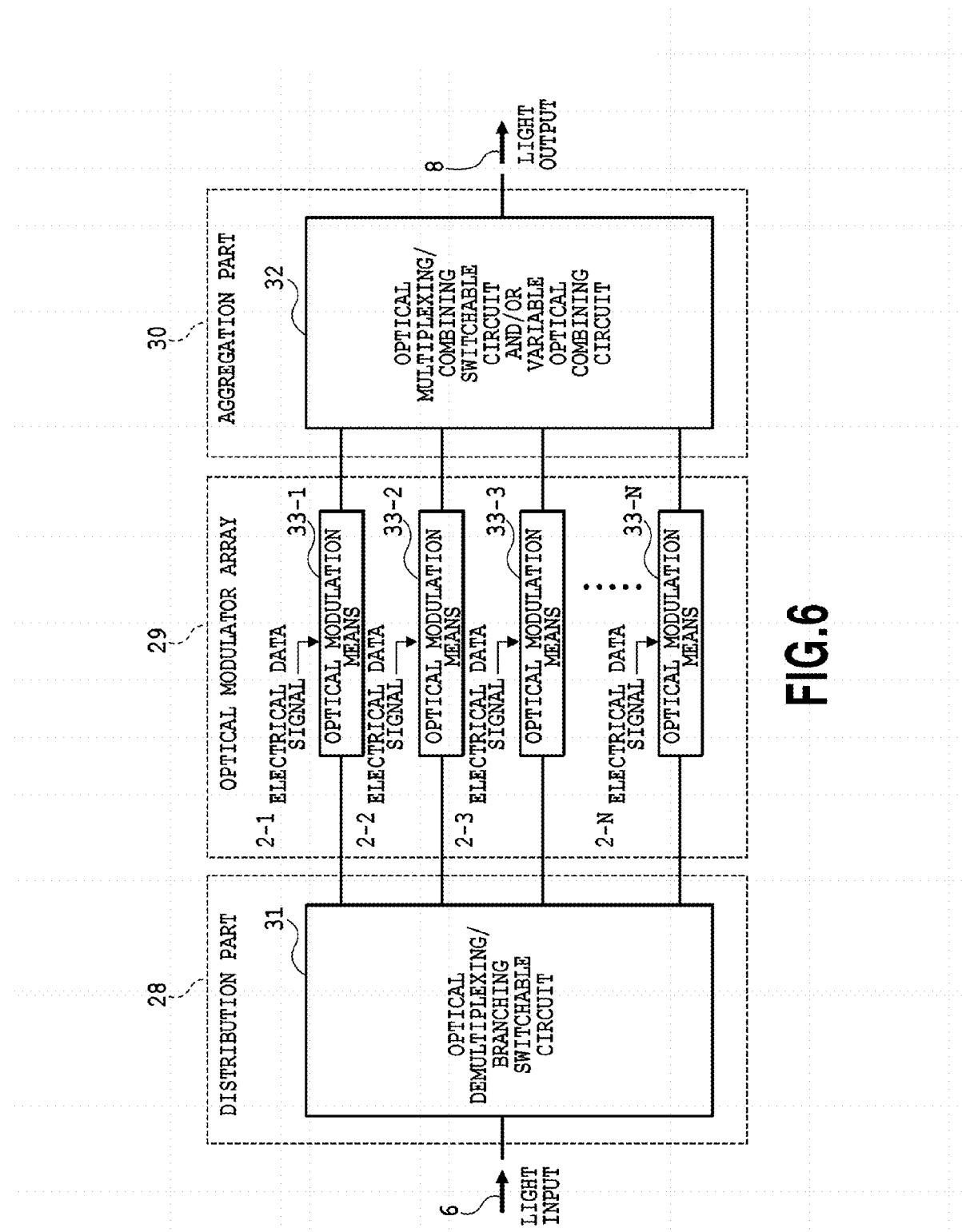
FIG. 6 is a diagram showing a basic configuration of an optical modulator of the present invention.

When the present modulator shown in FIG. 7 is made to operate as the 1-carrier 16QAM modulator, the variable optical phase shifters 12a to 12f are adjusted such that the transmission characteristic of the TILF is a characteristic shown in FIG. 8C. In other words, the TILF 27-1-1 is adjusted so as to operate as a 2:1 coupler at the carrier frequency f1, and the TILFs 27-2-1 and 27-2-2 are likewise adjusted so as to operate as a 3 dB coupler at the carrier frequency f1. In the VC 25, the variable phase shifters 12g and 12h are adjusted such that the coupling rate is 2:1. The relative phase difference of the output optical signals from the PSK modulators 13-1 and 13-2 is adjusted as necessary with the variable optical phase shifters 12-2-1 and 12-2-2 such that the relative phase difference is π/2. Likewise, the output optical signals from the PSK modulators 13-3 and 13-4 are adjusted as necessary with the variable optical phase shifters 12-2-3 and 12-2-4. The individual elements are operated as described above, and thus the TILF 27-2-1, the PSK modulators 13-1 and 13-2 and the 3 dB optical coupler 7g are collectively operated as one QPSK modulator A, and the TILF 27-2-2, the PSK modulators 13-3 and 13-4 and the 3 dB optical coupler 7h are also collectively operated as another QPSK modulator B. A combination of the TILF 27-1-1 and the VC 25 operates collectively as the 16QAM modulator. The relative phase of the output optical signal of the QPSK modulator A and the output optical signal of the QPSK modulator B is adjusted as necessary with the variable optical phase shifters 12-1-1 and 12-1-2 such that the relative phase is normally zero, that is, an IQ axis on the signal point arrangement diagram of the output optical signal of the QPSK modulator A is the same as an IQ axis on the signal point arrangement diagram of the output optical signal of the QPSK modulator B. When, in this operation state, the light of one wavelength where the frequency is f1 is input as a carrier to the input port, the carrier light that has been input is branched by the TILF 27-1-1 into 2:1, and the branched carrier lights are individually QPSK-modulated by the QPSK modulator A and the QPSK modulator B to be combined by the 2:1 coupler. Since the branching ratio/combining ratio of 2:1 described above is a ratio of electric power, the branching ratio/combining ratio in the electric field amplitude is a square ratio, that is, √2:1. Hence, since a ratio between a QPSK signal A through the QPSK modulator A and a QPSK signal B through the QPSK modulator B in the electric field amplitude is a product of a ratio in branching and a ratio in combining, the ratio is 2:1. In this way, the 1-carrier 16QAM modulation signal shown in C in FIG. 4B is output. Although, this time, the branching ratio in the TILF 27-1-1 and the coupling rate in the VC 25 are assumed to be individually 2:1, since even in another combination, for example, where the branching ratio in the TILF 27-1-1 is 4:1 and the coupling rate in the VC 25 is 3 dB, the electric field amplitude ratio between the signals through the QPSK modulators A and B is 2:1, it is possible to output the 1-carrier 16QAM modulation signal. However, since the branching and combining ratios are made to differ as described above, and thus principle loss is generally generated, it is not preferable to do so; as in the present embodiment, the same ratios are preferably used. It is to be additionally stated that the same is true for not only the combination of the 16QAM signal but also the combination of the QPSK signals in the QPSK modulators A and B.

As described above, in the modulator of the configuration of the present invention, the TILF and the VC are only adjusted, and thus it is possible to switch a plurality of modulation formats where the number of carriers and the modulation multilevel number are different like 4-carrier BPSK signals, 2-carrier QPSK signals and 1-carrier 16QAM signal. Since in the BPSK signal, 1 bit of information can be transmitted with one symbol, in 4-carrier BPSK signals, 4 bits of information can be transmitted with one symbol. Since in the QPSK signal, 2 bits of information can be transmitted with one symbol, also in 2-carrier QPSK signals, 4 bits of information can be transmitted with one symbol; since in the 16QAM signal, 4 bits of information can be transmitted with one symbol, also in the 1-carrier 16QAM signal, 4 bits of information can be transmitted with one symbol. As described above, three types of modulation signals realize the same transmission rate.

As described above, 4-carrier BPSK signals occupy a band of four carriers but are excellent in the robustness to the SNR degradation whereas the 1-carrier 16QAM signal is not excellent in the robustness to the SNR degradation but occupies only a band of one carrier. The 2-carrier QPSK signal is an intermediate between them. Hence, in the present modulator, it is possible to switch and generate, among a plurality of modulation formats where the occupied frequency bandwidth and the robustness to the SNR degradation are different as described above, the signal in the optimum modulation format with the same configuration, and it is also possible to rapidly perform the switching only by the adjustment with the variable phase shifter. Depending on the configuration of the optical phase shifter driven for adjusting the TILF and the VC, when an LN waveguide used generally in the modulator or the like is used, it is possible to realize a switching rate of a microsecond or less, and even when a quartz waveguide is used in an optical phase shifter part as described later, it is possible to realize a switching rate of about a millisecond.

In the switching described above, no change is made at all for a data signal that is a main signal. In general, when the rate of an electrical data signal (corresponding to the symbol rate) is changed, in a band or the like of a drive circuit or a modulator, high performance corresponding to the maximum rate is required. In addition, when an operation is performed at a low symbol rate so as to prevent unnecessary spectral extension in an output signal, by contrast, it is necessary to perform band limitation on the drive signal, and the configuration is complicated because an electrical filter is additionally required. In the present modulator, since it is possible to perform switching without any addition of such change to the data signal, it is possible to keep simple the configuration of peripheral circuits and to perform device design by making the band of the modulator correspond to only a constant symbol rate. Thus, it is possible to provide, at low cost, an optical modulator that supports a plurality of modulation formats.

As described above, in the modulator of the invention of the present application, since efficient transmission is performed according to the SNR, that is, the distance determined by the transmission path, it is possible to easily change the modulation signal format; moreover, since rapid switching can be performed, also in a case where a network is flexibly used such as by dynamically switching the transmission path according to the traffic state of the network, it is possible to dynamically select the optimum format.

Figure 9A:
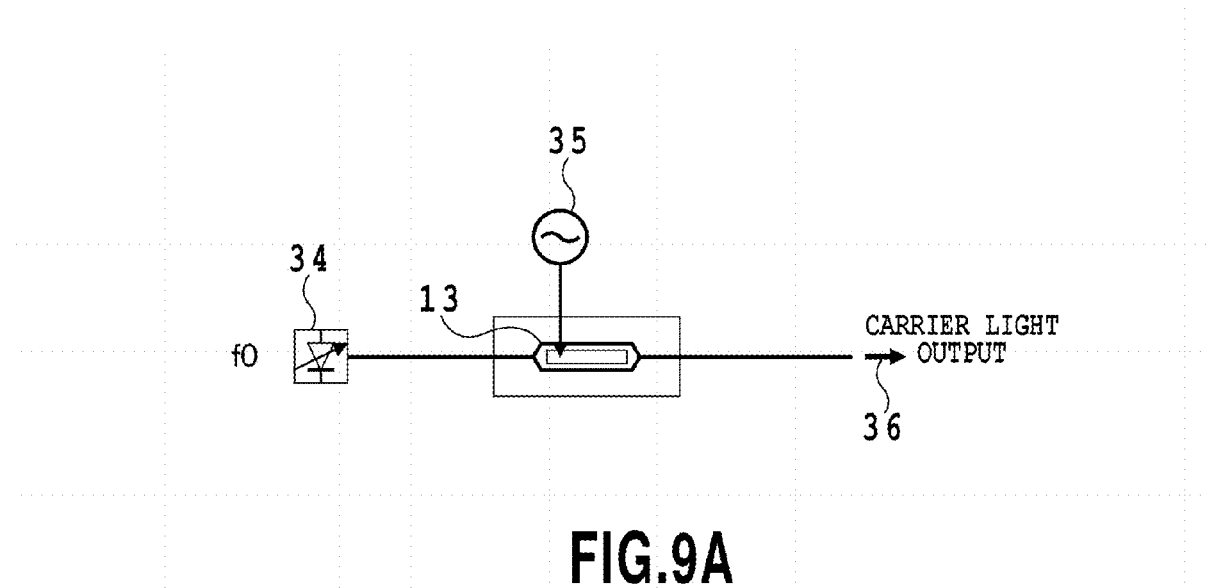
FIG. 9A is a diagram showing an example of a configuration of a multicarrier light source used in the present invention when a wavelength variable light source and a single MZI modulator are used.
Figure 9B:
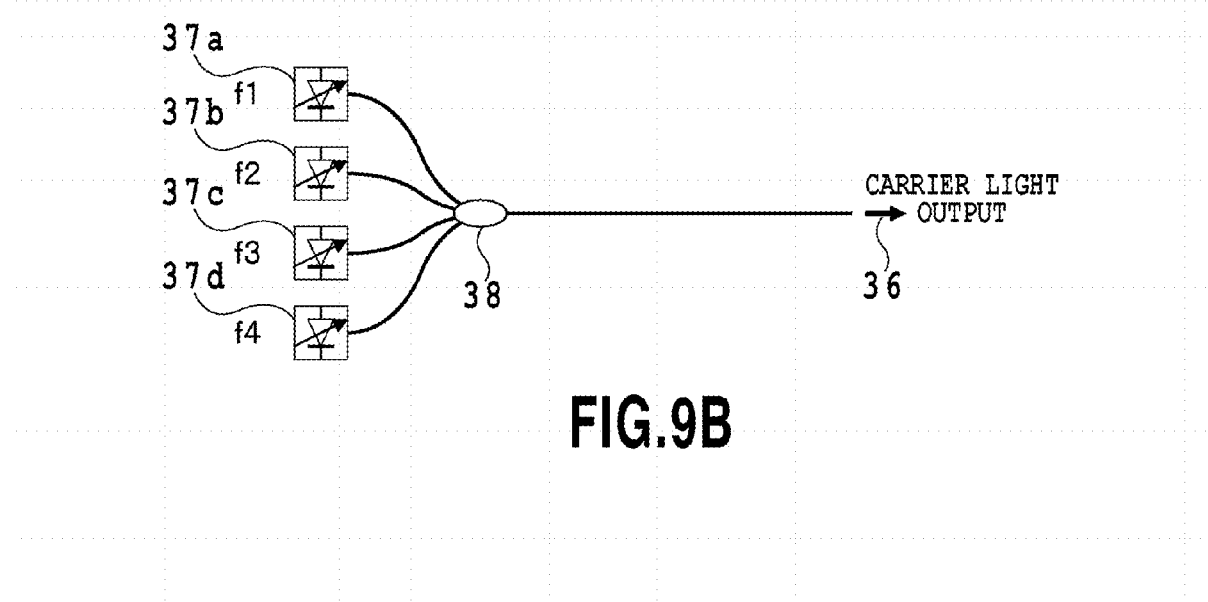
FIG. 9B is a diagram showing an example of the configuration of the multicarrier light source used in the present invention when a plurality of wavelength variable light sources and an optical coupler are used.

Here, a multicarrier light source used together with the present modulator will be described. FIGS. 9A and 9B show examples of the multicarrier light source. FIG. 9A shows a method of modulating a seed light source 34 (wavelength f0) with the single MZI modulator 13 to generate a multicarrier. In case of one carrier, without any modulation, a bias of an Open operation is simply applied, and thus the seed light source itself is used as a carrier light source f1 (=f0). In case of two carriers, at a frequency f=$\Delta$f/2, half the carrier spacing, a sine wave 35 having an amplitude about 2.3 times a V$\pi$ voltage is applied with Null bias, and thus two frequencies, f2=f0−f and f1=f0+f, are generated. In case of four carriers, at the similar frequency, a sine wave having an amplitude about 3.9 times the V$\pi$ voltage is applied with Null bias, and thus four frequencies, f4=f0−3f, f3=f0−f, f2=f0+f and f1=f0+3f, are generated. The drive amplitude is increased in this way, and thus it is possible to increase the number of carriers generated. However, when the number of carriers exceeds four, since it is impossible to generate carriers all of which have the same strength, it is necessary to provide any level adjustment mechanism.

FIG. 9B shows a simple configuration in which tunable light sources 37a to 37d are simply aligned and their outputs are collected by an optical coupler 38. By making the light sources emit light according to the necessary number of carriers, the number of carriers to be output is changed. In this configuration, it is disadvantageous to require the light sources corresponding to the maximum number of carriers but it is advantageous to cope with a case where the carrier spacing is not the same.

Figure 10:
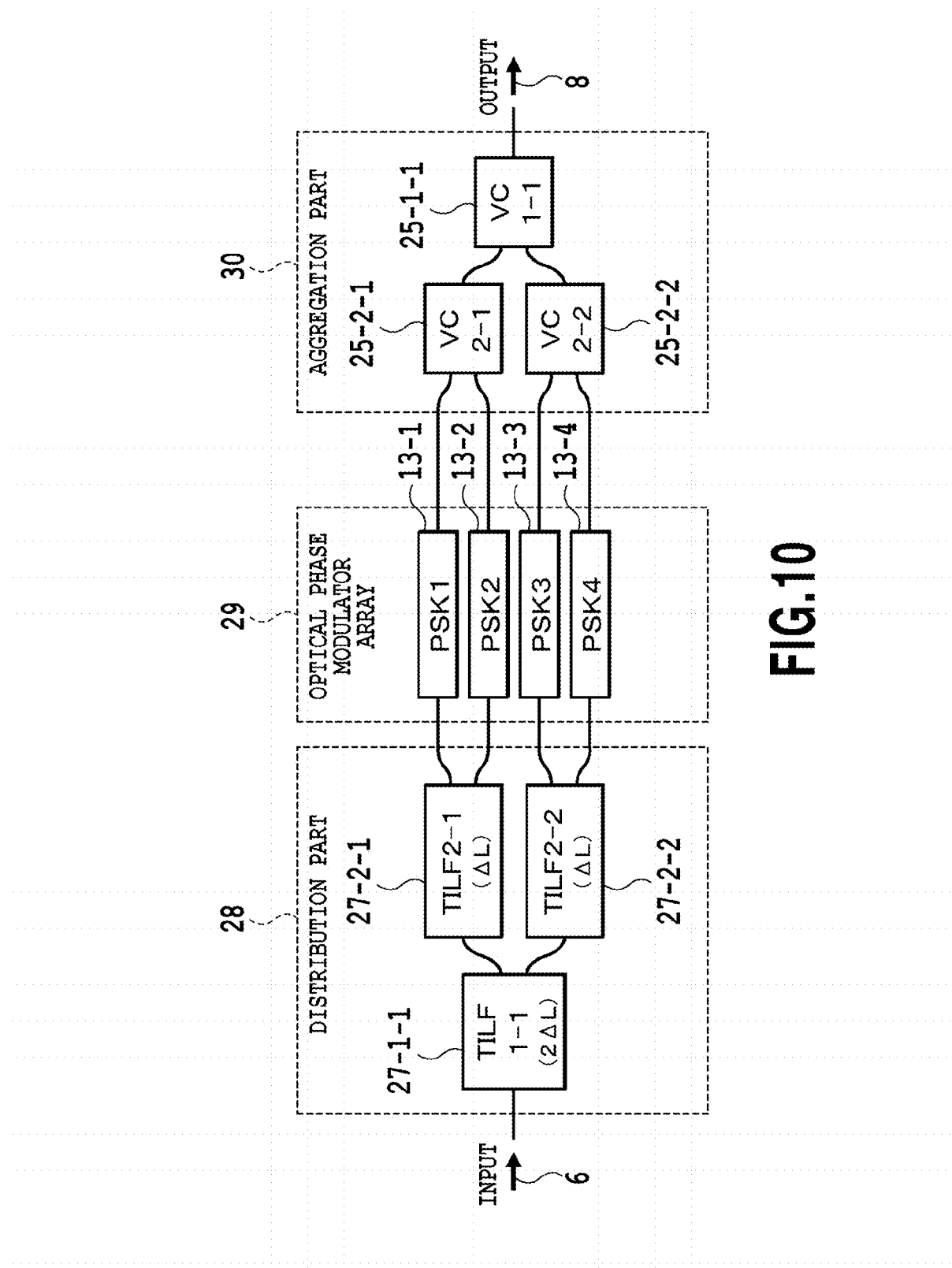
FIG. 10 is a diagram showing an abstracted configuration of the optical modulator (when M=4) of the present invention.

The configuration/operation will now be described again with reference to a diagram in which the configuration is abstracted for ease of understanding of points of other configurations of the modulator according to the present invention described above. The abstracted configuration when M=4 described above is shown in FIG. 10. The modulator of the present invention is largely divided into a distribution part 28, an optical modulator array 29 and an aggregation part 30. With respect to the optical path length difference of the respective TILFs 27-1-1 to 27-2-2, it is assumed that $\Delta L$=c/(M·$\Delta$f) (here, c is the speed of light, $\Delta$f is a carrier frequency spacing), and, as indicated between parentheses in each of the TILFs in FIG. 10, in the TILF 27-1-1, the optical path length difference is 2$\Delta L$, and in the TILFs 27-2-1 and 27-2-2, the optical path length difference is $\Delta L$. In the first embodiment, the distribution part has a configuration in which the TILFs 27-1-1 to 27-1-2 are connected in a tree structure in multiple stages, the optical modulator array is configured with the MZI PSK modulators (PSK) 13-1 to 13-4 arranged in an array and the aggregation part has a configuration in which VCs 25-1-1 to 25-2-2 are connected in an inverted tree structure in multiple stages. However, in the above description, the VCs 25-1-1 and 25-1-2 in the first stage are normally the 3 dB optical couplers 7g and 7h, respectively.

By combinations of the operations of the individual elements of the distribution part and the aggregation part in this modulator, as shown in the table of FIG. 11, it is possible to switch and generate the signals of three types of modulation formats. In the table, the names of the individual symbols TILFs 1-1 to 2-2, VCs 1-1 to 2-2 and PSKs 1 to 4 are provided using the names shown in FIG. 10. Although in the description of the first embodiment, the case where a channel (ch) in which the carrier signals are adjacent to each other is used has been discussed when two carrier QPSK signals are generated, in the present modulator, it is also possible to additionally generate two carrier QPSK signals for carrier signals at 2ch intervals in which the carrier signals are 1ch-skipped. In this case, for the frequencies f1 and f3, the TILF 27-1-1 is set to operate as a 3 dB coupler, the TILFs 27-2-1 and 27-1-2 are set to operate as a demultiplexer, the QPSK signal of the frequency f1 is generated in the PSKs 13-1 and 13-3 and the QPSK signal of the frequency f3 is generated in the PSKs 13-2 and 13-4. Specifically, when the 1-carrier 16QAM signal is generated, there are also two operation methods. The operation 1 is the operation that has been described above; in addition, the operation 2 is present. In the operation 2, for the frequency f1, the TILF 27-1-1 and the VC 24-1-1 are made to operate as a 3 dB coupler, the TILFs 27-2-1 and 27-1-2 and the VCs 24-2-1 and 24-2-2 are made to operate as a 2:1 coupler, and thus the QPSK signal of an electric field amplitude 2 is generated in the PSKs 13-1 and 13-3, the QPSK signal of an electric field amplitude 1 is generated in the PSKs 13-2 and 13-4 and the 16QAM signal is collectively generated.

As is understood from the table of FIG. 11, when the method of generating the 1-carrier 16QAM signal is only the operation 1, since the VCs 25-2-1 and 25-2-2 are made to operate only as 3 dB couplers, as in the configuration of the first embodiment, a normal 3 dB fixed coupler may be used. On the other hand, in the case of only the operation 2, since the VC 25-1-1 operates only as 3 dB coupler, the normal 3 dB fixed coupler may be used.

Although in the table of FIG. 11, only the case where all the PSK modulators are driven is shown, it is naturally possible to use part of the PSK modulators driven. Specifically, it is also possible to generate the 1-carrier BPSK signal, with the operation of the modulator in a state where four carrier BPSK signals are generated, for example, by inputting the carrier light only at f1 and driving only the PSK 13-1 as the PSK modulator. Likewise, it is also possible to generate the 2-carrier BPSK signal and the 3-carrier BPSK signal. In the same concept, it is also possible to generate the 1-carrier QPSK signal. In this case, for example, it is possible to generate the 1-carrier QPSK signal, with the modulator in a state where 2-carrier QPSK signals in the adjacent ch operation are generated, for example, by inputting the carrier light only at f1 and driving only the PSKs 13-1 and 13-2 as the PSK modulator. However, in these variation operational modes, the transmission rate is naturally reduced according to the reduction of the carriers. In the subsequent embodiments, too, although not particularly illustrated, variation operational modes in which the number of carriers is reduced are included.

Figure 12:
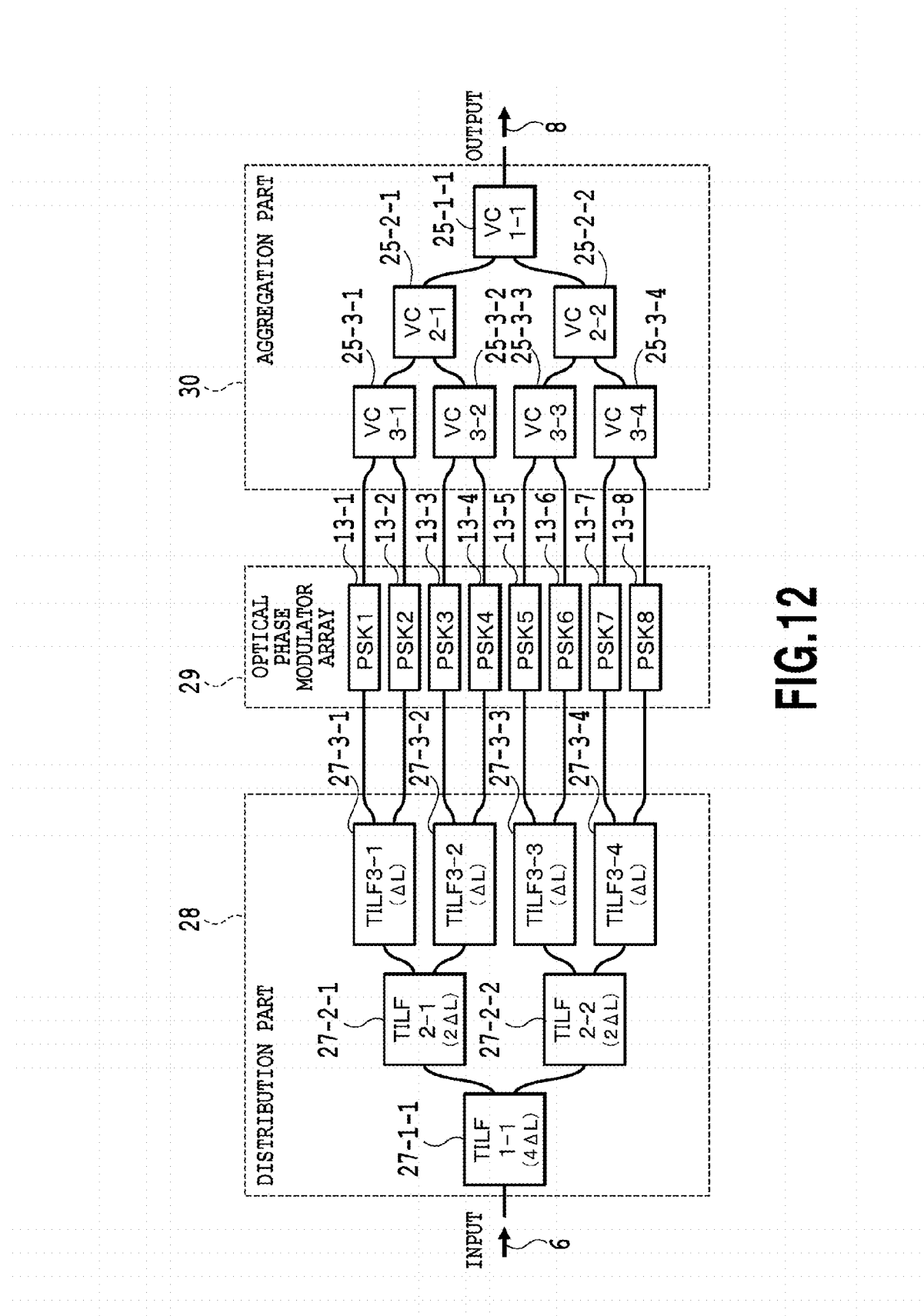
FIG. 12 is a diagram showing an abstracted configuration of the optical modulator (when M=8) of the present invention.

Then, FIG. 12 shows a configuration of the modulator according to the invention of the present application when M=8; FIGS. 13A, 13B and 13C are a table showing a list of operation states for generation of various types of signal formats. In the table, the names of the individual symbols TILFs 1-1 to 3-4, VCs 1-1 to 3-4 and PSKs 1 to 8 are provided using the names shown in FIG. 12. FIGS. 13A, 13B and 13C show one table. The concept of the configuration and the operation is the same as in the case of M=4. In the present modulator, it is possible to switch and generate four types of signals, that is, 8-carrier BPSK signals, 4-carrier QPSK signals, 2-carrier 16QAM signals and 1-carrier 256QAM signal. Also in the present configuration, the operational modes are limited, and thus it is possible to replace part of the VCs with the normal 3 dB fixed couplers.

As described above, the configuration in the case of M=$2^n$ (n=natural number of 1, 2, . . . ) can be easily generalized by extending the configuration of n=2 or 3 described above.

Second Embodiment

Case where M is not a Power of 2

Figure 14:
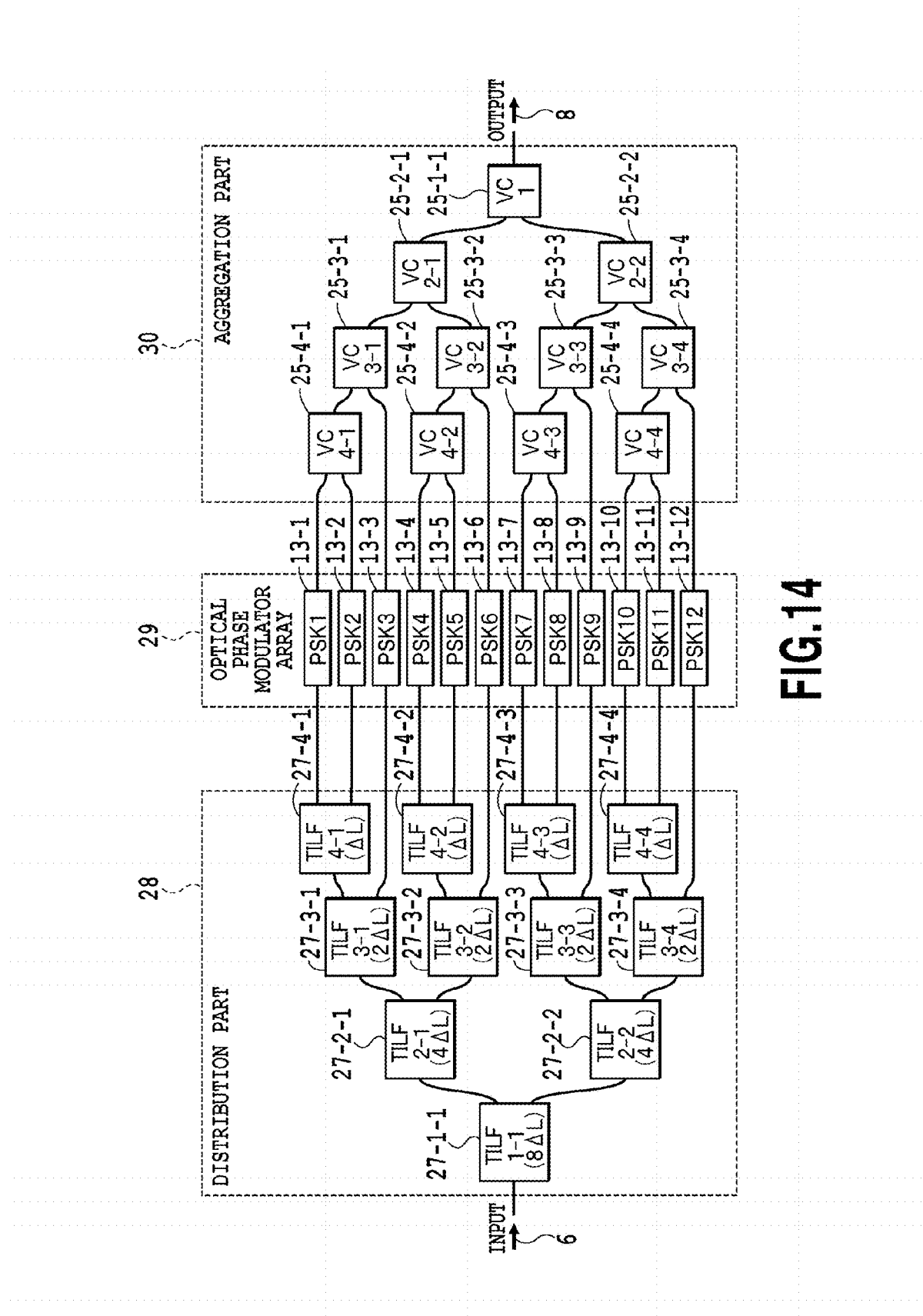
FIG. 14 is a diagram showing an abstracted configuration of the optical modulator (when M=12) of the present invention.

Then, FIG. 14 shows a configuration in a case where M is not a power of 2, for example, in a case where M=12. The present configuration is a configuration which is based on the configuration of M=16 and in which part of its constituent elements are omitted. Specifically, with respect to the TILFs 27-4-1 to 27-4-4 in the fourth stage and the VCs 25-4-1 to 25-4-4 in the first stage, when M=16, eight pieces are individually aligned whereas in the present configuration, four pieces are aligned; with respect to an optical modulation array, 16 pieces are reduced to 12 pieces. With such an arrangement in which a part of elements are reduced, the number of corresponding carriers will be reduced. Naturally, the basic unit ΔL of the optical path length difference of each TILF in the figure is a value obtained by substituting M=16 into the formula described previously. Specific examples of the operation state for generation of various types of signal formats are shown in a table of FIGS. 15A and 15B. FIGS. 15A and 15B show one table. In the table, the names of the individual symbols TILFs/VCs 1-1 to 4-4 and PSKs 1 to 12 are provided using the names shown in FIG. 14. In the present modulator, it is possible to switch and generate five types of signals, that is, 12-carrier BPSK signals, 6-carrier QPSK signals, 3-carrier 16QAM signals, 2-carrier 64QAM signal and 1-carrier 4096QAM signal. In the table, the 1-carrier 4096QAM signal is omitted. As described in the first embodiment, although in part of the formats, a plurality of operational modes may be present, in the present table, only typical operational modes are shown.

As described above, based on the configuration of M=$2^n$, part the constituent elements are omitted, and thus it is possible to configure the modulator in which M is not a power of 2.

Various Types of Configurations of the Distribution Part

Various configurations of the distribution part will now be described. Although a specific description will be given below when M=4, the same is basically true for cases except M=4.

Distribution Part Aspect 1: Simple MZI Type

FIG. 16A is a diagram showing again the details of the configuration of the distribution part according to the first embodiment (M=4) as a distribution part aspect 1. Each of the TILFs 27-1-1 to 27-1-2 has an MZI configuration in which the delay line with the variable optical phase shifters 12a to 12f is sandwiched between two 2-input 2-output 3 dB optical couplers 7a to 7f. The optical path length difference of the delay line of the TILF 27-1-1 is 2ΔL, and the optical path length difference in the TILFs 27-2-1 and 27-1-2 is ΔL. When the frequency interval of separated carriers is Δf, ΔL=c/(M·Δf) where c is the speed of light. Here, each of all optical couplers 7a to 7f has a configuration of two inputs and two outputs, and one input of the optical coupler on the input side is not connected; but the optical coupler on the input side may have a configuration of one input and two outputs. As the specific method of realizing the optical coupler, any method such as the directional coupler, the configuration of a multimode waveguide or one type of interferometer called a wavelength-independent coupler (WINC) may be used or Y branching may be used in the case of the 1-input 2-output configuration. The same is true for aspects that will be described later.

Figure 17A:
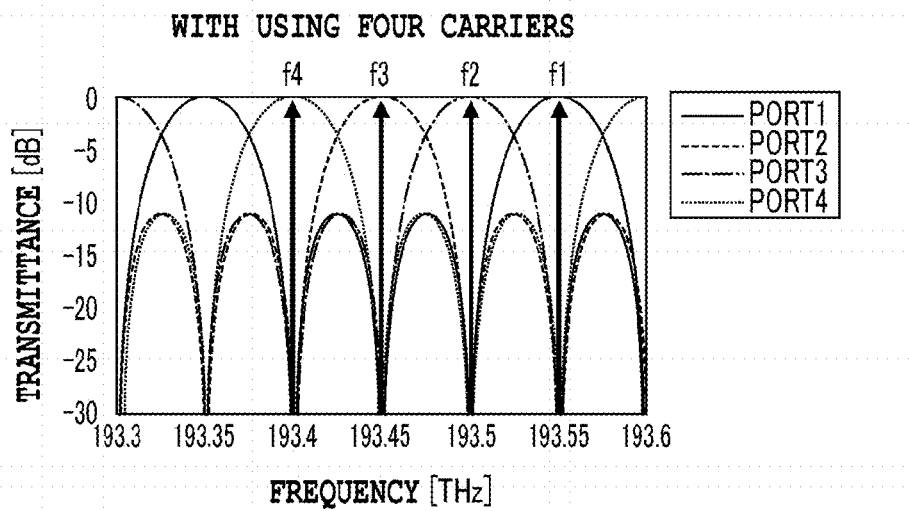
FIG. 17A is a diagram showing a calculated transmission characteristic of the entire distribution part according to the first embodiment of the present invention at the time of 4-carrier operation.
Figure 17B:
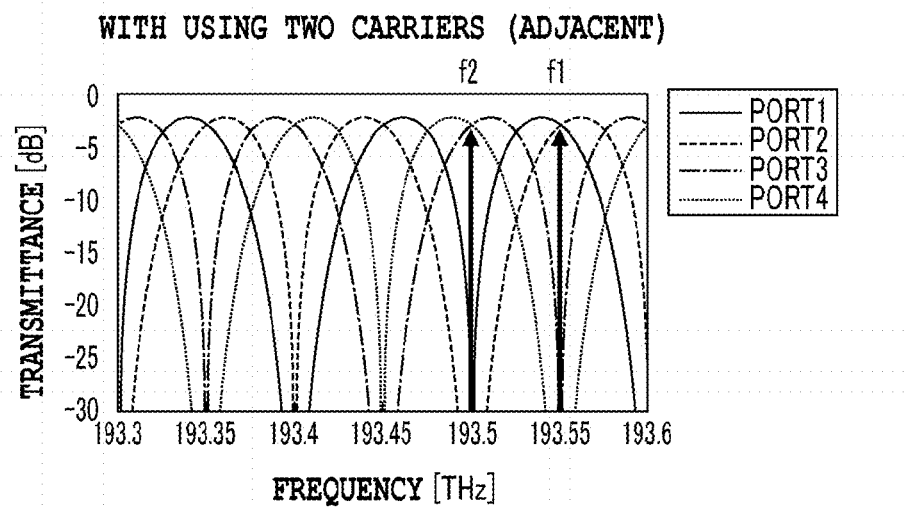
FIG. 17B is a diagram showing a calculated transmission characteristic of the entire distribution part according to the first embodiment of the present invention at the time of 2-carrier operation in which carrier signals are adjacent to each other.
Figure 17C:
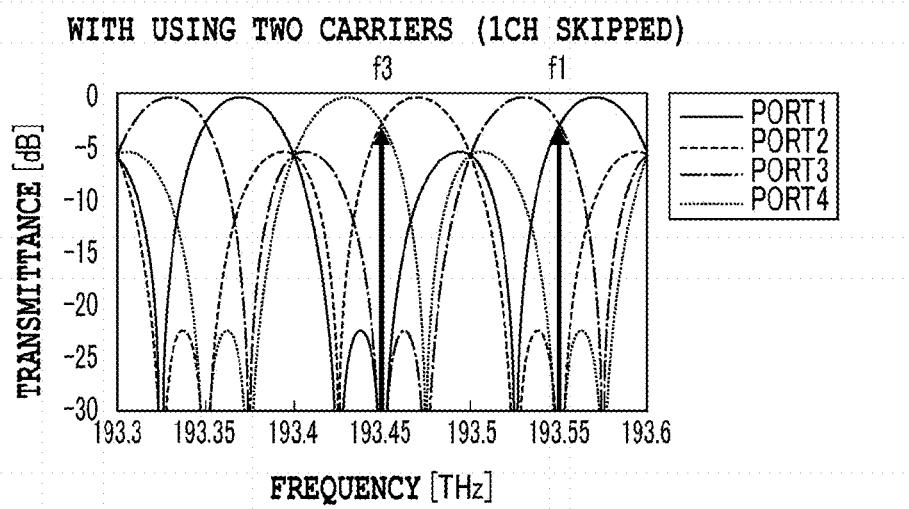
FIG. 17C is a diagram showing a calculated transmission characteristic of the entire distribution part according to the first embodiment of the present invention at the time of 2-carrier operation in which the interval of carrier signals is two channels with one channel skipped.
Figure 17D:
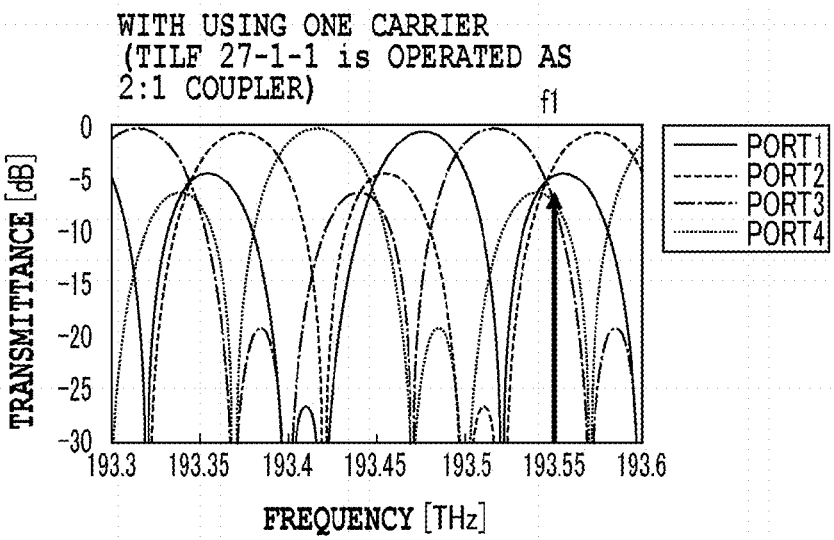
FIG. 17D is a diagram showing a calculated transmission characteristic of the entire distribution part according to the first embodiment of the present invention at the time of 1-carrier operation 1.
Figure 17E:
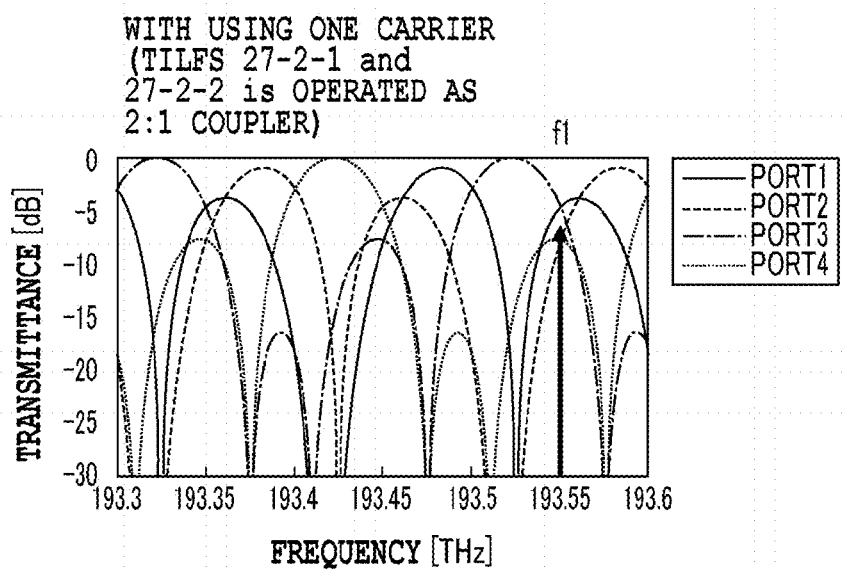
FIG. 17E is a diagram showing a calculated transmission characteristic of the entire distribution part according to the first embodiment of the present invention at the time of 1-carrier operation 2.

FIG. 16B is the calculated transmission characteristic of the TILF 27-1-1 alone when an ideal directional coupler is used. Likewise, FIG. 16C is the calculated transmission characteristic of the TILFs 27-2-1 and 27-1-2 alone. Here, each variable optical phase shifter is set such that ϕ=0, $\phi_A$=π/2 and $\phi_B$=0. FIGS. 17A to 17E are the calculated characteristic of the entire distribution part. FIG. 17A is a characteristic at the time of four carriers, and is set such that ϕ=0, $\phi_A$=π/2 and $\phi_B$=0. FIG. 17B is a characteristic in which the carrier signals are adjacent at the time of two carriers, and is set such that ϕ=0, $\phi_A$=0 and $\phi_B$=π/2. FIG. 17C is a characteristic in which the carrier signals are 1ch-skipped at 2ch spacing at the time of two carriers, and is set such that ϕ=π/2, $\phi_A$=π/2 and $\phi_B$=π/2. FIG. 17D is a characteristic in the case of the operation 1 at the time of one carrier, and is set such that ϕ=2·arctan (1/√2) ≈0.39π, $\phi_A$=0 and $\phi_B$=0. FIG. 17E is a characteristic in the case of the operation 2 at the time of one carrier, and is set such that ϕ=π/2 and $\phi_A$=$\phi_B$=π/2−2·arctan (1/√2≈0.11π. An arrow line in the figure schematically indicates the frequency position of the carrier signal used in each mode. As indicated here, it is found that in each operation state, each carrier is demultiplexed or branched at an appropriate branching ratio.

As is understood from each characteristic of FIGS. 16B, 16C and FIGS. 17A to 17E, the characteristic of the distribution part is a periodical characteristic. Hence, in the arrangement of the individual carriers, they do not necessarily need to be adjacent to each other, and may be arranged at frequencies periodically away from each other. For example, although in FIG. 17A, the carrier of f2 is arranged at 193.5 THz, the carriers may be arranged at 193.7 THz, 193.3 THz and the like away from each other at a period of 200 GHz in the present design.

Distribution Part Aspect 2: Lattice Type

Figure 18:
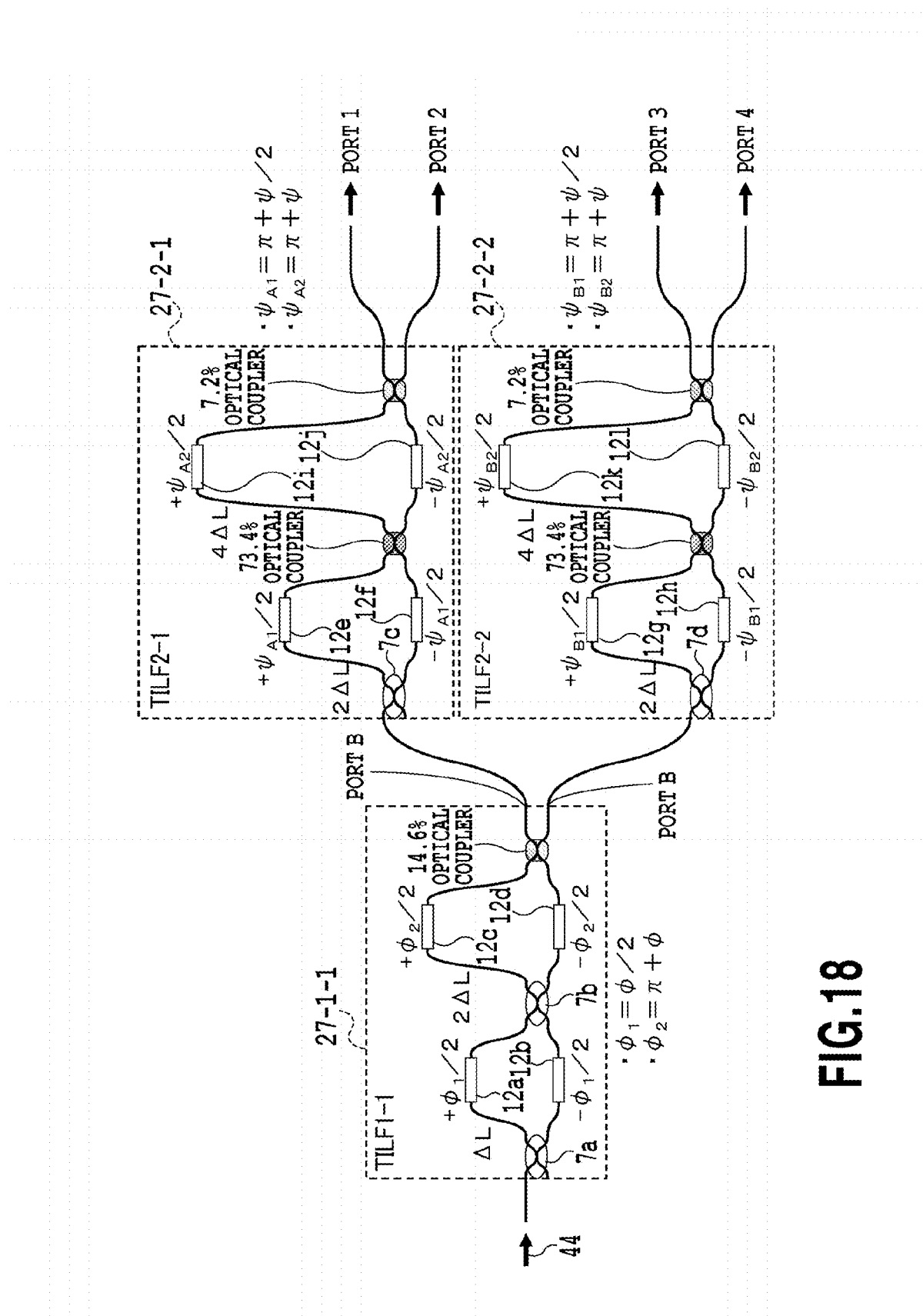
FIG. 18 is a diagram in which the TILFs of the distribution part according to the first embodiment of the present invention are formed with a lattice type interferometer.

FIG. 18 is an example where the TILFs of the distribution part are formed, as a distribution part aspect 2, with a lattice type interferometer. As disclosed in Non Patent Literatures 4 and 5, the lattice type interferometer has a configuration in which the MZIs are connected in multiple stages in the shape of a lattice; since the phase state of the MZI in each stage and the coupling rate of the coupler can be individually set, as the number of stages of the lattice is increased, the design flexibility of the transmission characteristic is advantageously increased. On the other hand, the circuit length is disadvantageously increased according to the number of stages of the lattice. Here, in order for the difference of the feature with the simple MZI type of the distribution part aspect 1 to be simply indicated, an operation will be described using an example where the number of stages of the lattice is two. As shown in the figure, the optical path length difference of the TILF 27-1-1 is $\Delta L$ in the first stage close to the input side, and is $2\Delta L$ in the second stage close to the output side; the optical path length difference of the TILFs 27-2-1 and 27-1-2 is $2\Delta L$ in the first stage, and is $4\Delta L$ in the second stage. The basic unit $\Delta L$ of the optical path length difference is the same as in the simple MZI.

Figure 19A:
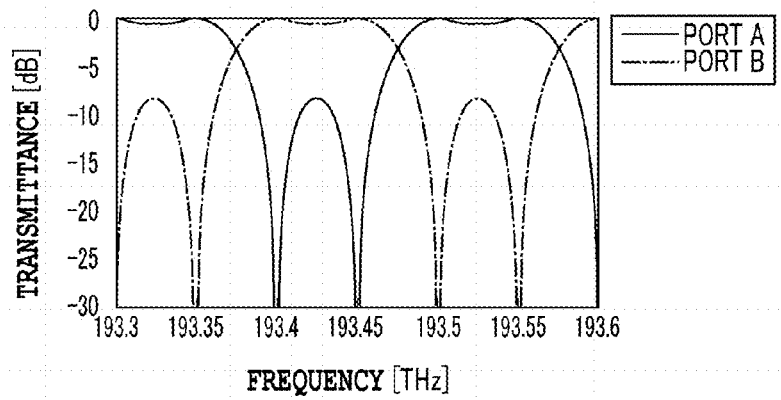
FIG. 19A is a diagram showing a calculated transmission characteristic of the TILF 1-1 alone when the configuration parameters of FIG. 18 are used.
Figure 19B:
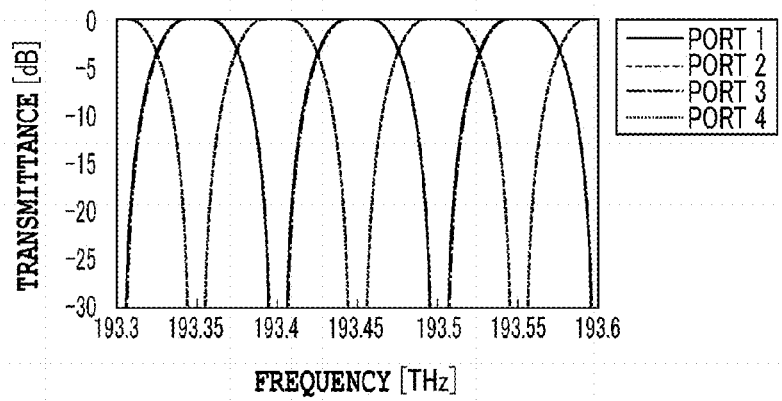
FIG. 19B is a diagram showing a calculated transmission characteristic of the TILFs 2-1 and 2-2 alone when the configuration parameters of FIG. 18 are used.

FIGS. 19A and 19B show the calculated transmission characteristics of the TILF 27-1-1 alone and the TILF 27-2-1 and 27-1-2 alone when the configuration parameters of FIG. 18 are used. Here, a setting is made such that $\phi=\pi/2$ and $\phi=2\pi$. As is understood from FIG. 19A, when the lattice type is used, the adjacent path is paired, and thus it is possible to extinguish light. In the simple MZI type, it is impossible to obtain such a characteristic, and, since light-extinguishing chs and transmission chs are inevitably and alternately aligned, the TILFs are connected in ascending order of the FSR, that is, in descending order of $\Delta L$. However, when the lattice type is used, since the light-extinguishing chs and the transmission chs can be changed, it is possible to interchange the arrangement of the connection of the TILFs. In the configuration of FIG. 18, the FSR of the TILF 27-1-1 is $4\Delta f$, the FSR of the TILFs 27-2-1 and 27-1-2 is $2\Delta f$ and the TILF having a large FSR is arranged in the first stage.

Figure 19C:
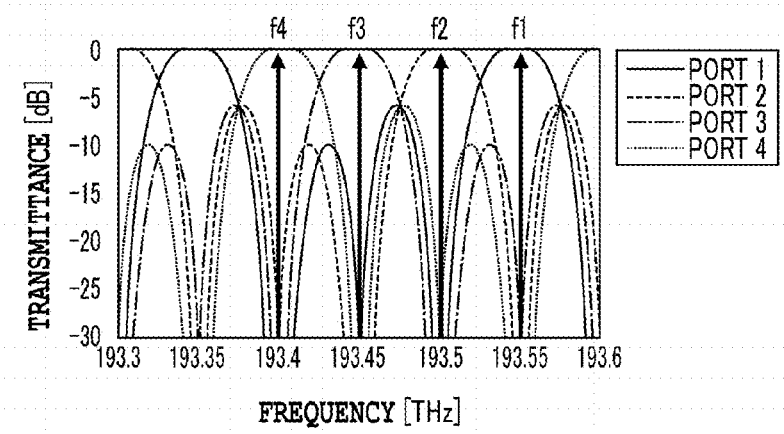
FIG. 19C is a diagram showing a calculated transmission characteristic of the entire distribution part when the configuration parameters of FIG. 18 are used, at the time of 4-carrier operation.
Figure 19D:
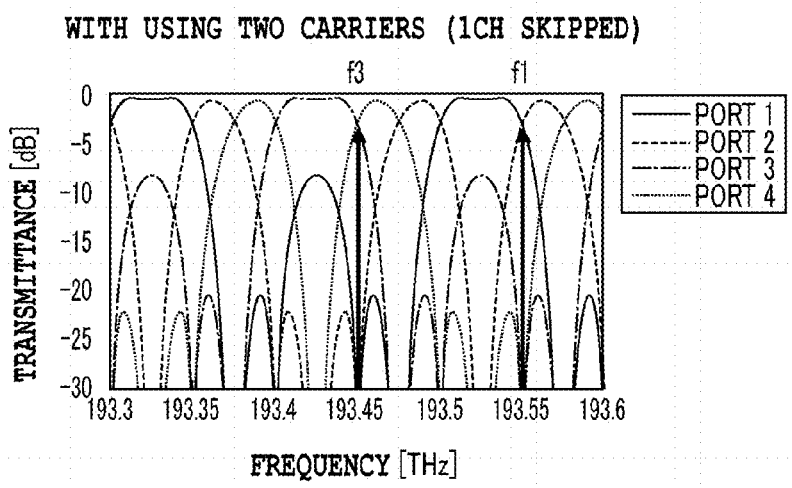
FIG. 19D is a diagram showing a calculated transmission characteristic of the entire distribution part when the configuration parameters of FIG. 18 are used, at the time of 2-carrier operation.
Figure 19E:
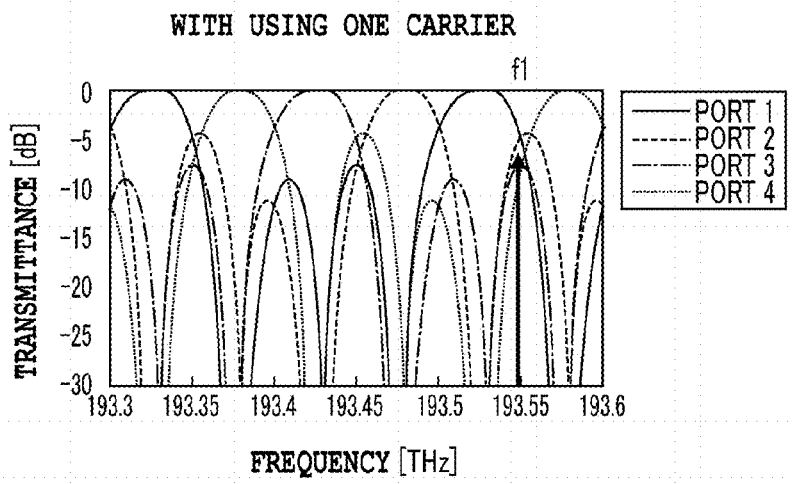
FIG. 19E is a diagram showing a calculated transmission characteristic of the entire distribution part when the configuration parameters of FIG. 18 are used, at the time of 1-carrier operation.

The calculated transmission characteristic of the entire distribution part is shown in FIGS. 19C, 19D and 19E. FIG. 19C is a characteristic at the time of four carriers and is set such that $\phi=\pi/2$ and $\phi=2\pi$, and three TILFs are made to operate as the distribution part. FIG. 19D is a characteristic in which the carrier signals are 1ch-skipped at 2ch intervals at the time of two carriers, and is set such that $\phi=\pi/2$ and $\phi=\pi$, and the TILF 27-1-1 is made to operate as the distribution part and the TILFs 27-2-1 and 27-1-2 are made to operate as the 3 dB coupler. FIG. 19E is a characteristic in the case of the operation 1 at the time of one carrier, and is set such that $\phi=0.095\pi$ and $\phi=\pi$, and the TILF 27-1-1 is made to operate as the 2:1 coupler and the TILFs 27-2-1 and 27-1-2 are made to operate as the 3 dB coupler.

Although in the present configuration, all three TILFs are configured as the lattice type, for example, a mixing manner may be naturally used such that the TILF 27-1-1 is configured as the lattice type and the TILFs 27-2-1 and 27-1-2 are configured as the simple MZI modulator.

Distribution Part Aspect 3: FFT Type

Figure 20:
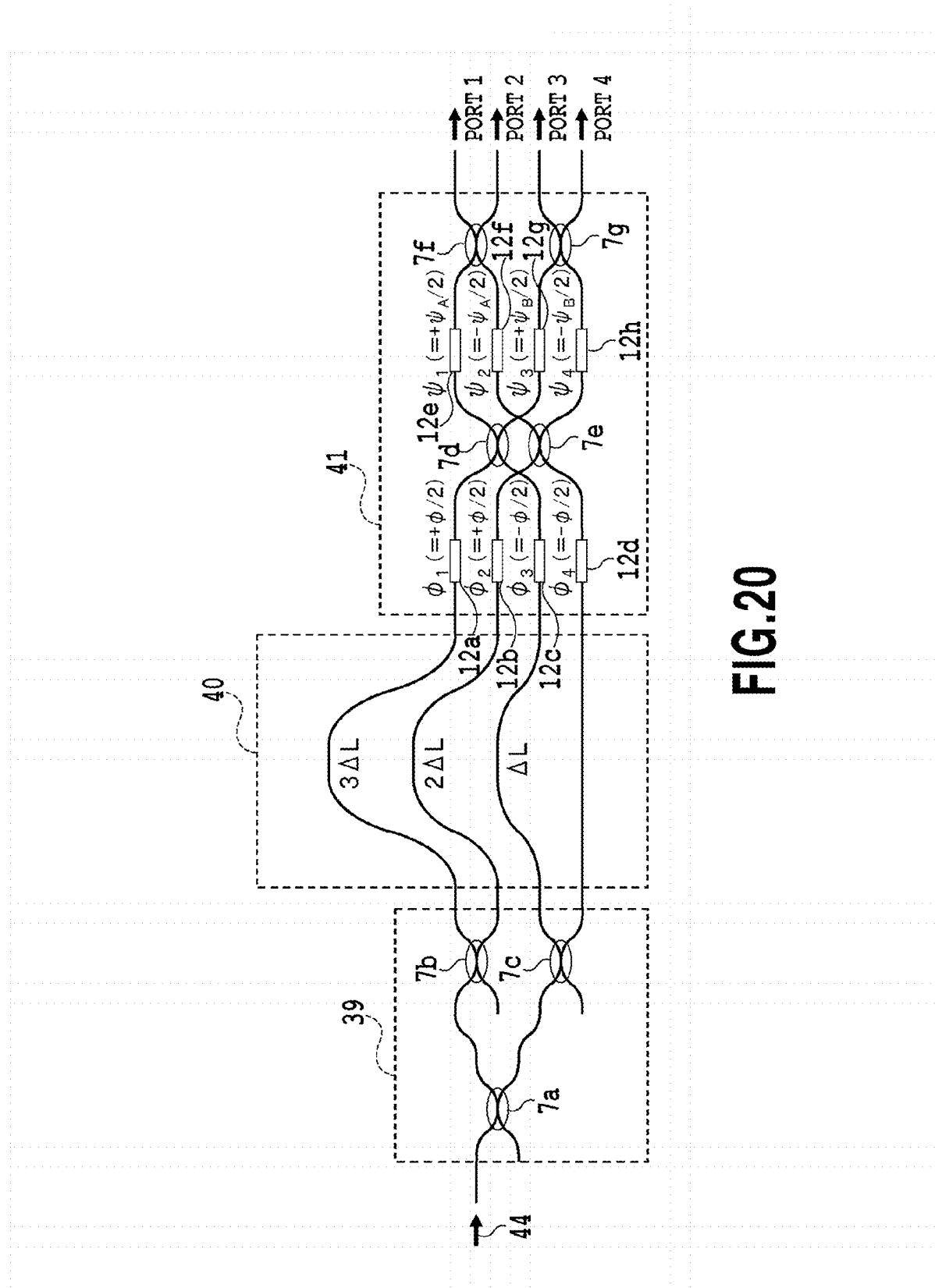
FIG. 20 is a diagram in which the distribution part according to the first embodiment of the present invention is formed with an M demultiplexing FFT type interferometer (M=4)

FIG. 20 is an example where the distribution part is configured as a distribution part aspect 3 with an M-demultiplexing FFT interferometer disclosed in Non Patent Literature 6. The FFT interferometer includes a multi-stage variable M×M coupler 41 obtained by weaving, into a 1-input M-branching coupler 39, a delay line array 40 having M delay lines each with a delay difference of $\Delta L$, the 2-input 2-output couplers 7d to 7g and the variable optical phase shifters 12a to 12h and by connecting and configuring them. Although in FIG. 20, the 1-input M-branching coupler 39 is configured by connecting the 1-input 2-output optical couplers 7a to 7c in multiple stages, it may be configured with a 1-input M-output MMI coupler and the like. The basic unit $\Delta L$ of the optical path length difference is the same as in the simple MZI.

Except M=4, that is, when $M=2^n$, the configuration of the multi-stage variable M×M coupler except n=2 is as follows. The 2-input 2-output couplers are arranged in n stages, and $2^{n-1}$ 2-input 2-output couplers are arranged in each stage. The jth optical coupler in the kth stage (k is an integer of 1 to n, j is a natural number of 1 to $2^{n-1}$) couples the Xth path and the Yth path. Here, formula below holds true.

$$X = 2^{n-k+1} \cdot \{(j-1) \text{div } 2^{n-k}\} + \{(j-1) \text{mod } 2^{n-k}\} + 1$$

$$Y = 2^{n-k+1} \cdot \{(j-1) \text{div } 2^{n-k}\} + \{(j-1) \text{mod } 2^{n-k}\} + 1 + 2^{n-k} \qquad \text{Formula 3}$$

where (j−1) div $2^{n-k}$ and (j−1) mod $2^{n-k}$ are respectively a quotient and a remainder obtained by dividing (j−1) by $2^{n-k}$. Between the individual stages, an optical phase adjuster that adjusts the relative phase of each path is arranged.

Since in the present configuration, only the delay line part in one stage is needed, the size of the configuration is advantageously reduced as compared with a configuration where the simple MZI type and the lattice type TILFs are connected in multiple stages. In particular, as M is increased, the degree of the advantage is increased. On the other hand, disadvantageously, as compared with the configuration where the TILFs are connected in multiple stages, the number of variable optical phase shifters is increased, the control is complicated to some degree and the power consumption is increased.

Figure 21A:
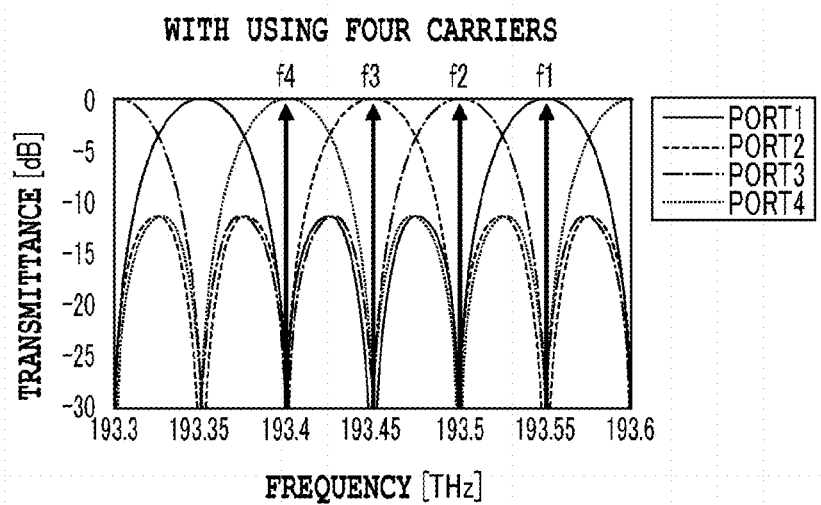
FIG. 21A is a diagram showing a calculated characteristic of the distribution part using the configuration of FIG. 20, which is a calculated transmission characteristic at the time of 4-carrier operation.
Figure 21B:
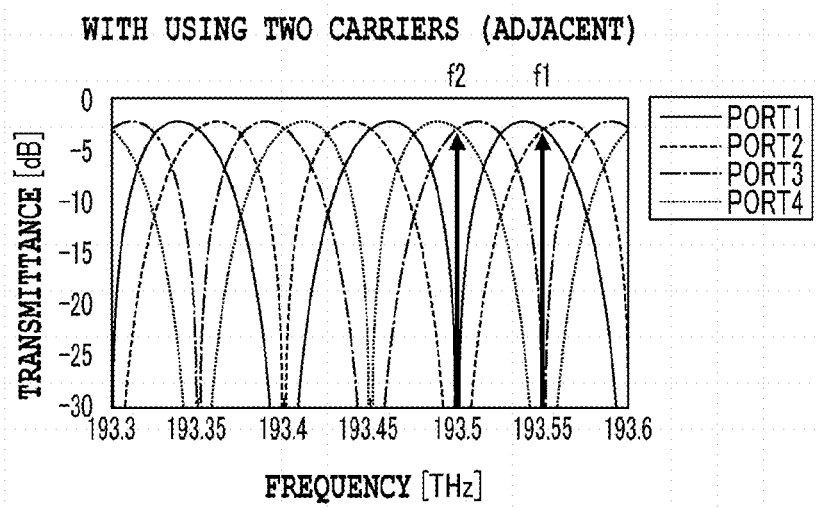
FIG. 21B is a diagram showing a calculated characteristic of the distribution part using the configuration of FIG. 20, which is a calculated transmission characteristic at the time of 2-carrier operation in which the carrier signals are adjacent to each other.
Figure 21C:
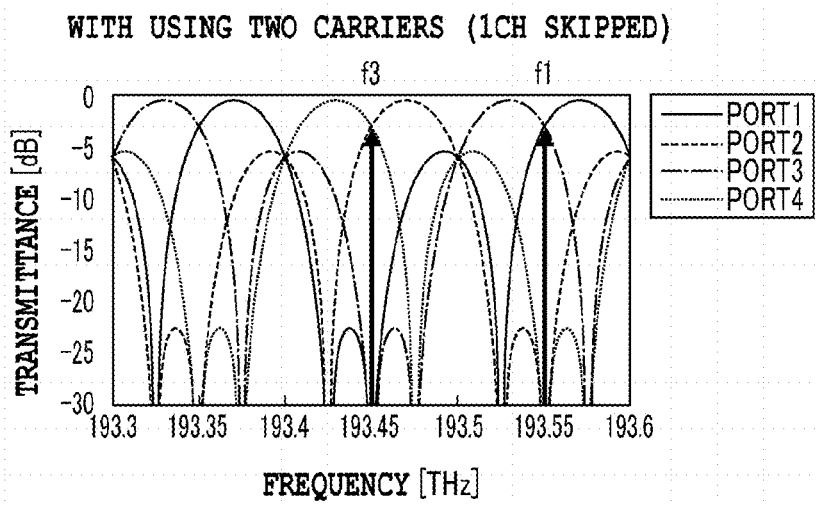
FIG. 21C is a diagram showing a calculated characteristic of the distribution part using the configuration of FIG. 20, which is a calculated transmission characteristic at the time of 2-carrier operation in which the interval of carrier signals is two channels with one channel skipped.
Figure 21D:
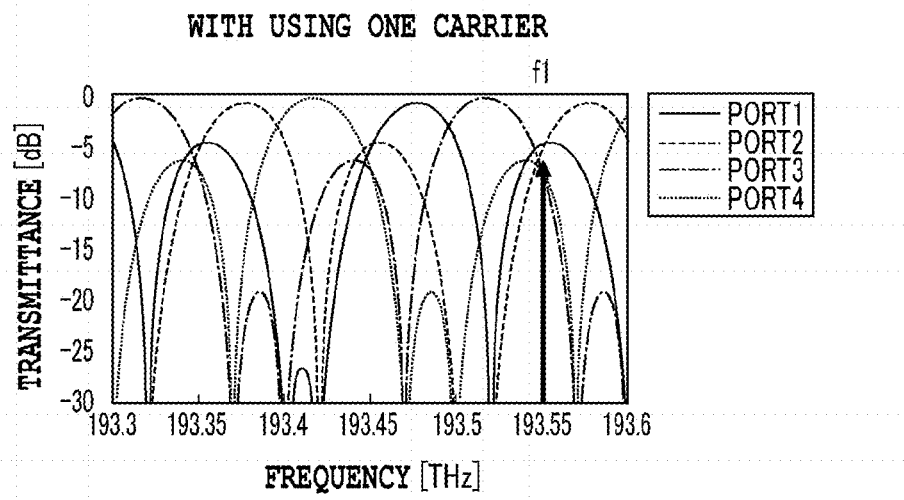
FIG. 21D is a diagram showing a calculated characteristic of the distribution part using the configuration of FIG. 20, which is a calculated transmission characteristic at the time of 1-carrier operation.

Although the present configuration appears to be different from the simple MZI type configuration, when formulas of the characteristics of elements such as the optical coupler, the delay line and the variable optical phase shifter are used to express the entire transmission characteristic with a formula, both characteristics are expressed by the same formula. Hence, it is possible to obtain basically the same characteristic as that of the simple MZI type. The calculated transmission characteristic of the present configuration is shown in FIGS. 21A to 21E. FIG. 21A is a characteristic at the time of four carriers, and is set such that $\phi=0$, $\phi_A=\pi/2$ and $\phi_B=0$. FIG. 21B is a characteristic in which the carrier signals are adjacent at the time of two carriers, and is set such that $\phi=0$, $\phi_A=0$ and $\phi_B=\pi/2$. FIG. 21C is a characteristic in which the carrier signals are 1ch-skipped at 2ch intervals at the time of two carriers, and is set such that $\phi=\pi/2$, $\phi_A=\pi/2$ and $\phi_B=\pi/2$. FIG. 21D is a characteristic in the case of the operation 1 at the time of one carrier, $$\phi = 2 \cdot \arctan\left(\frac{1}{\sqrt{2}}\right) \cong 0.39\pi \qquad \text{Formula 4}$$

and is set such that $\phi_A=0$ and $\phi_B=0$.

Figure 21E:
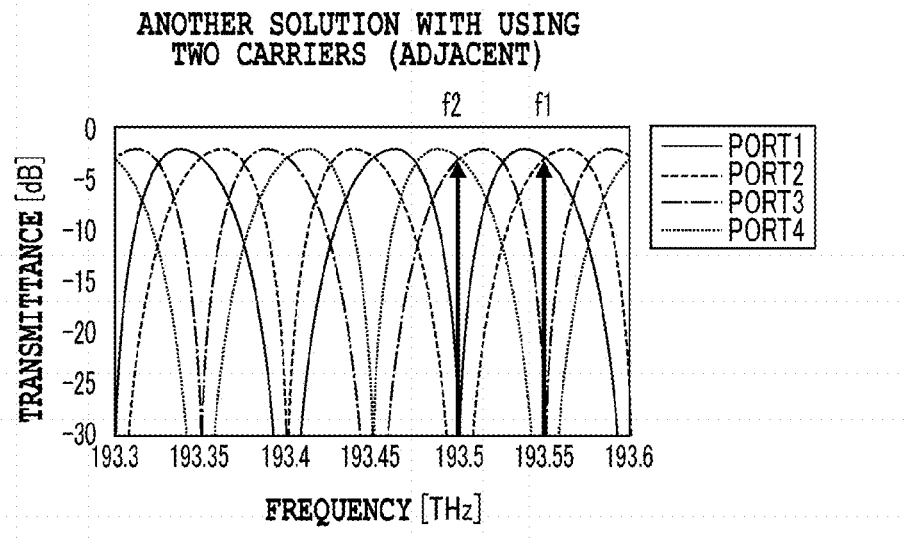
FIG. 21E is a diagram showing a calculated characteristic of the distribution part using the configuration of FIG. 20, which is a calculated transmission characteristic at the time of 2-carrier operation different from that of FIG. 21B.

Although, as described above, in the present configuration, it is possible to obtain the same characteristic as that of the simple MZI type, since the number of variable optical phase shifters is large and the degree of freedom is high, there is a plurality of drive patterns of the variable optical phase shifters for realizing the same characteristic. For example, although FIG. 21E is a calculated characteristic when it is assumed that $\phi_1=\phi_3=\phi_2=\pi/4$, $\phi_2=\phi_4=\phi_1=-\pi/4$ and $\phi_3=\phi_4=0$, it is the same characteristic as that of FIG. 21B. This is because: when the relative phase difference of each path is seen, since the phase setting $\pi/4$ of $\phi_1$ and $\phi_3$ can be transferred to $\phi_1$ and $\phi_3$, and likewise the phase setting $-\pi/4$ of $\phi_2$ and $\phi_4$ can be transferred to $\phi_2$ and $\phi_4$, the above-mentioned phase setting is the same as $\phi_1=\phi_2=\phi_3=\phi_4=\phi_1=\phi_2=0$, $\phi_3=\pi/4$ and $\phi_4=-\pi/4$ and this setting is the same as $\phi=0$, $\phi_A=0$ and $\phi_B=\pi/2$. As described above, in the present configuration, it is possible to obtain the same characteristic with the drive patterns of a plurality of variable optical phase shifters.

Distribution Part Aspect 4: Element Switch Switching Type

Figure 22:
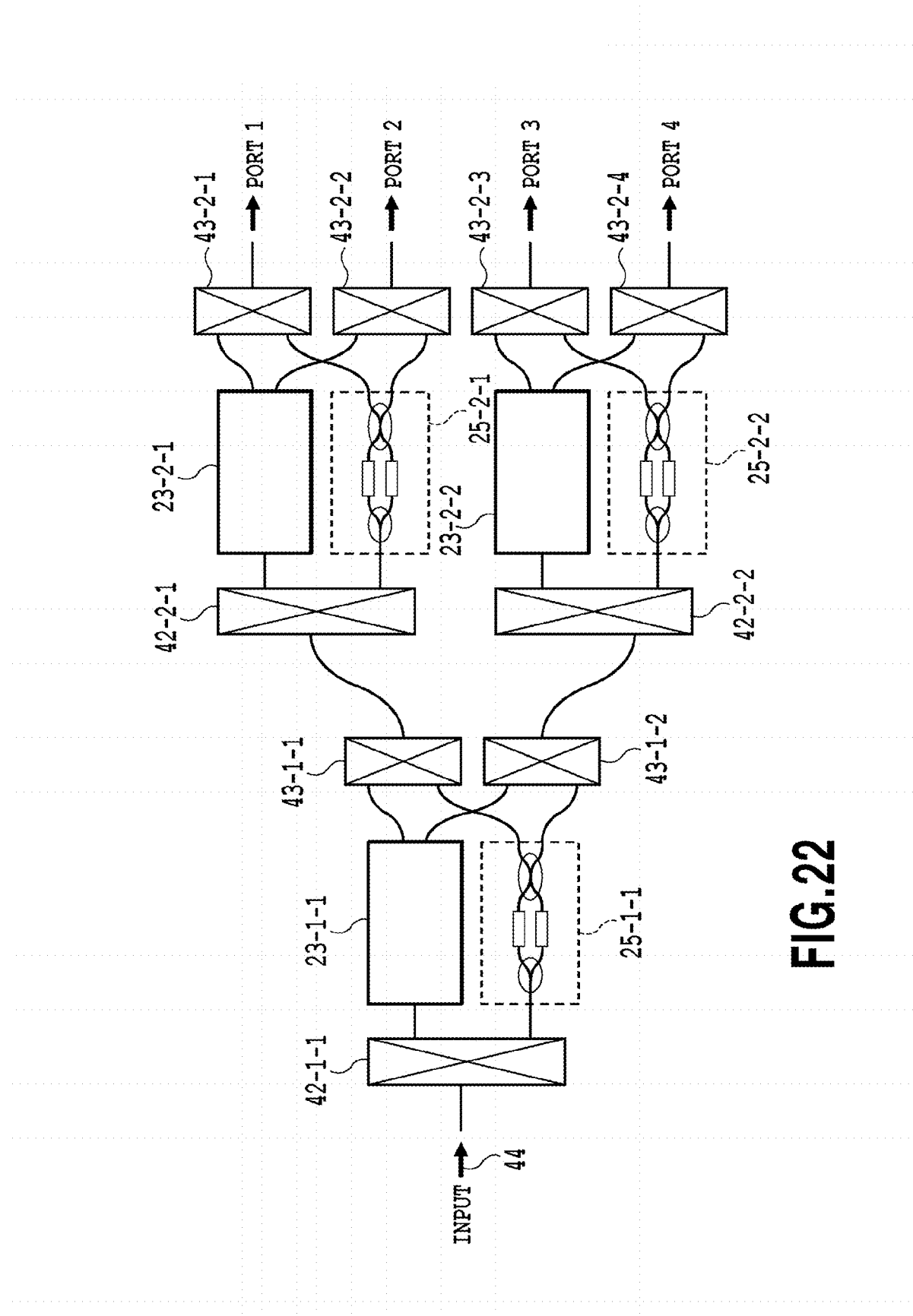
FIG. 22 is a diagram in which the distribution part according to the first embodiment of the present invention includes an interleaving filter (ILF), a variable optical coupler (VC) and an optical switch switching these.

In the above description, the example of the configuration in which the distribution part is switched and operated as a demultiplexing circuit or a variable branching ratio optical coupler by changing the interference conditions of an interferometer filter has been discussed; a configuration method in another concept different from what has been described above is now shown as a distribution part aspect 4 in FIG. 22. This figure shows the case where M=4. The present distribution part is configured to allow selection, at each place, of an interleaving filter (ILF) and a variable optical coupler (VC) with an optical switch. The ILF and the VC are individually and simply switched and used according to the operation in the table of FIG. 11, and thus the variable operation of the distribution part is realized. As with the interference filter of the distribution part aspects 1 to 3, the fine adjustment of the interference conditions is advantageously unnecessary; but, disadvantageously, the optical switch becomes necessary, which complicates the entire configuration. Note that, also in the present configuration, the VC in which the coupling rate is constantly 3 dB by the limitation of the operational mode may be replaced with a simple 3 dB coupler. In the optical switch, an on/off switching type configuration may be used or the same configuration as the variable optical coupler may be used to use the operation points of 100% transmission and 0% transmission without any use of an intermediate region.

Distribution Part Aspect 5: Multi-Input Switch Switching Type

Figure 23:
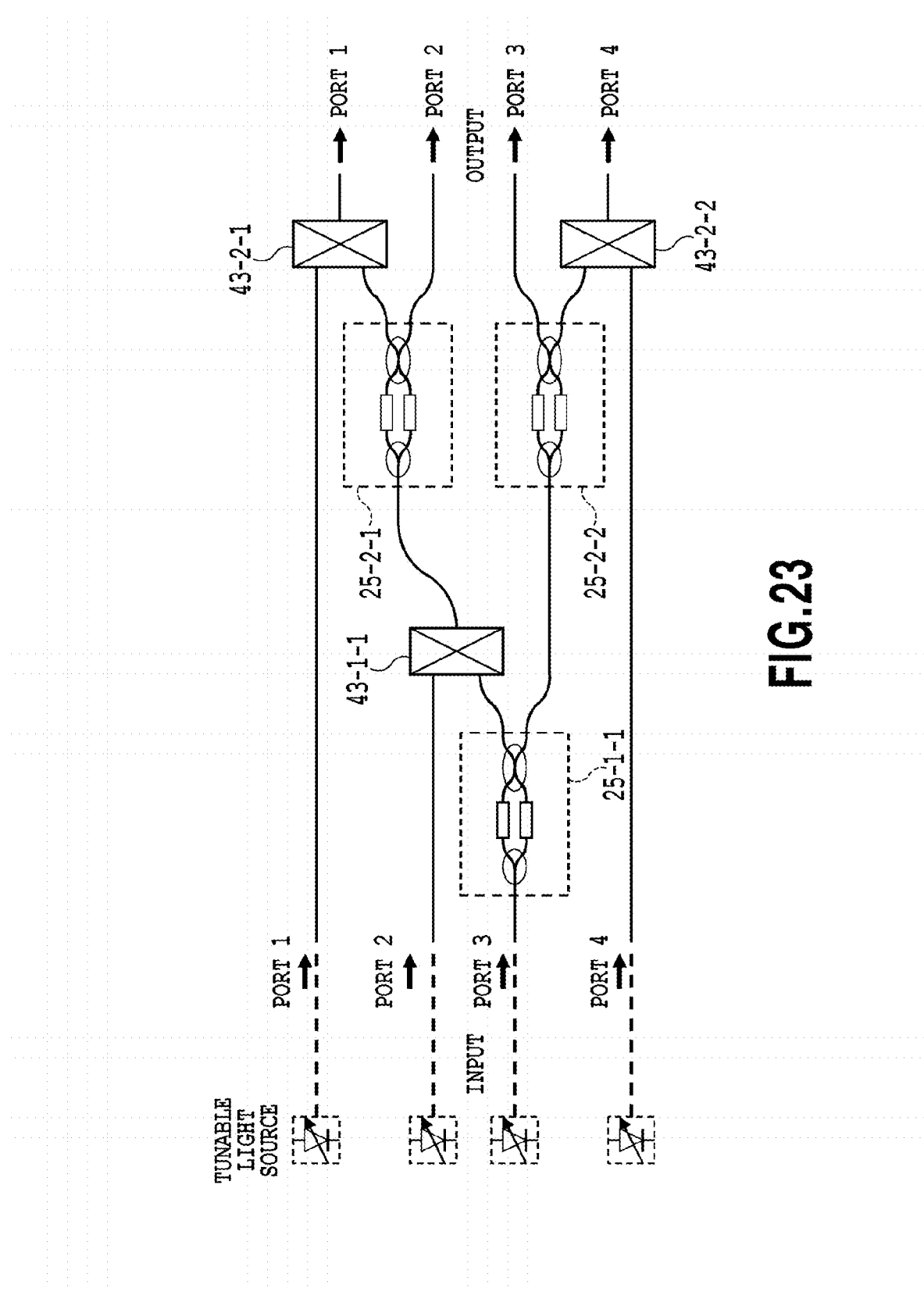
FIG. 23 is a diagram in which the distribution part according to the first embodiment of the present invention is a multi-input switch-switching type.

Yet another configuration is shown as a distribution part aspect 5 in FIG. 23. This figure also shows the case where M=4. In the present configuration, the variable optical couplers (VCs) are connected in multiple stages in a tree structure, a 2-input 1-output optical switch is inserted into one of the outputs of each VC and the port of this optical switch on the side where the VC is not connected is the input port of the distribution part. Hence, together with the input port of the VC in the first stage, an M-input (in this figure, M=4) circuit is formed. When the present configuration is used for the distribution part, the carrier light source is individually connected to these four inputs without any use of the multicarrier light source. At the time of four carriers, four carrier light sources are made to emit light at respective wavelengths, and all optical switches are switched such that the input port sides of the distribution part, that is, the respective carrier light source sides are selected. The VCs 25-1-1 and 25-2-2 are also used as path selection switches, and a setting is made such that light from the input port 3 is guided to the output port 3. Likewise, the VC 25-2-1 is also used as the path selection switch, and a setting is made such that light from the input port 2 is guided to the output port 2. At the time of two carriers, the carrier light sources at the input ports 2 and 3 are made to emit light, a setting is made such that only the optical switch 43-1-1 selects the input port side of the distribution part and a setting is made such that the optical switches 43-2-1 and 43-2-2 select the VC side. The VC 25-1-1 is used as the path selection switch, and a setting is made such that light from the input port 3 is guided to the VC 25-2-2. The VCs 25-2-1 and 25-2-2 are set to operate as the 3 dB coupler. At the time of one carrier, the carrier light source at only the input port 3 is made to emit light, and a setting is made such that all the optical switches select the VC side. Settings are made such that the VC 25-1-1 operates as the 2:1 coupler and the VCs 25-2-1 and 25-2-2 operate as the 3 dB couplers. They are made to operate as described above, and thus it is possible to switch each modulation format. Note that, also for the optical switch of the present configuration, the on/off switching type configuration may be used or the same configuration as that of the 2-input 1-output variable optical coupler is used to use the operation points of 100% transmission and 0% transmission without any use of an intermediate region.

In the present aspect, since the demultiplexer is not used, it is advantageously possible to arbitrarily set the wavelength of each carrier light, respectively. On the other hand, disadvantageously, a plurality of light sources is needed, these light sources need to be connected to a plurality of input ports respectively, and thus the configuration is complicated as the configuration including the light sources.

Distribution Part Aspect 6: Variable Coupler Incorporated Simple MZI Type

Yet another configuration will be described as a distribution part aspect 6. The overall configuration is the same as those of the distribution part aspects 1 and 2 but differs in the configuration of the individual TILFs. The configuration of the TILFs in the present aspect is shown in FIG. 24A. The TILFs of the present aspect have a MZI configuration in which the delay line with the variable optical phase shifters is sandwiched between two variable optical couplers. Although in this diagram, each variable coupler has the MZI configuration in which two 3 dB optical couplers are connected through two variable optical phase shifters, another configuration may be adopted. In this figure, the optical path length difference of 2 interference arms by the delay line is shown in the case of $\Delta L=c/(M\cdot\Delta f)$; the optical path length difference is $2\Delta L$ in the TILF 27-1-1 when M=4, and is $\Delta L$ in the TILFs 27-2-1 and 27-2-2. In a general configuration including cases except M=4, the optical path length difference of the TILF in the nth stage, that is, the TILF 27-($n$)-(X) is $M\cdot\Delta L/2^n$.

When these TILFs are made to operate as the demultiplexer, the variable optical coupler is made to operate as the normal 3 db coupler by setting the coupling rate of the variable optical couplers 25-1 and 25-2 at 3 dB. With respect to the adjustment of the variable optical phase shifter in the delay line part, the adjustment is performed in the same manner as in the distribution part aspect 1 described above, and thus the desired optical carrier is demultiplexed to outputs 8-1 and 8-2. When these TILFs are made to operate as a brancher of an arbitrary branching ratio like the 3 dB optical coupler or the 2:1 optical coupler, the variable optical coupler 1 is operated such that light is guided to only either of the short arm side or the long arm side of the delay line part, and the variable optical coupler 25-2 is operated such that the coupling rate is the desired branching ratio, for example, 3 dB or 2:1. Alternatively, the variable optical coupler 25-2 is operated such that the coupling rate is 0% or 100% coupling, and the variable optical coupler 25-1 is operated such that the coupling rate is the desired branching ratio, for example, 3 dB or 2:1. As described above, the operation of the variable optical coupler is selected, and thus these TILFs can be made to operate as the demultiplexer or the brancher of the desired branching ratio. When the branching ratio at the time of the branching operation is only 3 dB, either of the variable optical coupler 1 and the variable optical coupler 2 can be replaced with a fixed 3 dB coupler.

The present aspect appears to be an aspect obtained by combining the concepts of the configurations of the distribution part aspects 1 and 4, and the merit and the demerit also lie in the middle of these two aspects.

FIG. 24B shows a configuration obtained by further enhancing the characteristic of the present aspect. In the configuration of FIG. 24A, when the variable optical coupler 25-1 or 25-2 is made to operate as the brancher, it is operated such that 0% or 100% coupling is achieved; in general, in this type of variable optical coupler utilizing interference, due to incomplete production, it is difficult to completely operate it with 100% or 0% coupling, that is, a light distinguishing ratio remains at about 30 dB. Hence, in the configuration of FIG. 24B, in either of the short arm side and the long arm side of the delay line part, an on/off switch 55 for enhancing the light distinguishing ratio is provided. In this figure, as in the variable optical coupler, the configuration of the on/off switch is the MZI configuration in which two 3 dB optical couplers are connected through two variable optical phase shifters; but, anther configuration may be adopted.

When these TILFs are made to operate as the demultiplexer, in addition to the operation described above, the on/off switch is brought into a transmission state. When these TILFs are made to operate as the brancher of an arbitrary branching ratio, the variable optical coupler 25-1 is operated such that light is guided to the arm side where the on/off switch 55 is not provided, the on/off switch is brought into an interruption state and the variable optical coupler 25-2 is operated such that the coupling rate is the desired branching ratio, for example, 3 dB or 2:1. In the branching operation, the operation is performed such that light does not travel to the path on the side of the on/off switch; but, in the present configuration, since the travelling light is interrupted at two places of the variable optical coupler 25-1 and the on/off switch, it is possible to obtain the light extinguishing rate twice that of the configuration of FIG. 24A. When the branching ratio at the time of the branching operation is only 3 dB, the variable optical coupler 25-2 can be replaced with the fixed 3 db coupler.

Distribution Part Aspect 7: Variable Coupler Incorporated Lattice Type

Figure 25A:
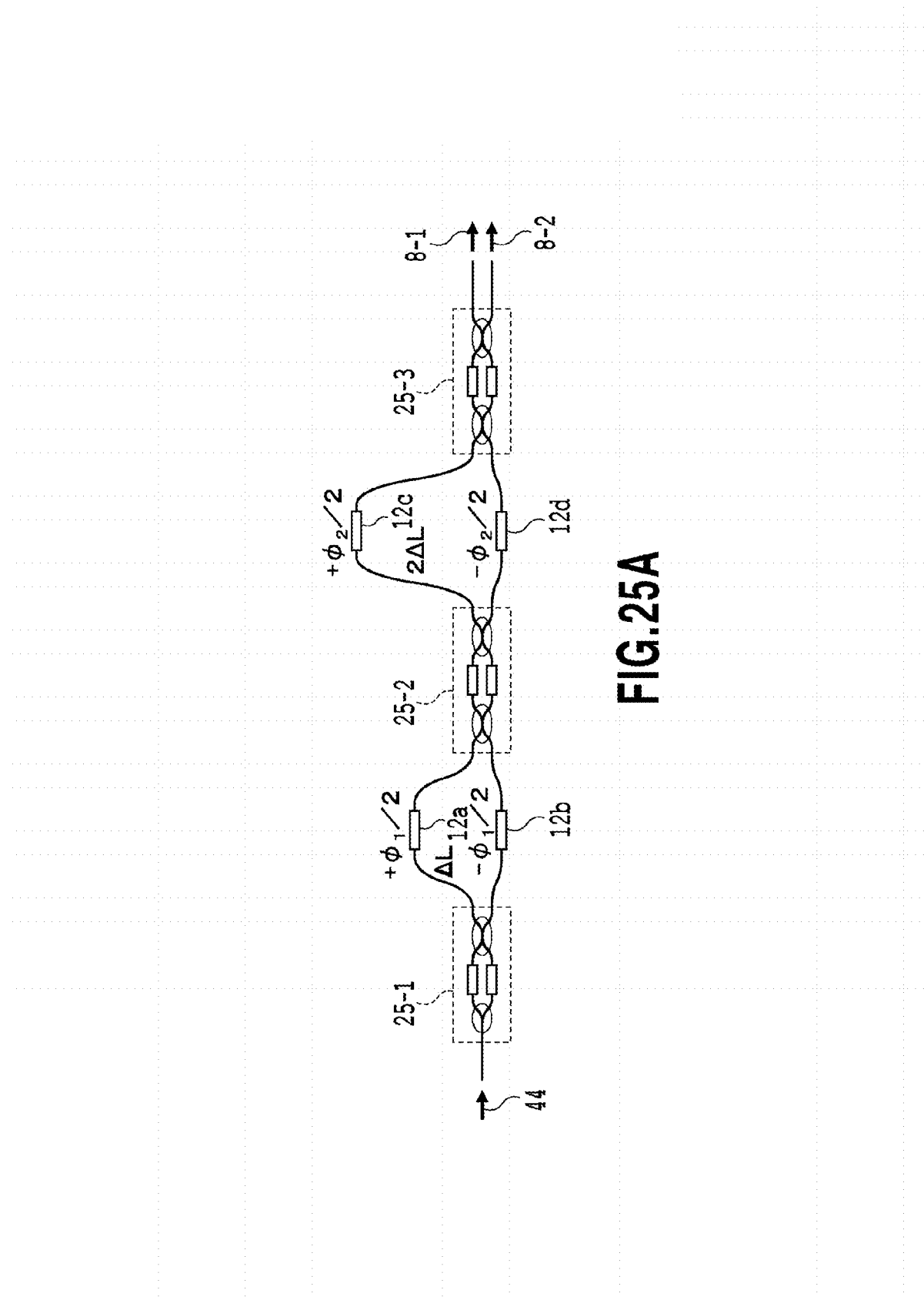
FIG. 25A is a diagram showing an example of the configuration of the TILFs of the distribution part according to the first embodiment of the present invention in which the TILF is a variable coupler incorporated TILF based on the lattice type interferometer.

Yet another configuration will be described as a distribution part aspect 7. The configuration of the TILFs in the present aspect is shown in FIG. 25A. The preset aspect is obtained by basically applying the concept of the distribution part aspect 6 to the distribution part aspect 2, and differs from the concept of the distribution part aspect 6 in that the configuration of each TILF is not a configuration based on the single MZI but is a configuration based on the lattice interferometer. In the TILFs of the present aspect, the variable optical coupler and the delay line with the variable optical phase shifter are alternately connected.

Figure 25B:
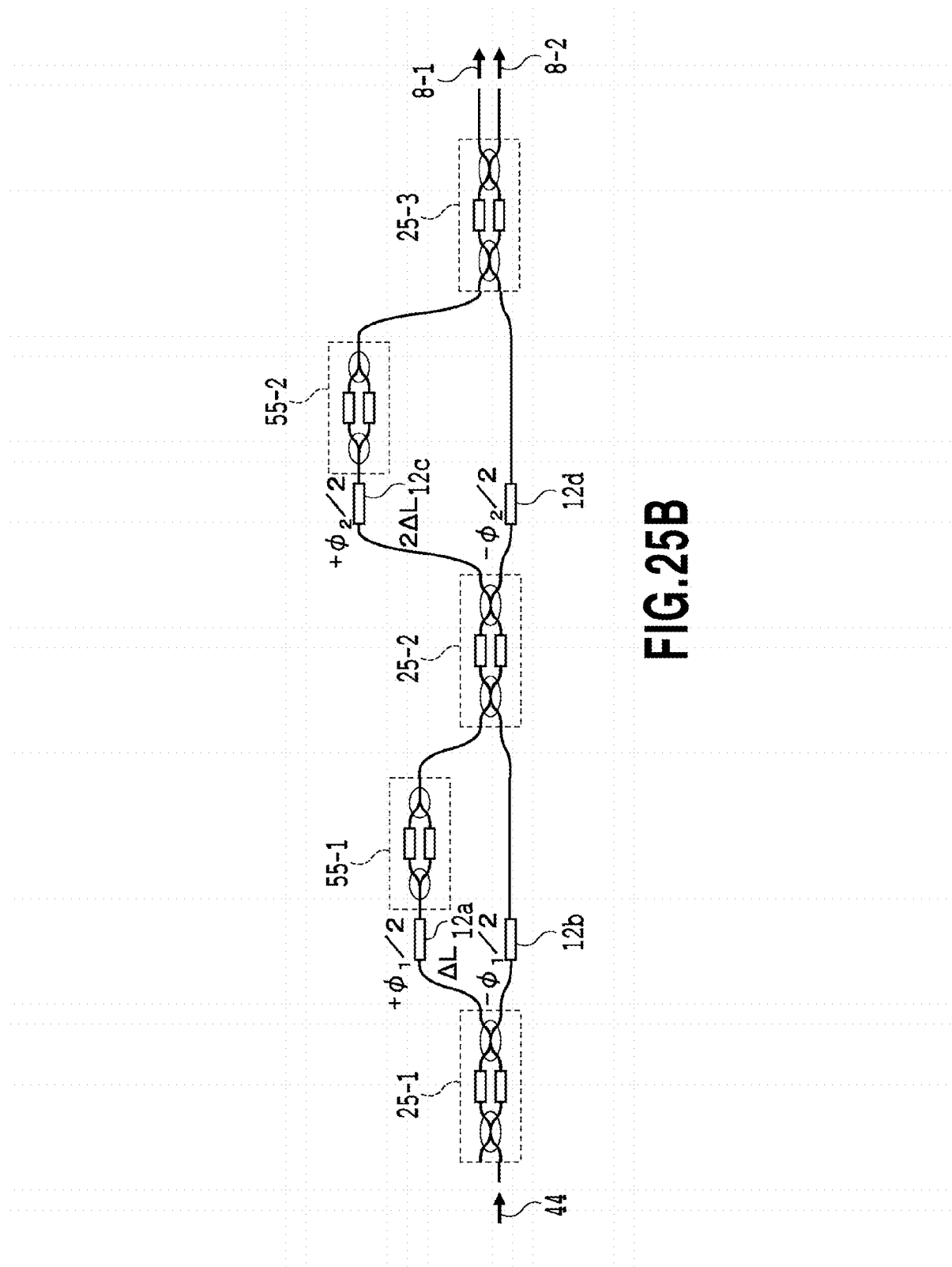
FIG. 25B is a diagram showing an example of the configuration of the TILFs of the distribution part according to the first embodiment of the present invention in which the TILF is a high light-distinguishing ratio version of variable coupler incorporated TILF based on the lattice type interferometer.

Since the preset aspect is obtained by basically applying the concept of the distribution part aspect 6 to the distribution part aspect 2, the merit and the demerit are basically the same as those described in these aspects. FIG. 25A shows a normal type; FIG. 25B shows a high performance version in which crosstalk from an unnecessary path is reduced when the branching operation is performed.

Since the concept of the operation can be basically and easily analogized from the distribution part aspects 2 and 6, the operation in the configuration of FIG. 25B alone will be briefly described here. A multiplexing/demultiplexing operation will be described on the assumption of the operation of the TILF 27-1-1 in the distribution part aspect 2; for the operation of the TILFs 27-2-1 and 27-2-2, the optical path length difference of each delay line and the coupling rate are preferably replaced and applied.

When these TILFs are made to operate as the demultiplexer, the variable optical couplers 25-1, 25-2 and 25-3 are operated such that the coupling rates are respectively 3 dB, 3 dB and 14.6%, and each of on/off switches 55-1 and 55-2 is brought into a transmission state. With respect to the adjustment of the variable optical phase shifter in the delay line part, the adjustment is performed in the same manner as in the distribution part aspect 2 described above, and thus the desired optical carrier is demultiplexed to the outputs 8-1 and 8-2. When these TILFs are made to operate as the brancher of an arbitrary branching ratio, the variable optical couplers 25-1 and 25-2 are operated such that light is guided to the arm side where the on/off switches 55-1 and 55-2 are not provided, each of the on/off switches is brought into an interruption state and the variable optical coupler 25-3 is operated such that the coupling rate is the desired branching ratio. When the coupling rate of the variable optical coupler 25-3 at the time of the demultiplexing operation is 3 dB, and the branching ratio at the time of the branching operation is only 3 dB, the variable optical coupler 25-3 can be replaced with the fixed 3 dB coupler.

Distribution Part Aspect 8: Variable Coupler Incorporated FFT Type

Figure 26:
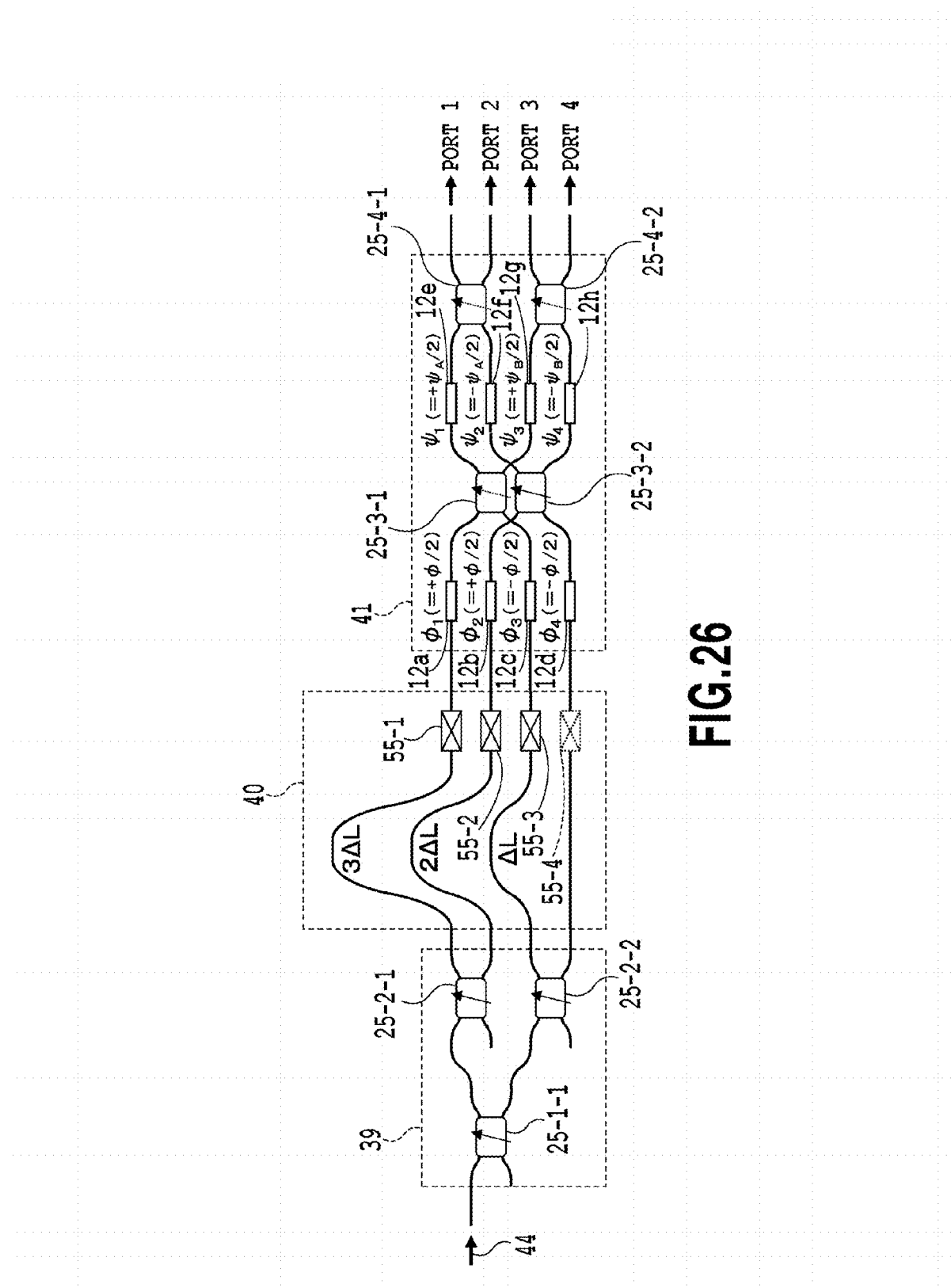
FIG. 26 is a configuration diagram when the distribution part according to the first embodiment of the present invention includes a variable coupler incorporated FFT interferometer.

Yet another configuration will be described as a distribution part aspect 8. The configuration of the present distribution part aspect when M=4 is shown in FIG. 26. The preset aspect is obtained by applying the concept of the distribution part aspect 6 to the distribution part aspect 3; in the FFT interferometer of the distribution part aspect 3, part or all of the optical couplers are replaced with the variable optical couplers. In addition, as described in the distribution part aspect 6, in order to reduce the crosstalk from the unnecessary path at the time of the branching operation, an on/off optical switch is inserted into the delay line part of the FFT interferometer. If the enhancement of the crosstalk characteristic is not needed, it is possible to omit the on/off optical switch. Since the preset aspect is obtained by basically applying the concept of the distribution part aspect 6 to the distribution part aspect 3, the merit and the demerit are basically the same as those described in these aspects.

When the distribution part of the present aspect is made to operate as a demultiplexer necessary at the time of four carriers, all the variable optical couplers 25-1-1 to 25-4-2 are operated such that the coupling rates are each 3 dB, and each of the on/off switches 55-1 to 55-4 is brought into a transmission state. With respect to the adjustment of the variable optical phase shifter in the delay line part, the adjustment is performed in the same manner as in the distribution part aspect 3 described above, and thus each optical carrier is demultiplexed to the ports 1 to 4.

When the distribution part of the present aspect is made to operate as a combination of the demultiplexer and the brancher necessary at the time of two adjacent carriers, the variable optical couplers 25-1-1, 25-3-2, 25-4-1 and 25-4-2 are operated such that the coupling rate is 3 dB, the variable optical couplers 25-2-1 and 25-2-2 are operated such that light is guided to the arm side where the delay optical path length differences are 2ΔL and 0 respectively, the on/off switches 55-1 to 55-3 are brought into an interruption state and the on/off switches 55-2 and 55-4 are brought into a transmission state. The operational state of the variable optical coupler 25-3-1 may be any of the states described above. The operation described above is performed, and thus since the ILF where the delay optical path length difference is 2ΔL includes the variable optical coupler 25-1-1, the interference arms where the delay optical path length differences are 2ΔL and 0 and the variable optical coupler 25-3-2 with the variable optical couplers 25-2-1 and 25-2-2 interposed halfway through, the variable optical phase shifter adjusting $\phi_2$ and $\phi_4$ is appropriately operated, and thus it is possible to demultiplex the optical carriers f1 and f2. The demultiplexed optical carriers f1 and f2 are respectively 3 dB-branched by the variable optical couplers 25-4-1 and 25-4-2. Hence, the same operation as the operation at the time of two adjacent carries in the distribution part aspect 3 is realized. Although it is easily found that other combinations are possible in the operation of each variable optical coupler and each on/off switch for obtaining the same overall operation results, only one example is described here.

When the distribution part of the present aspect is made to operate as the brancher necessary at the time of one carrier, the variable optical couplers 25-1-1 and 25-2-2 are operated such that light is guided to the arm side where the delay optical path length difference is zero, the variable optical couplers 25-3-2, 25-4-1 and 25-4-2 are operated such that the coupling rates are 2:1, 3 dB and 3 dB respectively, the on/off switches 55-1 to 55-3 are brought into an interruption state and the on/off switch 55-4 is brought into a transmission state. The operational state of the variable optical couplers 25-2-1 and 25-3-1 may be any of the states described above. The operation described above is performed, and thus it is possible to branch the input optical carriers at a ratio of 2:2:1:1. Hence, the same operation as the operation at the time of one carrier in the distribution part aspect 3 is realized. Also in the present operation, it is easily found that other different combinations are possible in the operation of each variable optical coupler and each on/off switch for obtaining the same overall operation results.

Note that, in the operation combination described above, since the variable optical couplers 25-3-1, 25-4-1 and 25-4-2 are constantly 3 dB-operated, it is possible to replace them with the fixed 3 dB optical couplers. Since the on/off switch 55-4 is constantly in a transmission state, it can be omitted.

Various Types of Configurations of the Aggregation Part

Various configurations of the aggregation part will now be described. Although a specific description will be given below when M=4, the same is basically true for cases except M=4.

Aggregation Part Aspect 1: Variable Coupler Type

Figure 27:
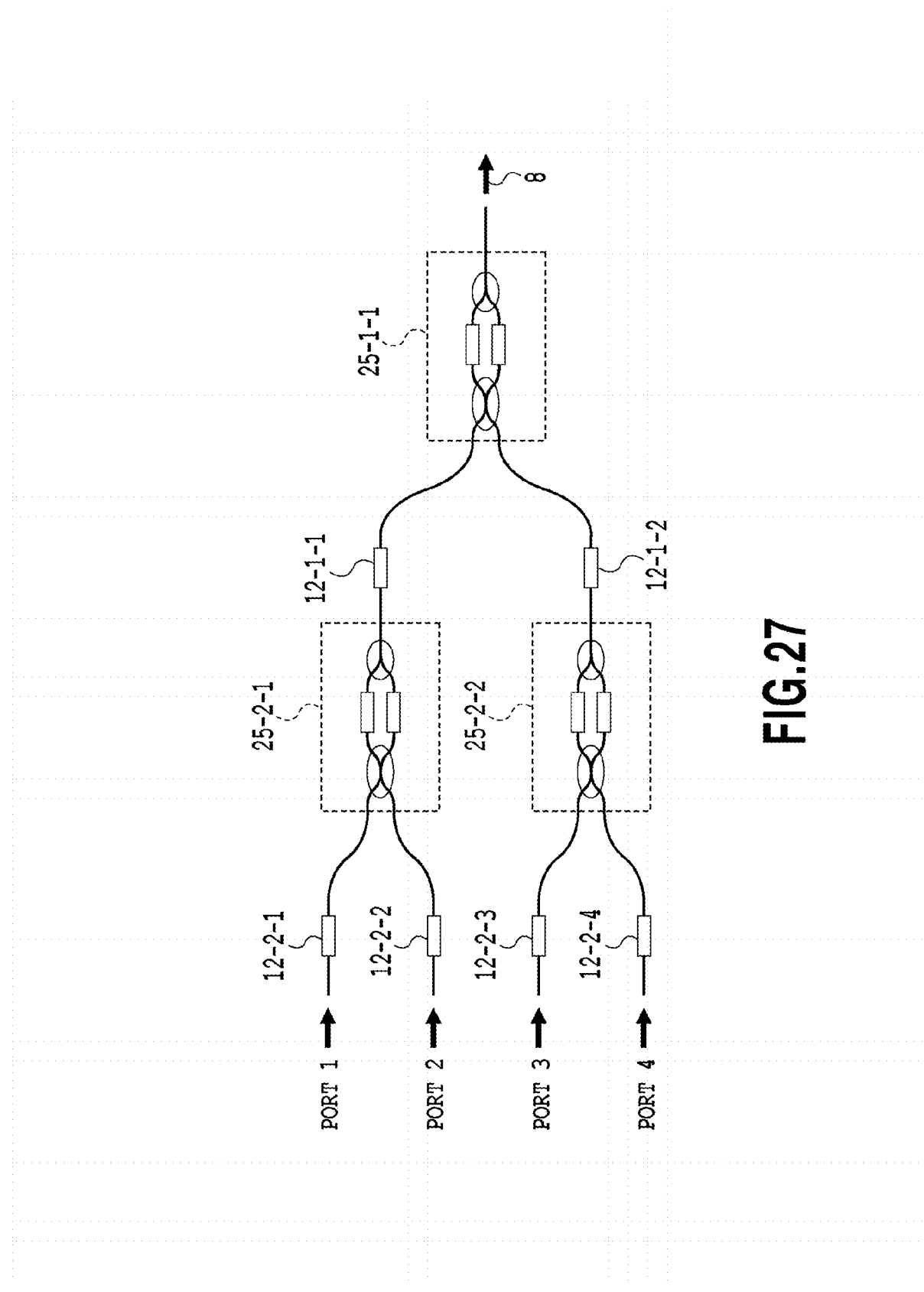
FIG. 27 is a diagram when the aggregation part according to the first embodiment of the present invention includes a variable optical coupler.

FIG. 27 is a configuration diagram of a variable coupler type aggregation part of an aggregation part aspect 1. The present configuration is obtained by generalizing the configuration of the aggregation part in the first embodiment. The variable optical couplers (VC) are connected in multiple stages in an inverted tree structure, and the variable optical phase shifter is arranged between the input port of the aggregation part and the variable coupler or between the variable couplers. In the configuration described above, light from each input port of the aggregation part can be combined in the output port at an arbitrary rate and in an arbitrary relative phase relationship.

Also in the present configuration, the VC in which the variable operation is not needed by the limitation of the operational mode may be naturally replaced with a simple 3 dB coupler. Since the variable optical phase shifters described above are designed to adjust the relative phase of the light from each input port of the aggregation part, only the variable optical phase shifters 12-2-1 to 12-2-4 in the first stage are left, and the remaining variable optical phase shifters 12-1-1 and 12-1-2 can be omitted. However, when the variable optical phase shifters are provided in each stage, the adjustment of the relative phase is easily performed. In another method of omitting the variable optical phase shifters described above, since the variable optical phase shifters 12-1-1 and 12-1-2 are paired to adjust the relative phase of the light from the VC 25-2-1 and the light from the VC 25-2-2, either of them can be omitted. The same is true for the variable optical phase shifters 12-2-1 and 12-2-2 and the variable optical phase shifters 12-2-3 and 12-2-4. The variable optical phase shifters 12-2-1 to 12-2-4 between the input port of the aggregation part and the variable coupler can also be omitted if a variable phase function is provided on the optical modulator side. Furthermore, these variable optical phase shifters are designed to modify, when the relative phase of the output light of the optical modulator array is shifted from the desired value, such shift; if such shift is not present due to the enhancement of production accuracy, the application of trimming technology or the like, these variable optical phase shifters can be omitted.

Note that, each variable optical coupler (VC) has an MZI configuration in which, for example, a 2-input 2-output 3 dB optical coupler and a 2-input 1-output 3 dB optical coupler are connected through two variable optical phase shifters. One of the outputs of the 2-input 2-output 3 dB optical coupler is not connected and may be used instead of the 2-input 1-output 3 dB optical coupler. As the specific method of realizing the 3 dB optical coupler, any method such as the directional coupler, the configuration of a multimode waveguide or one type of interferometer called a wavelength-independent coupler (WINC) may be used. Each variable optical coupler may use not only the MZI configuration but also another configuration such as a configuration in which the refractive index of the coupling part of the directional coupler is changed to change the coupling rate of the coupler. The same is true for the subsequent aspects.

Aggregation Part Aspect 2: Variable Attenuator Type

Figure 28:
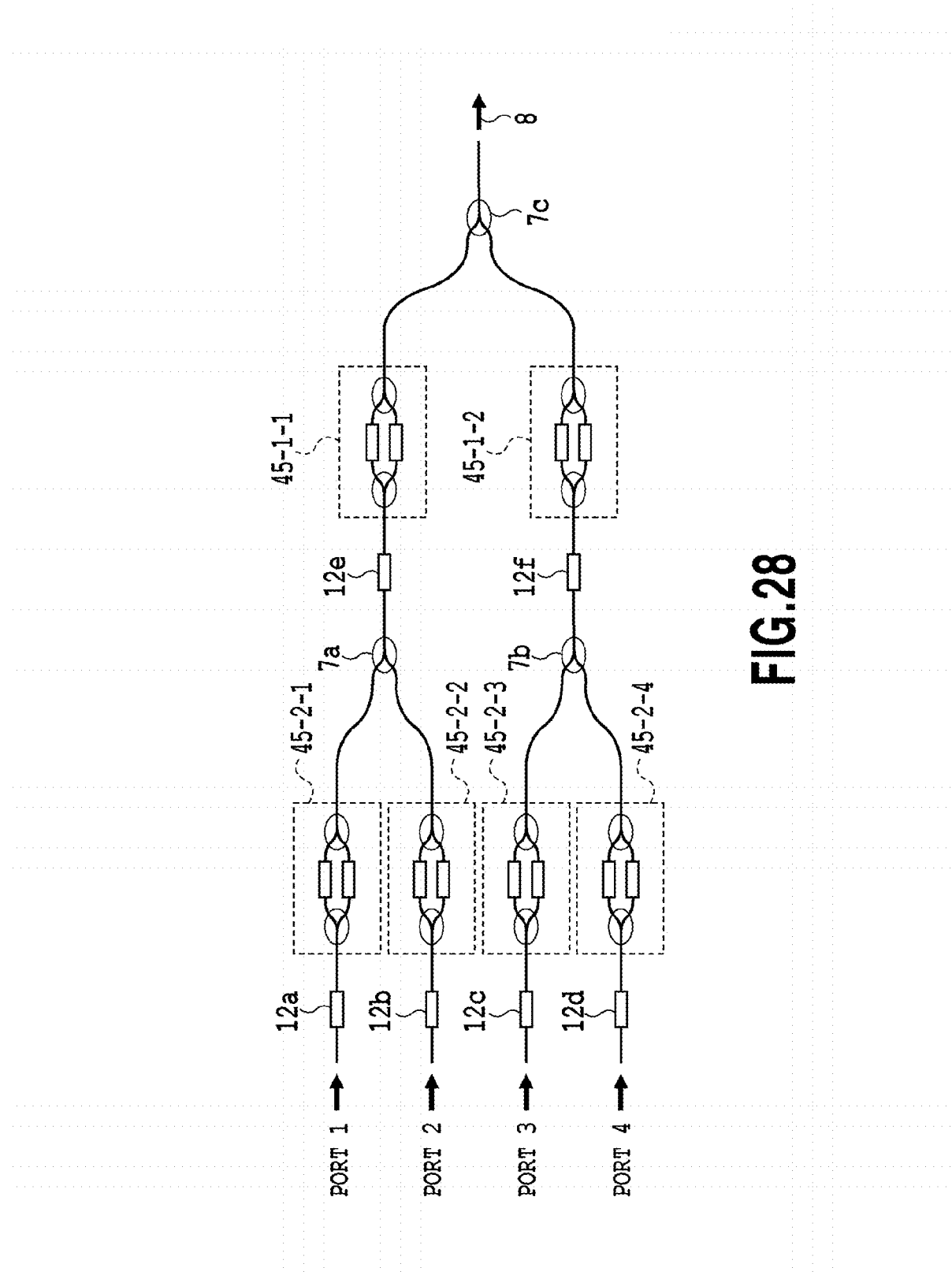
FIG. 28 is a diagram when the aggregation part according to the first embodiment of the present invention includes a combination of a variable attenuator and a 2×1 optical coupler.

FIG. 28 is the configuration of an aggregation part aspect 2. In the present aspect, the variable coupler part of a variable coupler type (the aggregation part aspect 1) is replaced by a combination of a variable attenuator and a 2-input 1-output coupler. Also in the present aspect, by the adjustment of attenuation amount of the variable attenuator, light from each input port of the aggregation part can be combined in the output port at an arbitrary rate and in an arbitrary relative phase relationship. However, since the rate is changed by the attenuation, in an operation other than combination at an equal rate, principle loss is generated. In the variable coupler type (the aggregation part aspect 1), such principle loss is not generated. On the other hand, in the present configuration, since the variable attenuator is individually provided in each input port of the aggregation part, it is advantageously easy to perform level adjustment on the light from each input port of the aggregation part.

Aggregation Part Aspect 3: Variable Attenuator-Equipped Variable Coupler Type

Figure 29:
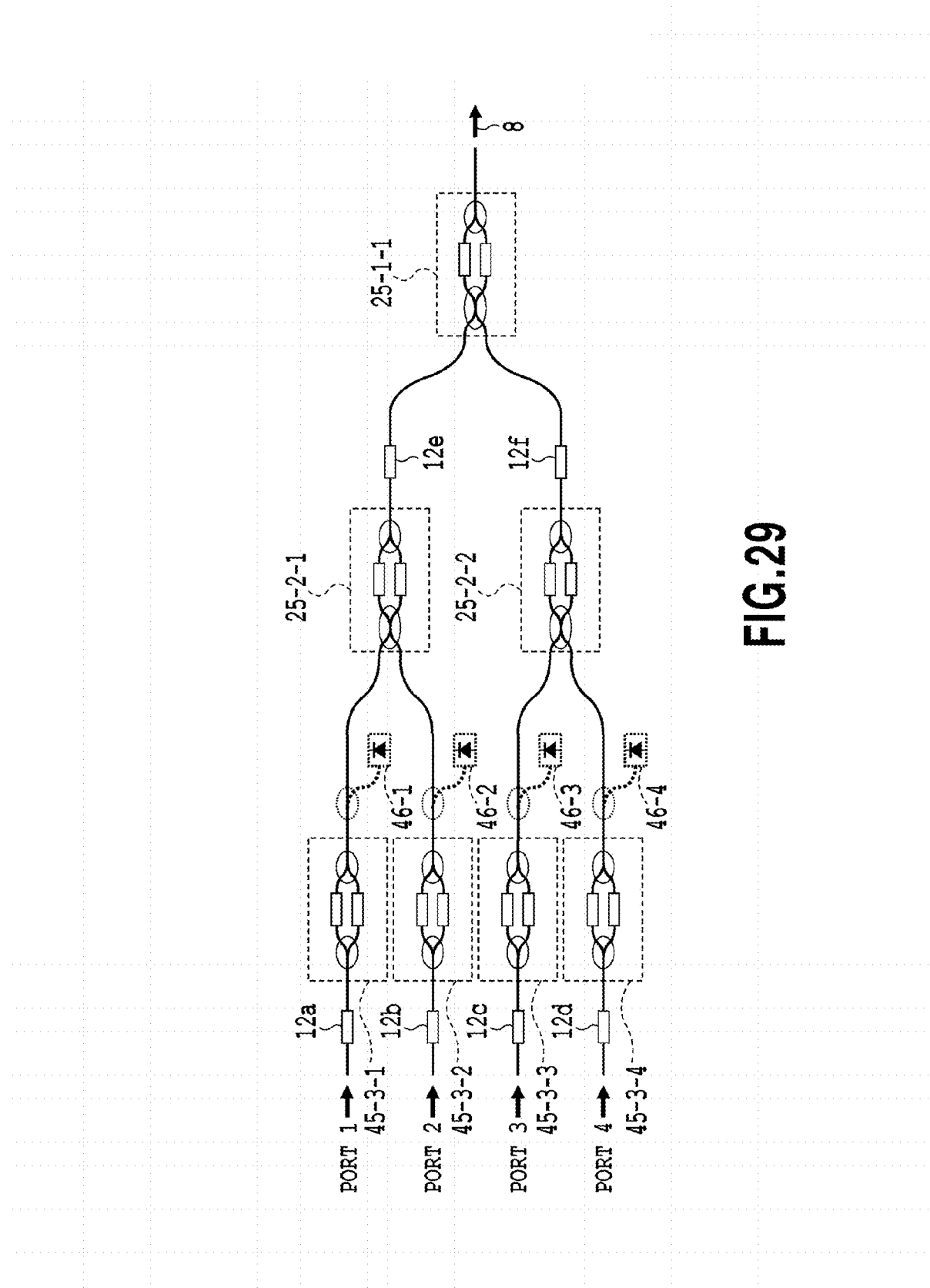
FIG. 29 is a diagram when the aggregation part according to the first embodiment of the present invention includes a combination of a variable coupler type and a variable attenuator type.

FIG. 29 is the configuration of an aggregation part aspect 3. In the present configuration, the variable coupler type and the variable attenuator type are combined. The combining ratio is adjusted by the variable coupler to reduce principle loss, and simultaneously, it is easy to perform level adjustment on the light from each input port of the aggregation part. Its disadvantage is that the size of the circuit is increased.

This figure also shows the configuration in which optical monitors 46-1 to 46-4 are provided after variable attenuators 45-3-1 to 45-3-4. As described above, the optical monitors are provided as necessary, and thus it is possible to perform various types of adjustment while grasping the state of the signal from each port. Needless to say, the optical monitors can likewise be provided in aspects other than the aspects 1 and 2 and the like.

Aggregation Part Aspect 4: Single-Stage M×1 Variable Coupler Type

Figure 30:
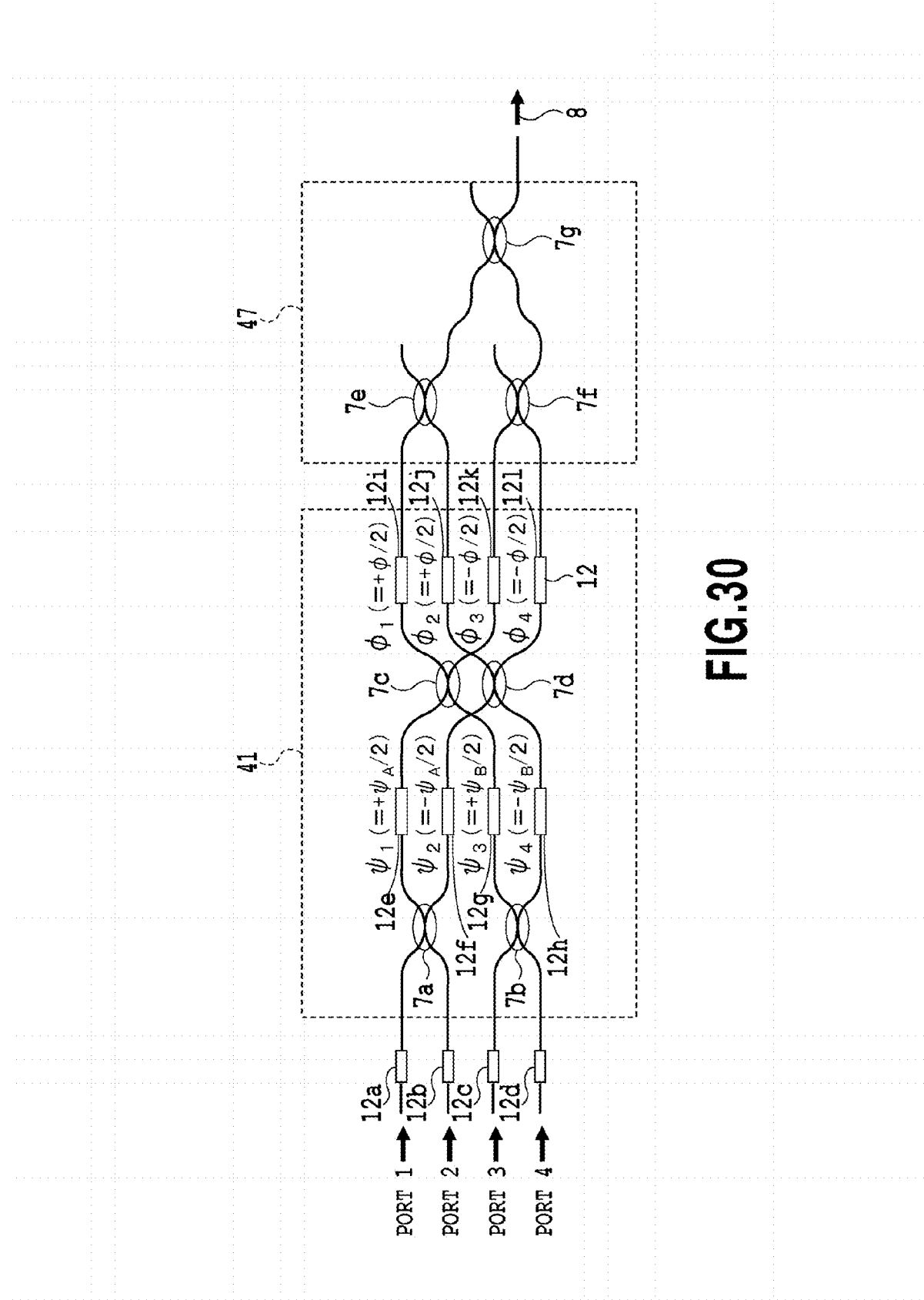
FIG. 30 is a diagram when the aggregation part according to the first embodiment of the present invention includes a single stage M×1 variable coupler.

FIG. 30 is the configuration of an aggregation part aspect 4. In the present configuration, ΔL in the FFT type distribution part is set at zero, and the input and the output are interchanged. By known interference principles, the variable phase shifters are set such that $\phi=\phi_A=\phi_B=\pi/2$, and thus the transmission rate is 1:1:1:1 from the individual input ports 1, 2, 3 and 4. Likewise, a setting is made such that $\phi=\pi/2$ and $\phi_A=\phi_B=2\cdot\arctan(1/\sqrt{2})\approx0.39\pi$, and thus the combining ratio is 2:1:2:1; a setting is made such that $\phi=2\cdot\arctan(1/\sqrt{2})\approx0.39\pi$ and $\phi_A=\phi_B=\pi/2$, and thus the combining ratio is 2:2:1:1. As described above, since the desired combining ratio can be realized by the setting of the variable phase shifters, as in the aggregation part aspect described above, the present configuration can also be used as the aggregation part of the present invention.

Aggregation Part Aspect 5: Harmonic Cut Filter Equipped

The configurations of the aggregation part described above differ in details but are basically the same in that the optical signals from the optical modulation array part are combined. If the signal of each carrier has a high-level harmonic component, that is, if it has a large side lobe spectrum, this side lobe is likely to become crosstalk to the adjacent carrier. Although normally, this side lobe is not significantly large, and thus does not cause any problem, conditions in which, for example, the frequency characteristic of the optical modulator array is excessively excellent and the rectangle degree of a drive signal waveform is excessively excellent are satisfied, the side lobe is increased, which causes a problem. As means for avoiding influences caused by such a problem, it can be considered that an optical band-pass filter (OBPF) for cutting harmonics is provided in the stage subsequent to each optical modulator. However, since the OBPF described above requires a certain degree of circuit area, when it is simply mounted, its chip size is significantly increased.

Here, consider that a few ideas are devised to reduce the circuit size, and the OBPF is mounted. First, the harmonic of the optical signal produces a problem in the first side lobe; in general, as the order is increased such as from the second to the third, the strength of the side lobe is rapidly decreased. Hence, in the modulator of the invention of the present application, the OBPF with consideration given to only crosstalk to the adjacent carrier is sufficient. Therefore, the OBPF is preferably a filter that can attenuate the adjacent channel as with the ILF. In the ILF, since a transmission band is repeated every other channel, in each of an even channel and an odd channel, one ILF is preferably prepared, and it is not necessary to prepare the ILF for each carrier.

Figure 31:
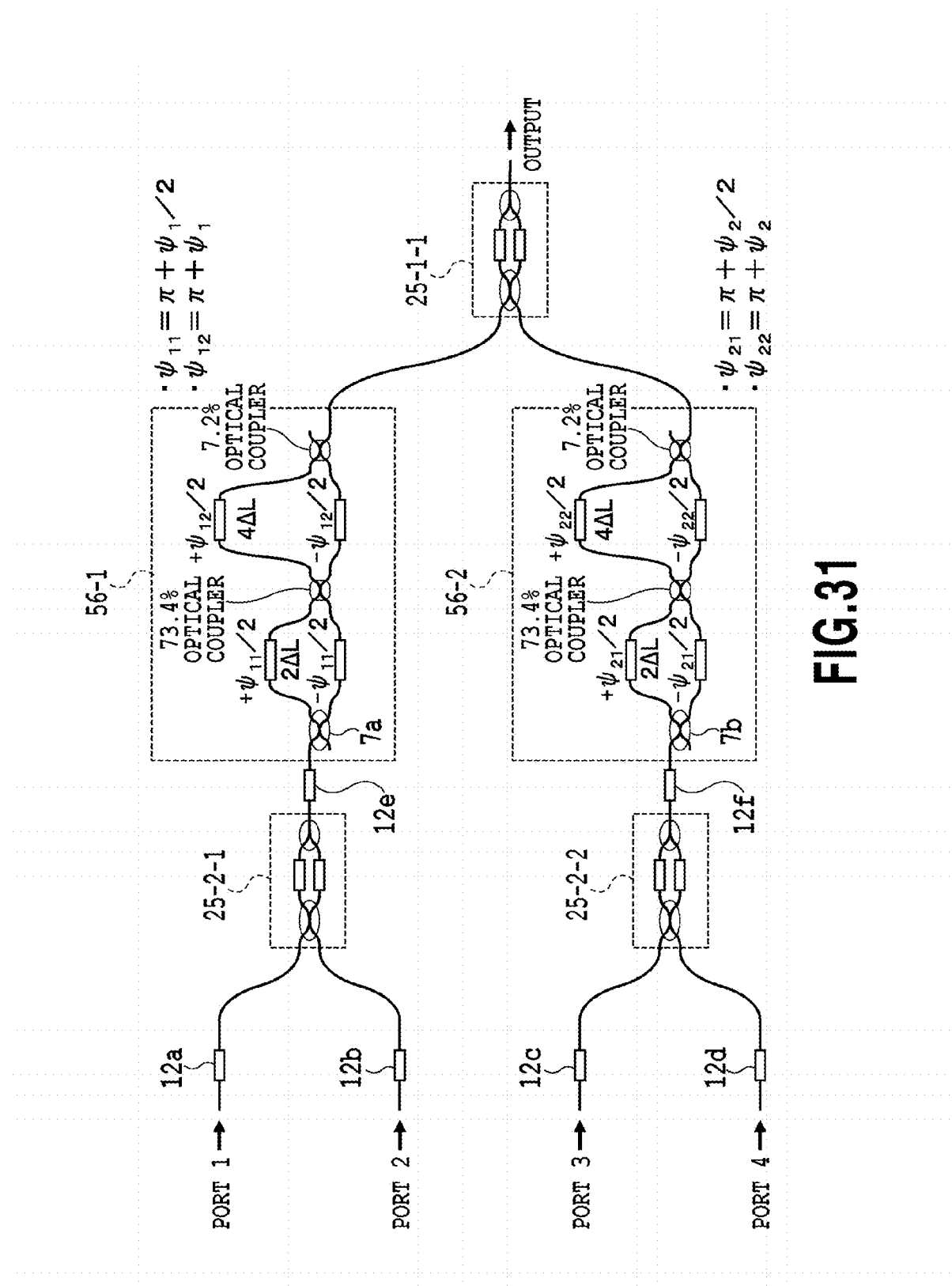
FIG. 31 is a configuration diagram when the aggregation part according to the first embodiment of the present invention includes a variable optical coupler and that a signal harmonic cut filter is incorporated.

A specific example of the configuration when M=4 is shown in FIG. 31. The configuration of FIG. 31 is based on the configuration of the aggregation part aspect 1, and a 1-input 1-output TILF is arranged before the variable coupler 25-1-1 in the final stage as harmonic removal filters 56-1 and 56-2. In this figure, it is assumed that the TILF has a configuration of the lattice type TILF as disclosed in Non Patent Literature 5, and the rectangle degree of the transmittance characteristic is satisfactory. Although here, the number of stages of the lattice type TILFs is assumed to be two, if it is desired to obtain, for example, a higher rectangle degree of the transmission characteristic, a larger number of stages of the lattice type TILFs may naturally be adopted. Since the optical path length difference of a delay part in each stage of the lattice type TILFs and the coupling rate of the optical coupler are made equal to those in the TILF 27-2-1 of a branching part aspect 2, the transmission characteristic is the same, and becomes the characteristic shown in FIG. 19B when $\phi=2\pi$. Note that, when $\phi=2\pi$, a characteristic in which the ports 1 and 2 are interchanged in FIG. 19B is produced.

The basic operation of the present aggregation part is the same as in the aggregation part aspect 1, and an operation of the TILF as the harmonic removal filter is added as follows. At the time of four carriers, the signal light of the carrier frequencies f1 and f3 passes through the harmonic removal filter 56-1, and the signal light of the carrier frequencies f2 and f4 passes through the harmonic removal filter 56-2. Hence, the harmonic removal filter 56-1 is operated at $\phi_1=2\pi$ such that the signal light of f1 and f3 is transmitted and the signal light of f2 and f4 is interrupted; the harmonic removal filter 56-2 is operated at $\phi_2=0$ such that the signal light of f1 and f3 is interrupted and the signal light of f2 and f4 is transmitted. At the time of two carriers, the signal light of the carrier frequency f1 passes through the harmonic removal filter 56-1, and the signal light of the carrier frequency f2 passes through the harmonic removal filter 56-2. Hence, the harmonic removal filters are operated as at the time of four carriers. At time of one carrier, since the signal light of the carrier frequency f1 passes through both the harmonic removal filters 56-1 and 56-2, both the harmonic removal filters 56-1 and 56-2 are operated so as to allow the signal light of f1 to pass through, that is, operated at $\phi_1=\phi_2=2\pi$.

Since the TILF has a repetition characteristic as shown in FIG. 19B, even when M is higher than four, as shown in FIG. 31, it is found that, before the variable coupler 25-1-1 in the final stage, in the even channel and the odd channel, the TILFs 56-1 and 56-2 are preferably arranged, respectively. Hence, it is found that the major merit of the present configuration is that, even when M is large, it is possible to perform mounting with a relatively small circuit area.

Aggregation Part Aspect 6: Configuration Diverting the Configuration of the Distribution Part Here consider that an aspect in which the input and output ports of the distribution part aspect are interchanged is used as the aggregation part. In this case, the functions of branching/demultiplexing in the distribution part aspect are combining/multiplexing, respectively. Since the modulated light passes through the aggregation part, the transmission characteristic is preferably the wavelength-independent characteristic. Since the variable optical coupler, the variable attenuator and the like used in the aggregation part aspects 1 to 4 described above are basically wavelength-independent, they can be used without wavelength dependence being problematic. On the other hand, since the interferometer having the optical path length difference is included in the configuration of the distribution part, when this is used as the aggregation part, wavelength dependence is likely to become problematic, which requires checking whether or not to apply the configuration of the distribution part.

When the configurations of the distribution part aspect 4 and the distribution part aspects 6 to 8 are used as the aggregation part by interchanging the input and output ports, if the carriers of the same wavelength are aggregated and combined, since the variable coupler is substantially used, it is possible to combine the signal lights at an arbitrary combining ratio independently of the wavelength. When the carriers of the different wavelengths are aggregated and multiplexed, since the multiplexing is performed with the TILF, this is not problematic, either. In the aggregation part aspects 1 to 4, when the multiplexing described above is performed, the couplers are combined, and this causes combination principle loss; but, in the configuration where the input and output ports of the distribution part aspect 4 and the distribution part aspects 6 to 8 are interchanged, the multiplexing is performed with the TILF, with the result that principle loss is not generated. Hence, the point where principle loss is not generated is the merit of the configuration where the input and output ports of the distribution part aspect 4 and the distribution part aspects 6 to 8 are interchanged. Moreover, since the multiplexing is performed with the TILF, as described in the aggregation part aspect 5, to obtain the effect of cutting the harmonics of the signal light is the major merit. The demerit is that the configuration is slightly complicated as compared with the aggregation part aspects 1 to 4.

Likewise, in the configuration where the input and output ports of the distribution part aspects 1 to 3 are interchanged, when the carriers of different wavelengths are aggregated and multiplexed, since the ILF is used to perform the multiplexing, this is not problematic. However, when the carriers of the same wavelength are aggregated and combined, as shown in the transmission characteristic of FIGS. 17C and 17B, 19D and 19E and 21B to 21E, since the transmission characteristic of the ILF has great wavelength independency around the carrier frequency, the modulation signal having a spectral width receives spectral distortion of left-right asymmetry, with the result that it cannot be used basically. However, when the frequency spacing of the treated carrier light is sufficiently wider than the spectral width, that is, when the symbol rate is sufficiently smaller than the frequency spacing of the carrier light, the wavelength dependency of the transmission characteristic described above is relatively gentle, with the result that this does not cause any problem. As described above, under conditions in which the symbol rate is sufficiently smaller than the frequency spacing of the carrier light, the configuration where the input and output ports of the distribution part aspects 1 to 3 are interchanged can be used as the aggregation part. Also in this case, the point that combination principle loss is not generated is the merit, and the point that the configuration is complicated is the demerit.

Various Types of Configurations of the Optical Modulator Array Part

Various types of configurations of the optical modulator array part will now be described. Normally, as the optical modulator of the optical modulator array part, a single MZI type phase modulator shown in FIG. 32A is used. This is because, as described above, the output signal is unlikely to be affected even if the amplitude of the drive electrical signal is slightly displaced, and the extension of the modulation spectrum is narrow. However, the simple phase modulator configuration shown in FIG. 32B may be used for an applied destination which does not care such quality. If the minimum multilevel number of the generated signal is two, that is, if it does not need to be the BPSK signal, the nest MZI type modulator shown in FIG. 32C may be used as the optical modulator of the optical modulator array part. In this case, the minimum multilevel number is four, that is, it is the QPSK signal. Furthermore, a modulator that generates a signal of a large multilevel number may be naturally used.

Note that, the variable optical phase shifter arranged in the tail end can be omitted when its function is provided by another part such as the distribution part side or the aggregation part or when as described above, it is not necessary to adjust the relative phase between the optical modulators in the optical modulator array part.

With respect to the variable optical phase shifter described above, the variable optical phase shifter for adjusting the signal phase arranged between the respective optical circuits within the optical modulator of the invention of the present application is arranged to correct a shift of the phase between a plurality of signals launched to the respective optical circuits. The shift of the phase between the signals launched to the respective optical circuits may be generated in design by a combination of the optical elements of the respective optical circuits used within the optical modulator or may be generated by shift from design values caused by variations in temperature, production errors from the design values of the waveguide length or the like. Depending on the combination of the optical elements of the respective optical circuits used within the optical modulator, the shift of the phase of the signals input to the respective optical circuits may not be generated in design. In this case, the signal phase adjustment function described above, that is, the variable optical phase shifter for adjusting the signal phase arranged between the optical circuits, is placed to correct the shift caused by variations in temperature, production errors from the design values of the waveguide length or the like.

Example 1

Format Variable Modulator

Figure 33:
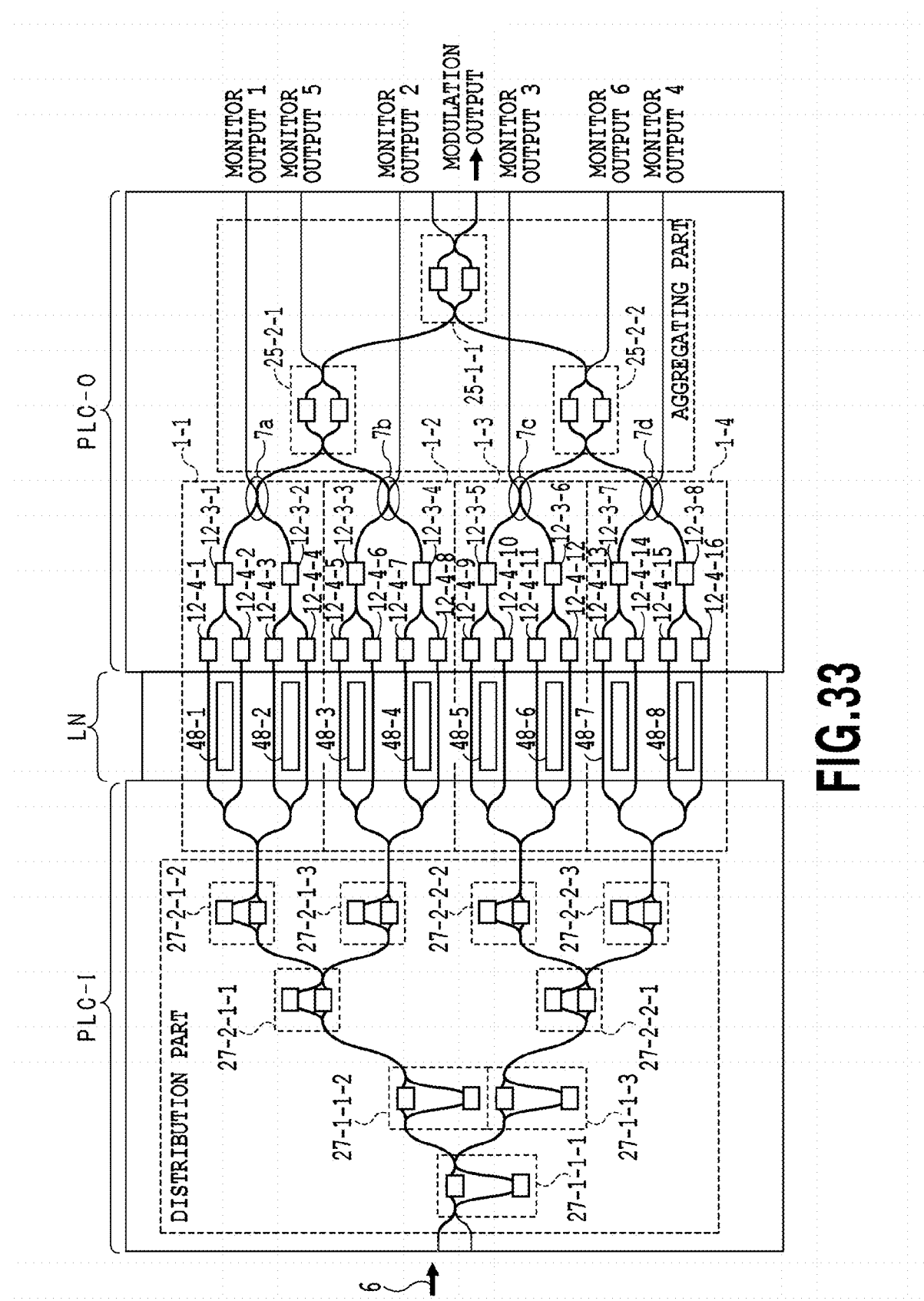
FIG. 33 is a configuration diagram of a format variable modulator according to a first example of the present invention.

The configuration of a format variable modulator fabricated as a first example is shown in FIG. 33. The basic configuration of the present example is that, in the embodiments described above, M=4, the configuration of the distribution part is the simple MZI type of the distribution part aspect 1, the configuration of the aggregation part is the variable coupler type of the aggregation part aspect 1 and the optical modulator array part is the nest MZI type QPSK modulator. Hence, the present modulator can be used as three types of modulators of 4-carrier QPSK modulation, 2-carrier 16QAM modulation and 1-carrier 256QAM modulation.

The present modulator is realized by using complex integration technology (NPL 3) where a silica-based planar light wave circuit (PLC) and an LN modulation array are combined. A PLC waveguide alone cannot form a high-speed modulator because an EO effect is significantly low but is a waveguide medium with very little loss because the propagation loss is one-tenth or less that of the LN waveguide, and, since the permissible bending radius of the bending waveguide is about 2 mm to provide a high degree of design flexibility, it is possible to realize, as a passive circuit, various optical circuits with little loss. On the other hand, since the LN waveguide is greater in the propagation loss and the permissible bending radius than the PLC waveguide, the LN waveguide is not suitable for configuring a complicated optical circuit, but has a high EO effect and is very excellent as a high-speed modulation circuit because a phenomenon such as light absorption caused by modulation does not occur.

Hence, in particular, in a complicated modulator like the modulator of the present example, the PLC waveguide is used in the passive circuit part such as a distribution/conversing circuit, the LN waveguide is used only in the modulation array part and both of them are combined and integrated, and thus it is possible to obtain the advantages of both the PLC waveguide and the LN waveguide, with the result that it is possible to realize the modulator with satisfactory characteristic and little loss as compared with a modulator produced by LN waveguide monolithic technology. This merit becomes more remarkable as the configuration of a modulator is more complicated, and the merit is further enhanced in the interleaving filter and the variable coupler of this configuration and a polarization multiplexing modulator requiring not only the distribution/conversing circuit but also a polarization combiner as will be indicated in Example 2 described later.

The configuration of the distribution part will be described in detail. In the present configuration, the TILFs are configured in two stages, that is, the sub TILFs 27-1-1-2, 27-1-1-3, 27-2-1-2, 27-2-1-3, 27-2-2-2 and 27-2-2-3 are connected to the outputs of the main TILFs 27-1-1-1, 27-2-1-1 and 27-2-2-1, respectively. The sub TILFs and the main TILFs have basically the same configuration, and the optical path length difference $\Delta L$ of the interferometer, that is, the FSR is the same. However, each of the sub TILFs has a 1-input 1-output configuration, and is used as a so-called gate circuit. With the configuration described above, since crosstalk that is not sufficiently separated by the main TILFs and leaks can be blocked by the sub TILFs, it is possible to obtain a separation characteristic with low crosstalk.

The specific operation will be described using the TILFs 27-1-1-1, 27-1-1-2 and 27-1-1-3 as an example. When the carrier interval is assumed to be $\Delta f$, the FSRs of the TILFs 27-1-1-1, 27-1-1-2 and 27-1-1-3 are individually designed to be $2\Delta f$. When the TILFs 27-1-1-1 to 27-1-1-3 are used as the demultiplexer, that is, when the carrier lights f1, f2, f3 and f4 are separated into two groups, that is, f1 and f3 and f2 and f4, the TILF 27-1-1-1 is normally operated as the demultiplexer. In other words, the variable optical phase shifters within the TILF 27-1-1-1 are adjusted such that f1 and f3 are output to, for example, the upper port and f2 and f4 are output to the lower port. Here, the TILF 27-1-1-2 connected to the upper port adjusts the variable optical phase shifters within the TILF 27-1-1-2 such that f1 and f3 are the maximum transmission and f2 and f4 are the minimum transmission. Likewise, the TILF 27-1-1-3 connected to the lower port adjusts the variable optical phase shifters within the TILF 27-1-1-3 such that f1 and f3 are the minimum transmission and f2 and f4 are the maximum transmission. As described above, the carrier light separated in the TILF 27-1-1-1 is filtered in the TILFs 27-1-1-2 and 27-1-1-3 such that unnecessary carrier light is further removed. Hence, in the TILFs configured in two stages, as compared with the configuration where the TILFs are normally configured in one stage, it is possible to obtain twice the light extinguishing ratio, that is, low crosstalk performance.

When the TILFs 27-1-1-1 to 27-1-1-3 are collectively used as the variable coupler, that is, for example, when the carrier light f1 is equally distributed, the variable optical phase shifters within the TILF 27-1-1-1 are adjusted, and thus the transmission characteristic of the TILF 27-1-1-1 is shifted on the frequency axis such that the transmittances to both the output ports of the TILF 27-1-1-1 are equal to each other at the frequency f1. Here, the variable optical phase shifters within the TILF 27-1-1-2 and the TILF 27-1-1-3 are adjusted such that both the TILF 27-1-1-2 and the TILF 27-1-1-3 have the maximum transmission at the frequency f1. When an arbitrary branching ratio other than the equal distribution, for example, 2:1, is set, as basically in the same manner, the variable optical phase shifters within the TILF 27-1-1-1 are adjusted such that the branching ratio of the TILF 27-1-1-1 is the desired branching ratio at the frequency f1, for example, 2:1. In the TILF 27-1-1-2 and the TILF 27-1-1-3, as in the case of the equal distribution, the adjustment is made such the maximum transmission is achieved at the frequency f1.

With respect to the TILFs 27-2-1-1, 27-2-1-2 and 27-2-1-3 and the TILFs 27-2-2-1, 27-2-2-2 and 27-2-2-3, the concept is basically the same. Note that, the FSRs of the TILFs 27-2-1-1, 27-2-1-2, 27-2-1-3, 27-2-2-1, 27-2-2-2 and 27-2-2-3 are all designed to be $4\Delta f$.

As is understood from FIG. 33, on the TILFs 27-1-1-1, 27-1-1-2 and 27-1-1-3, the side where the optical path length of the interferometer of the TILFs is long is the lower side, and, on the TILFs 27-2-1-1, 27-2-1-2, 27-2-1-3, 27-2-2-1, 27-2-2-2 and 27-2-2-3, the side where the optical length of the interferometer of the TILFs is long is the upper side. This is because, in the arrangement of the interferometers, they are arranged to be hairpin-curved on the actual circuit chip, and a layout is performed such that the side where the optical path length of the interferometer is long is constantly the outside of the hairpin curve. The layout is performed in this way, and thus it is possible to reduce the chip size.

All the distribution parts are produced on a PLC chip (PLC-1) on the input side. The variable optical phase shifter within the TILF uses a thermo-optic phase shifter. In the thermo-optic phase shifter, the temperature of the waveguide is locally controlled by a thin film heater provided on a waveguide clad, and the refractive index of the waveguide directly below the thin film heater, that is, the phase of waveguide light, is controlled by thermo-optic effects. A polarization retaining fiber is connected to the input port. The 3 dB coupler forming each TILF is designed with the wavelength-independent coupler (WINC).

Figure 1A:
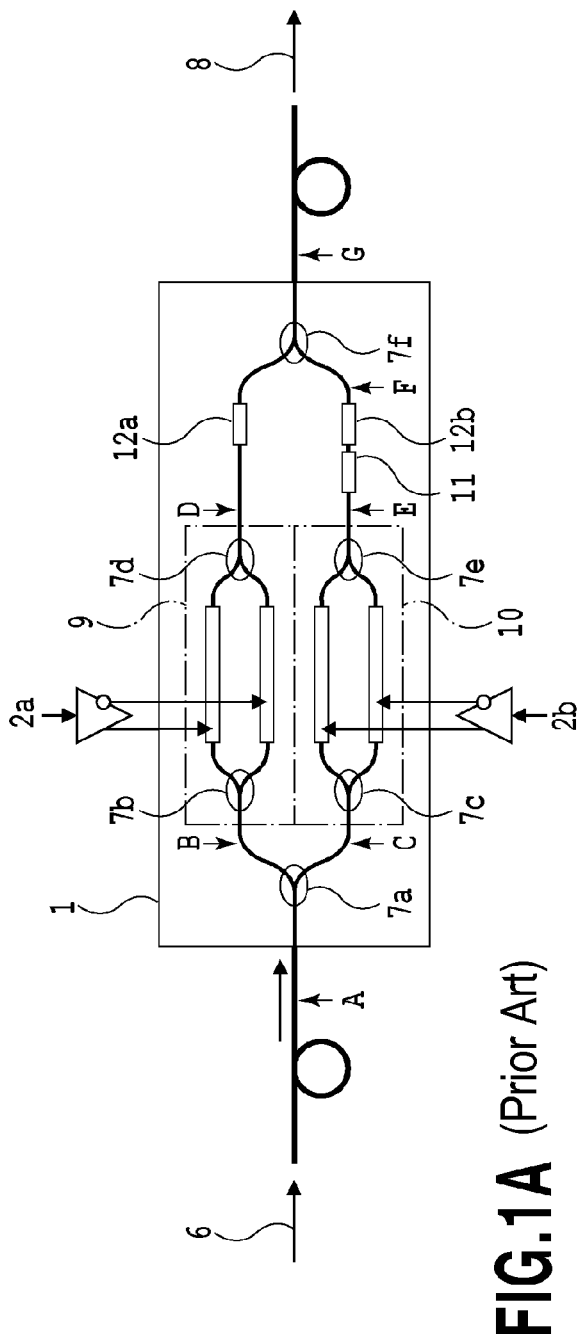
FIG. 1A is a diagram showing a configuration of a conventional QPSK modulator.
Figure 1B:
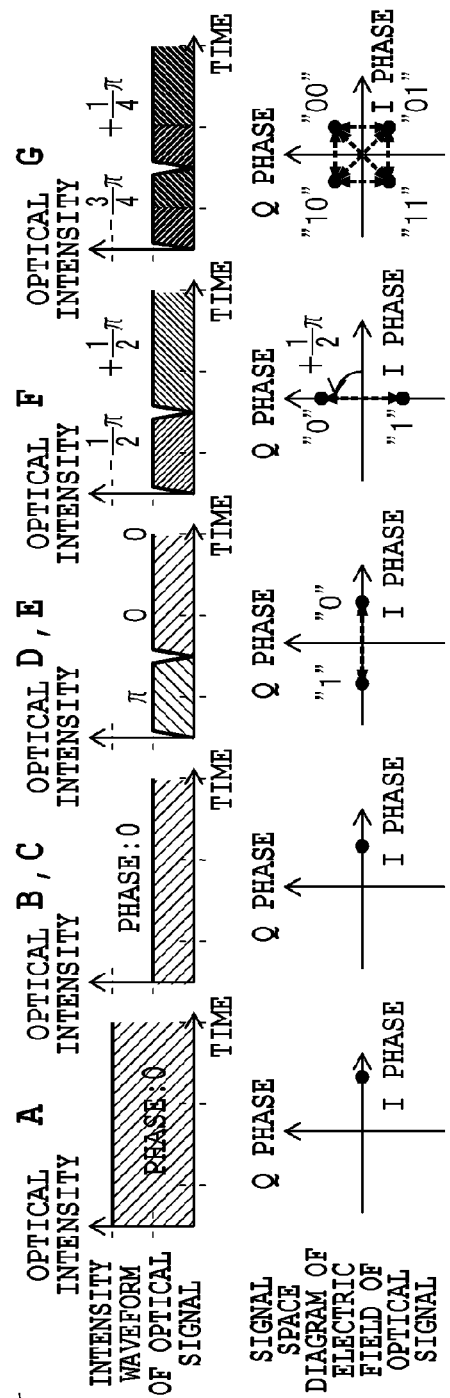
FIG. 1B is a diagram showing intensity waveforms and signal point arrangements of optical signals at respective points A to G of a waveguide of FIG. 1A.
Figure 2C:
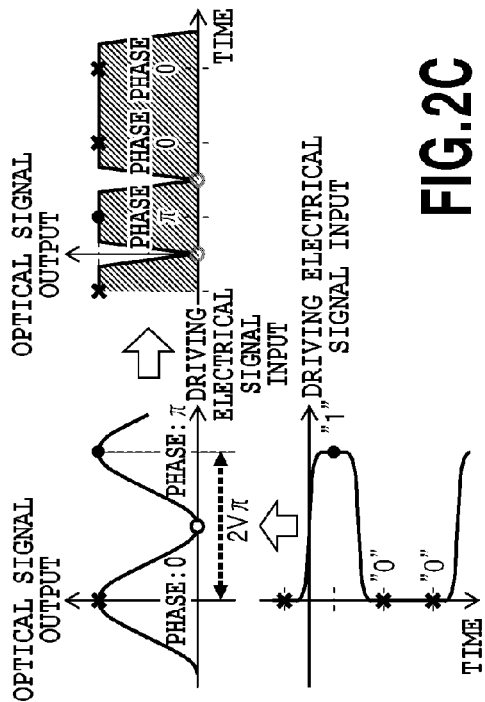
FIG. 2C is a diagram showing the change of output signal light intensity with time by the single MZI modulator of FIG. 2A.
Figure 2D:
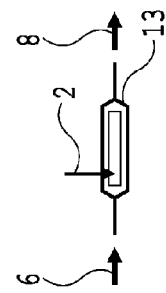
FIG. 2D is a diagram schematically showing the single MZI modulator of FIG. 2A.
Figure 2A:
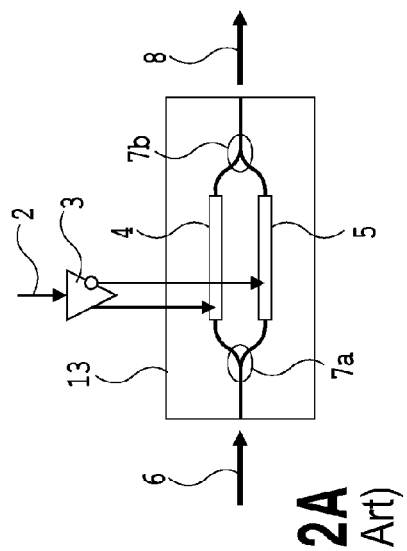
FIG. 2A is a diagram showing a configuration of a conventional single MZI modulator.
Figure 2B:
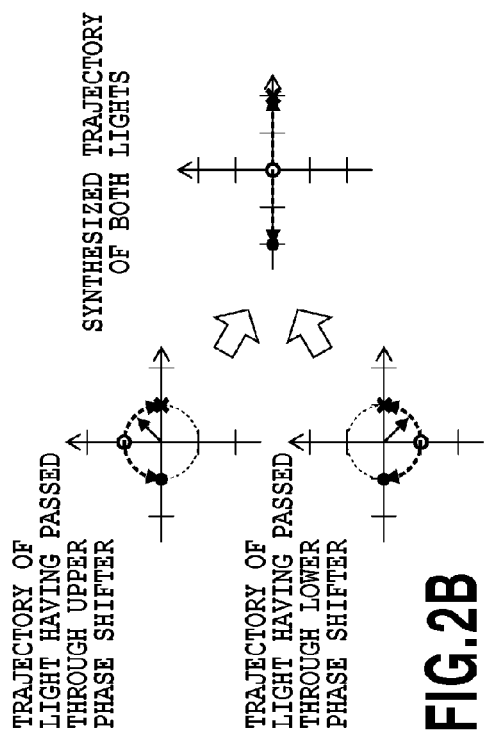
FIG. 2B is a diagram showing a trajectory of an electric field vector of output signal light by the single MZI modulator of FIG. 2A.
Figure 3A:
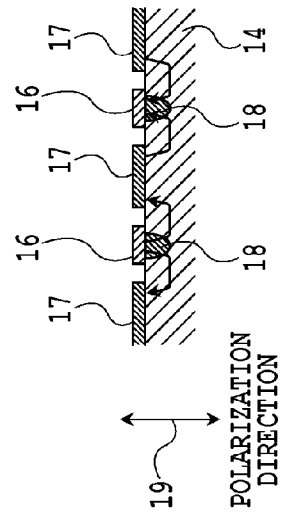
FIG. 3A is a configuration diagram when the conventional single MZI modulator is produced using a Z-cut substrate of LiNbO$_3$.
Figure 3B:
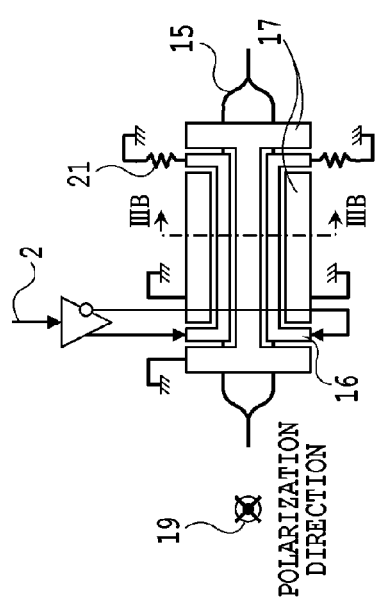
FIG. 3B is a cross-sectional view taken along line IIIB of the single MZI modulator of FIG. 3A.
Figure 3C:
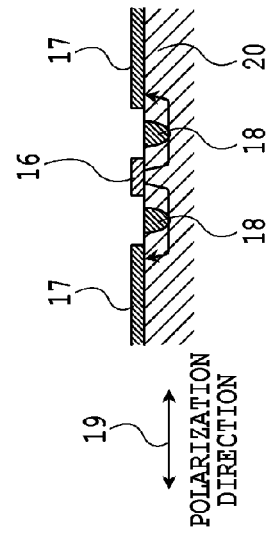
FIG. 3C is a configuration diagram when the conventional single MZI modulator is produced using an X-cut substrate of LiNbO$_3$.
Figure 3D:
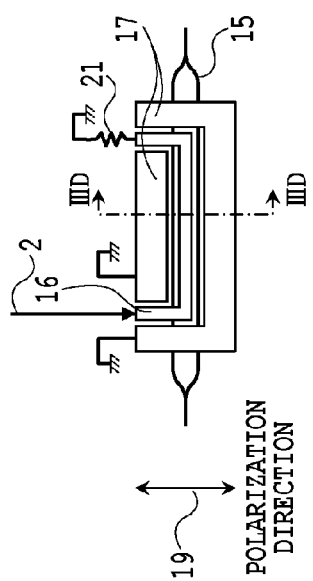
FIG. 3D is a cross-sectional view taken along line IIID of the single MZI modulator of FIG. 3C.

The configuration of the optical modulator array part will now be described in detail. The optical modulator array includes four nest MZI modulators (QPSK modulators) 1-1 to 1-4. As shown in FIG. 33, optical phase shifters for modulation that perform data modulation with the QPSK modulators are fabricated on the LN substrate, and the variable optical phase shifters 12-4-1 to 12-4-16 for controlling the 3 dB optical couplers and biases or the variable optical phase shifters 12-3-1 to 13-3-8 that adjust the relative phase of the output light from individual child MZIs are fabricated on the PLC chips (PLC-I and PLC-O). These variable optical phase shifters also use the thermo-optic phase shifter. As the LN chip, an X-cut substrate is used, and the center electrode of the optical phase shifter for modulation that performs data modulation is arranged, as shown in FIG. 3B, between the child MZIs. The $\pi/2$ optical phase shifter for adjusting the signal lights from Ich of the QPSK modulator and the signal light from the child MZI of Qch such that the relative phase difference is 90° and for combining them is realized by adjusting the thermo-optic phase shifter. Although the variable optical phase shifters 12-4-1 to 12-4-16 and the variable optical phase shifters 12-3-1 to 12-3-8 are provided on the side of the PLC-O this time, they may be naturally provided on the side of the PLC-I. The 3 dB optical coupler forming the child MZI of the QPSK modulator and the 3 dB optical coupler on the input side of the parent MZI are formed with a Y branching waveguide. The 3 dB optical coupler on the output side of the parent MZI is formed as the wavelength-independent coupler (WINC).

As the output of the WINC, two ports are present; one is connected to the variable coupler VC, which is the aggregation part, and the other is a monitor output. Since this monitor is prepared for each QPSK modulator, it can be used as a monitor for performing operating point bias adjustment on each QPSK modulator and phase adjustment between Ich/Qch. Since the output port of the distribution part is further monitored even through the QPSK modulator, the monitor can also be used as a branching ratio monitor that monitors the demultiplexing state of the TILF when the TILF is operated as the coupler. With this monitor, as compared with the case where the signal light from the output port is monitored, it is possible to highly efficiently perform these types of adjustment.

The configuration of the aggregation part will now be described in detail. In the present configuration, all variable optical phase shifters outside the variable coupler are omitted from the configuration of the aggregation part aspect 1 shown in FIG. 27. Although as described above, the variable optical phase shifters 12-1-1 and 12-1-2 and the variable optical phase shifters 12-2-1 to 12-2-4 shown in FIG. 27 are omitted, the variable optical phase shifters 12-3-1 to 12-3-8 within the QPSK modulator shown in FIG. 33 are combined and driven and can thereby be used instead. For example, when the phase at the place corresponding to the variable optical phase shifter 12-2-1 is desired to be moved by $\Delta\phi$, if the variable optical phase shifters 12-3-1 and 12-3-2 present on the upstream side thereof are simultaneously moved by $\Delta\phi$, this means that the phase of the variable optical phase shifter 12-2-1 is substantially moved by $\Delta\phi$. When the variable optical phase shifters 12-3-1 and 12-3-2 are originally set at $\phi_1$ and $\phi_2$, respectively, they are preferably set again at $\phi_1+\Delta\phi$ and $\phi_2+\Delta\phi$, respectively. When, in the variable optical phase shifter 12-1-1, the phase is desired to be moved by $\Delta\phi$, likewise, the variable optical phase shifters 12-3-1 to 12-3-4 present on the upstream side thereof are preferably moved simultaneously by $\Delta\phi$. The same is true for the other variable optical phase shifters. As described above, the variable optical phase shifters are omitted, and thus the circuit length is reduced.

This aggregation part is, as shown in FIG. 33, all produced on the PLC chip (PLC-O) on the output side. The variable couplers VCs 25-1-1, 25-2-1 and 25-2-2 form, through the variable optical phase shifters, a Mach-Zehnder Interferometer (MZI) where two 3 dB optical couplers are connected. These variable optical phase shifters also use the thermo-optic phase shifter. This 3 dB optical coupler is formed with the normal directional coupler. In a normal directional coupler, the coupling rate has a certain level of wavelength dependency. When the directional coupler has wavelength dependency, and the coupling rate is shifted from 3 dB, that is, 50%, in general, no matter how the variable optical phase shifter is configured, it is impossible to obtain a characteristic with a high coupling ratio (for example, 1:0) as the entire VC. However, this time, the coupling rate necessary for these VCs is 1:1 or 2:1, and a relatively high rate is not needed. Since, under such conditions, wavelength dependency generally occurring in the directional coupler is a problem-free level in the range of a communication wavelength band (1520 to 1620 nm), a normal directional coupler that is small and that can obtain a low loss characteristic is used this time.

The PLC chip was produced using a combination between glass film deposition technology such as a flame deposition (FHD) method and microfabrication technology such as reactive ion etching (RIE). Specifically, a glass film that would form a lower clad layer was deposited/made transparent on a silicon substrate, and then a core layer that was a slightly higher in refractive index than the clad layer was deposited. Thereafter, a core pattern that would form an optical waveguide circuit was patterned with the microfabrication technology, and a glass film that would form an upper clad layer was deposited/made transparent, with the result that an embedded optical waveguide was produced. Finally, a metal that would form a thin film heater was deposited on the upper clad surface such as by a vacuum deposition method, and was patterned with the microfabrication technology, with the result that a thermo-optic phase shifter was subjected to loading.

A difference in specific refractive index between the core and the clad of the waveguide is 1.5%. The chip size of the PLC (I) was about 14×36 mm; the chip size of the PLC (O) was about 7×31 mm. Although not shown in the figure, an electrical wiring pattern for feeding a drive current to each thin film heater is formed on the chip.

The LN chip includes a phase modulation array that is formed on the X-cut substrate and that is composed of the total of 16 lines in 8 groups of 2 pairs. Each waveguide of the phase modulation array is produced by a titanium diffusion method, the center electrode is formed in an upper part between each pair of waveguides and a GND electrode is formed around each pair, with the result that a traveling-wave electrode is formed. Although not shown in FIG. 33, as shown in FIGS. 3A and 3B, a high-frequency wiring pattern for propagating a modulation signal to each traveling-wave electrode is formed on the chip.

The modulator of the present example was produced as follows: these PLC chip and LN chip were edge-connected, a polarization-retaining optical fiber and a normal single-mode optical fiber were respectively connected to the input port of the PLC-I and the output port of the PLC-O and the entire chip was held and mounted in a high-frequency package.

Four wavelength variable light source arrays and a multi-subcarrier light source shown in FIG. 9B were connected to the produced modulator, and a modulation operation was checked. The light emission frequency spacing of each wavelength variable light source, that is, a subcarrier spacing, is 25 GHz. To the center electrodes of eight optical phase shifters for modulation that perform data modulation, pseudo-random (PRBS) NRZ electrical signals of PN=11 stages which were delayed differently for each of the eight optical shifters were launched. The modulation symbol rate is 25 Gbaud. Hence, since the subcarrier spacing is equal to the symbol rate, the light signal generated in the present modulator using a plurality of subcarrier lights is an OFDM signal.

When 4-subcarrier QPSK modulation signal is generated, four subcarrier lights f1, f2, f3 and f4 are input from the multi-subcarrier light source described above to the present modulator. The TILF 27-1-1-1 is made to operate as a demultiplexer that divides the subcarrier light into two groups, that is, f1 and f3 to the side of the TILF 27-1-1-2 and f2 and f4 to the side of the TILF 27-1-1-3. The TILF 27-1-1-2 is made to operate as a filter that transmits f1 and f3 and interrupts f2 and f4; the TILF 27-1-1-3 is made to operate as a filter that transmits f2 and f4 and interrupts f1 and f3. The TILF 27-2-1-1 is made to operate as a demultiplexer that divides f1 and f3, that is, f1 to the side of the TILF 27-2-1-2 and f3 to the side of the TILF 27-2-1-3. The TILF 27-2-1-2 is made to operate as a filter that transmits f1 and interrupts f3; the TILF 27-2-1-3 is made to operate as a filter that transmits f3 and interrupts f1. The TILF 27-2-2-1 is made to operate as a demultiplexer that divides f2 and f4, that is, f2 to the side of the TILF 27-2-2-2 and f4 to the side of the TILF 27-2-2-3. The TILF 27-2-2-2 is made to operate as a filter that transmits f2 and interrupts f4; the TILF 27-2-2-3 is made to operate as a filter that transmits f4 and interrupts f2. Each of the four QPSK modulators 1-1 to 1-4 is made to operate as a QPSK modulator. The VCs 25-1-1, 25-2-1 and 25-2-2 are adjusted to achieve 50% coupling. When variations in the propagation loss of the actual device, variations in the optical power level of each subcarrier light and the like are produced, the coupling rates of these VCs are finely adjusted, and thus the levels of the individual subcarrier signals may be naturally made equal to each other.

Figure 34A:
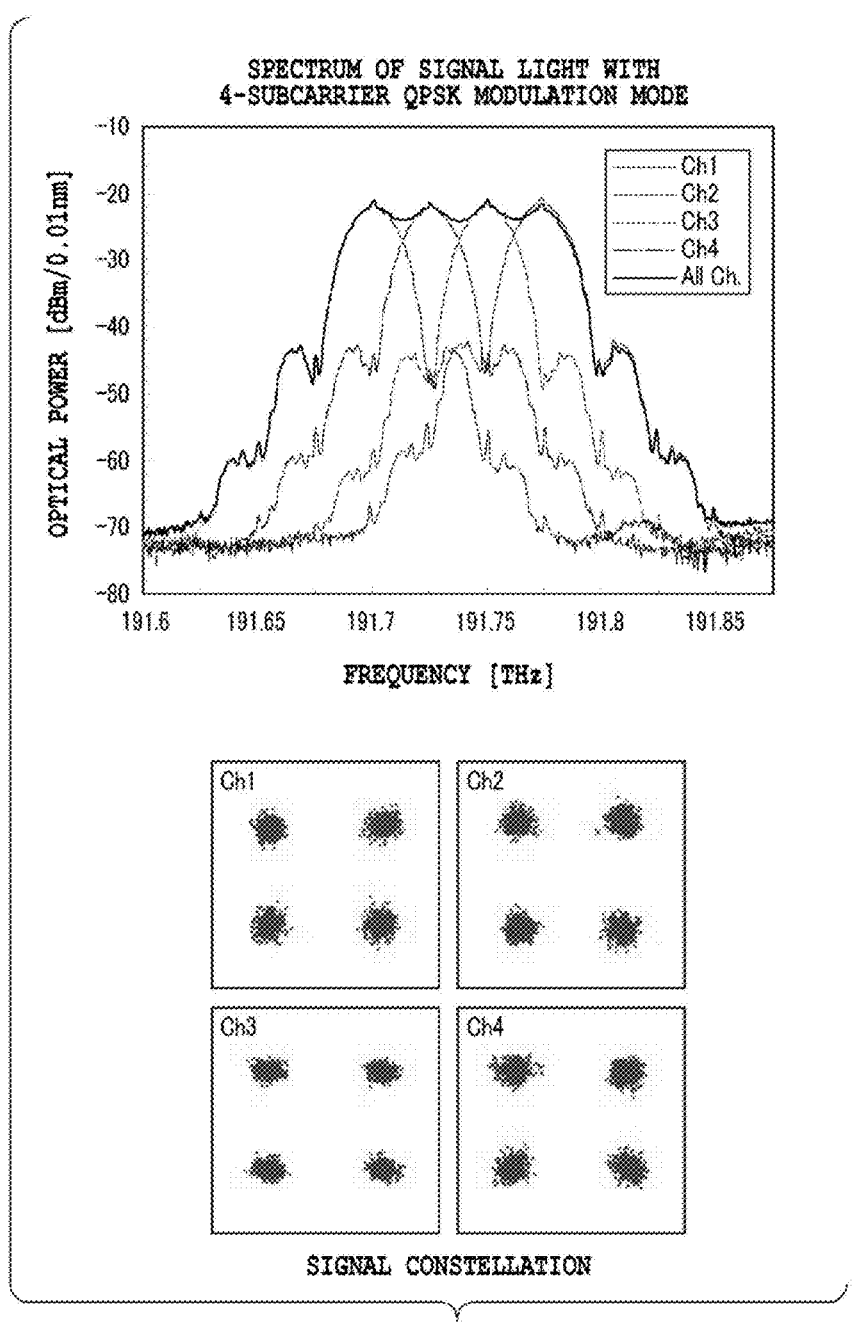
FIG. 34A is a diagram showing the light spectrum and the signal constellation of signal light output in the first example of the present invention when the 4-subcarrier QPSK modulation signal is generated.

The light spectrum of the signal light that is output is shown in the upper diagram of FIG. 34A. The spectrum of output signal light when the multicarrier light source emits the subcarrier light wave by wave is also shown by being superimposed. The signal constellation of the output signal light when the subcarrier light is emitted wave by wave, that is, the signal constellation of each subcarrier, is shown in the lower diagram of FIG. 34A. Thus, it is found that satisfactory 4-subcarrier QPSK modulation signal was able to be generated.

When a 2-subcarrier 16QAM modulation signal is generated, two subcarrier lights f1 and f2 are input from the multi-subcarrier light source described above to the present modulator. The TILF 27-1-1-1 is made to operate as a demultiplexer that divides the subcarrier light, that is, f1 to the side of the TILF 27-1-1-2 and f2 to the side of the TILF 27-1-1-3. The TILF 27-1-1-2 is made to operate as a filter that transmits f1 and interrupts f2; the TILF 27-1-1-3 is made to operate as a filter that transmits f2 and interrupts f1. The TILF 27-2-1-1 is made to operate as a 2:1 coupler on f1. The TILFs 27-2-1-2 and 27-2-1-3 each are operated so as to transmit f1 at the maximum. The TILF 27-2-2-1 is made to operate as a 2:1 coupler on f2. The TILFs 27-2-2-2 and 27-2-2-3 each are operated so as to transmit f2 at the maximum. With respect to the QPSK modulators, the QPSK modulators 1-1 and 1-2 are paired, the QPSK modulators 1-3 and 1-4 are paired and they are made to operate as a 16QAM modulator. The VC 25-1-1 is adjusted so as to achieve 50% coupling. The VCs 25-2-1 and 25-2-2 are adjusted to operate as a 2:1 coupler. A relative phase relationship between a QPSK signal (large QPSK signal) where an electric field strength generated in the QPSK modulator 1-1 is two and a QPSK signal (small QPSK signal) where an electric field strength generated in the QPSK modulator 1-2 is one is adjusted by simultaneously changing the variable optical phase shifters 12-3-1 and 12-3-2 or the variable optical phase shifters 12-3-3 and 12-3-4. Likewise, a relative phase relationship between a large QPSK signal in the QPSK modulator 1-3 and a small QPSK signal in the QPSK modulator 1-2 is adjusted by simultaneously changing the variable optical phase shifters 12-3-5 and 12-3-6 or the variable optical phase shifters 12-3-7 and 12-3-8.

Figure 34B:
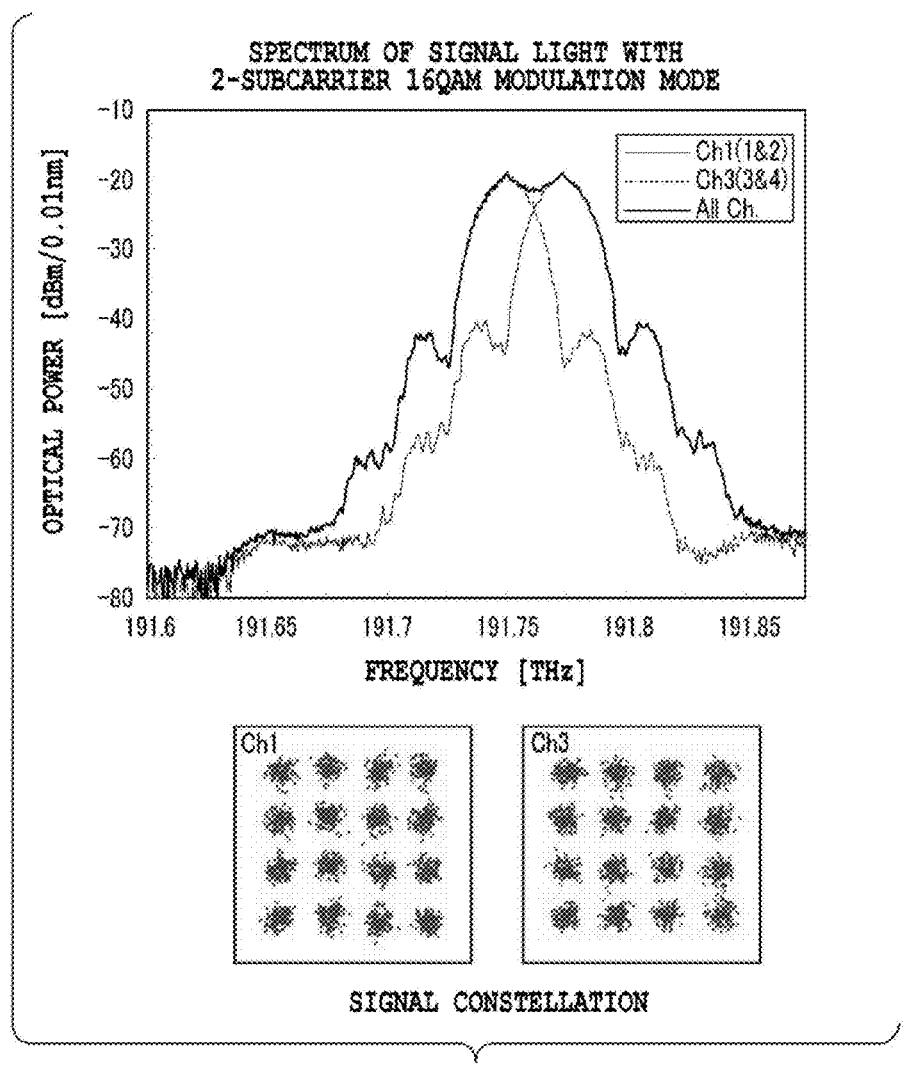
FIG. 34B is a diagram showing the light spectrum and the signal constellation of the signal light output in the first example of the present invention when the 2-carrier 16QAM modulation signal is generated.

The light spectrum of the signal light that is output and the signal constellation of each subcarrier are shown in FIG. 34B. Thus, it is found that satisfactory 2-subcarrier 16QAM modulation signal was able to be generated.

When 1-carrier 256QAM modulation signal is generated, only subcarrier light f1 is input from the multi-subcarrier light source described above to the present modulator. The TILF 27-1-1-1 is made to operate as a 4:1 coupler on f1. The TILFs 27-1-1-2 and 27-1-1-3 each are operated so as to transmit f1 at the maximum. The TILFs 27-2-1-1 and 27-2-2-1 each are made to operate as a 2:1 coupler on f1. The TILFs 27-2-1-2, 27-2-1-3, 27-2-2-2 and 27-2-2-3 each are operated so as to transmit f1 at the maximum. With respect to the QPSK modulators, four QPSK modulators are paired, and they are made to operate as a 256QAM modulator. The VC 25-1-1 is adjusted to operate as a 4:1 coupler; the VCs 25-2-1 and 25-2-2 are adjusted to operate as a 2:1 coupler. A relative phase relationship between the QPSK signals generated in the individual QPSK modulators is adjusted by pairing and changing the variable optical phase shifters 12-3-1 and 12-3-2, 12-3-3 and 12-3-4, 12-3-5 and 12-3-6 and 12-3-7 and 12-3-8.

The light spectrum of the output signal light that was substantially the same as the spectrum in only the ch 1 of the upper diagram of FIG. 34B was obtained. Although, on the signal constellation, a diagram that could be considered to be the signal points of 16 rows and 16 columns was obtained, since it was seen that the 256QAM signal was affected by the quality of the drive electrical signal itself, that is, noise, the blurred constellation was obtained. Since this is not a problem in principle, it will be improved by performing the operation with an evaluation system where the quality of the drive electrical signal itself is enhanced.

As described above, the signal light in which the number of carriers and the multilevel number were different, that is, the signal light of a plurality of modulation formats in which the occupied bandwidth and the robustness to the SNR degradation were different were able to be dynamically switched and generated with the same modulator.

Example 2

Format Variable Modulator 2

Figure 35:
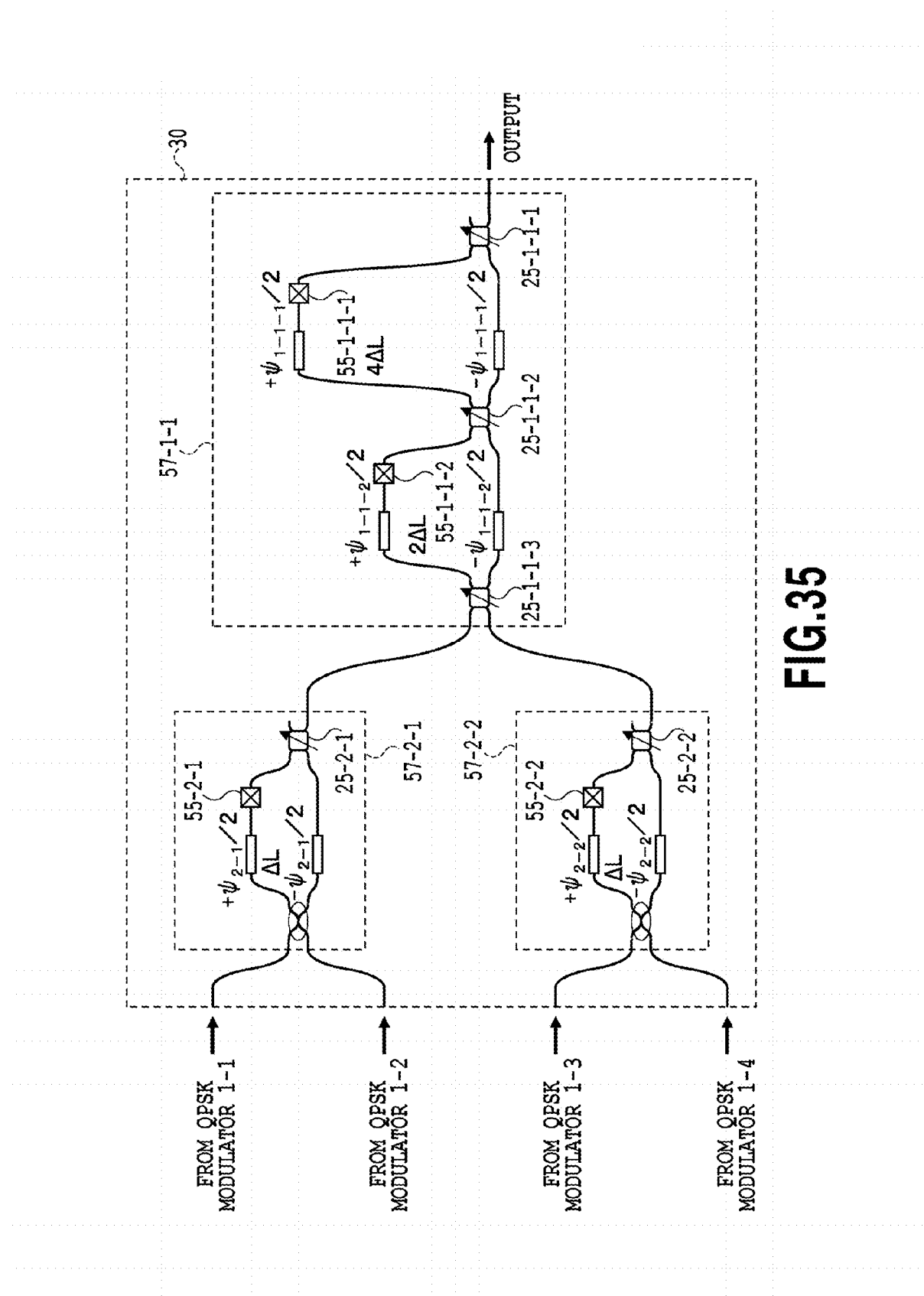
FIG. 35 is a configuration diagram of an aggregation part of a format variable modulator according to a second example of the present invention.

Example 2 is a variation of Example 1 in which the configuration of the aggregation part is the configuration of the aggregation part embodiment 6. The configuration of the aggregation part is shown in FIG. 35. The configuration and the operation of the distribution part and the optical modulator array part are the same as those in Example 1. The input and output of the configuration obtained by combining the distribution part aspect 6 and the distribution part aspect 7 are interchanged, and it is used as the present aggregation part.

As the TILFs 57-2-1 and 57-2-2 in the first stage, the variable coupler incorporated simple MZI type TILF shown in the distribution part aspect 6 is used; as the TILF 57-1-1 in the final stage, the variable coupler incorporated lattice type TILF shown in the distribution part aspect 7 is used. The concept of the basic operation of these TILFs is the same as described in the distribution part aspect 6 and the distribution part aspect 7; the branching/demultiplexing are preferably replaced with the combination/multiplexing, respectively.

At the time of four carriers, the TILF 57-2-1 is made to operate as a multiplexer that multiplexes the signal light of the carrier frequency f1 from the QPSK modulator 1-1 and the signal light of the carrier frequency f3 from the QPSK modulator 1-2, the TILF 57-2-2 is made to operate as a multiplexer that multiplexes the signal light of the carrier frequency f2 from the QPSK modulator 1-3 and the signal light of the carrier frequency f4 from the QPSK modulator 1-4 and the TILF 57-1-1 is made to operate as a multiplexer that multiplexes the signal light of the carrier frequencies f1 and f3 from the TILF 57-2-1 and the signal light of the carrier frequencies f2 and f4 from the TILF 57-2-2. At the time of two carriers, the TILF 57-2-1 is made to operate as a combiner that combines, at a ratio of 2:1, the signal light of the carrier frequency f1 from the QPSK modulator 1-1 and the signal light of the carrier frequency f1 from the QPSK modulator 1-2 so as to synthesize the 16QAM signal, the TILF 57-2-2 is made to operate as a combiner that combines, at a ratio of 2:1, the signal light of the carrier frequency f2 from the QPSK modulator 1-3 and the signal light of the carrier frequency f2 from the QPSK modulator 1-4 so as to synthesize the 16QAM signal and the TILF 57-1-1 is made to operate as a multiplexer that multiplexes the signal light of the carrier frequency f1 from the TILF 57-2-1 and the signal light of the carrier frequency f2 from the TILF 57-2-2. At the time of one carrier, the TILF 57-2-1 is made to operate as a combiner that combines, at a ratio of 2:1, the signal light of the carrier frequency f1 from the QPSK modulator 1-1 and the signal light of the carrier frequency f1 from the QPSK modulator 1-2 so as to synthesize the 16QAM signal, the TILF 57-2-2 is made to operate as a combiner that combines, at a ratio of 2:1, the signal light of the carrier frequency f1 from the QPSK modulator 1-3 and the signal light of the carrier frequency f1 from the QPSK modulator 1-4 so as to synthesize the 16QAM signal and the TILF 57-1-1 is made to operate as a combiner that combines the signal light of the carrier frequency f1 from the TILF 57-2-1 and the signal light of the carrier frequency f1 from the TILF 57-2-2 at the ratio of 4:1 so as to synthesize the 256QAM signal.

In any of these cases, when the operation is performed as the combiner, it is possible to aggregate the signals at the carrier frequency without any principle loss. In the multiplexing, it is possible to obtain the effect of cutting the harmonics of the signal light.

In the configuration of the present aggregation part, as the TILFs 57-2-1 and 57-2-2, the variable coupler incorporated simple MZI type is used, and, as the TILF 57-1-1, the variable coupler incorporated lattice type TILF is used; this is because the circuit size and the transmission characteristic at the time of the multiplexing operation are balanced. Since, for the TILF 57-1-1, in order to alternately interleave and multiplex even channels and odd channels, it is preferable to obtain a sharp filter characteristic, the variable coupler incorporated lattice type TILF excellent in the rectangle degree of the transmission frequency characteristic is used. On the other hand, in the TILFs 57-2-1 and 57-2-2, since the adjacent channels are not multiplexed, and channels with one channel skipped are multiplexed, the sharpness of the filter characteristic is not significantly required; hence, the variable coupler incorporated simple MZI type TILF in which even a small circuit size is satisfactory is used.

As described above, in the present embodiment, as compared with the first embodiment, the circuit configuration of the aggregation part is slightly complicated but, at the time of the multicarrier, it is possible to obtain a merit in which the loss is low and little crosstalk caused by the signal harmonics between the individual carrier signals occur.

In terms of reduction in crosstalk, the TILF 57-1-1 in the final stage plays a major role. This is because, as described in the aggregation part aspect 5, the effect of crosstalk from the signals from the adjacent channels is the largest. Hence, if it is not necessary to give special consideration to the loss, as the TILFs other than those in the final stage, the TILFs 57-2-1 and 57-2-2 in the present example, the variable optical coupler described in the aggregation part aspect 1 may be used. In this case, although loss is generated at the time of part of the multiplexing operation, it is possible to reduce the circuit size according to the replacement of the TILF with the variable optical coupler. As described above, the configuration in which the respective aggregation part aspects are used according to required specifications may be naturally used.

Example 3

Polarization Multiplexing Function-Equipped Format Variable Modulator

Figure 36:
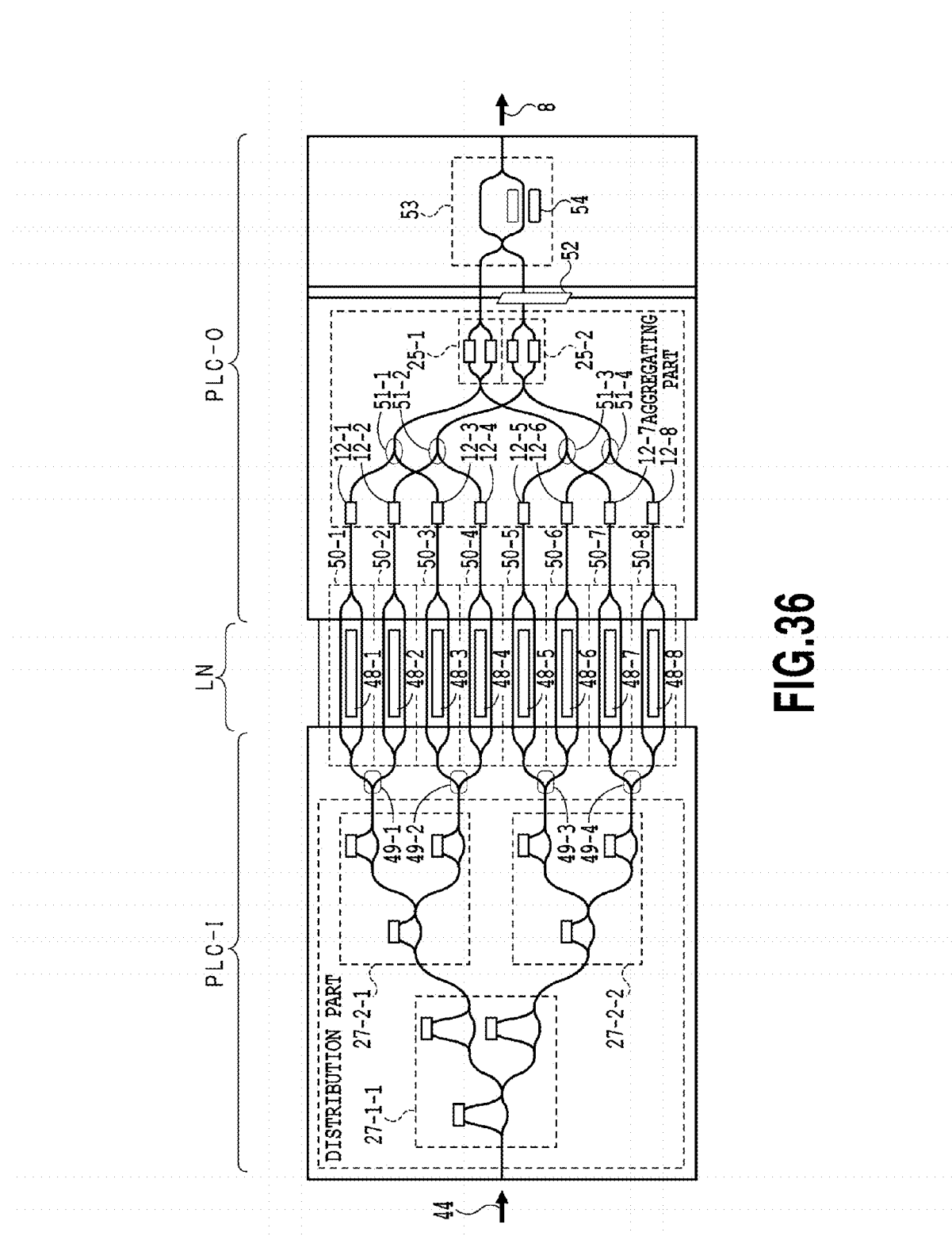
FIG. 36 is a configuration diagram of a format variable modulator with a polarization multiplexing function according to a third example of the present invention.

The configuration of a polarization multiplexing function-equipped format variable modulator produced in Example 3 is shown in FIG. 36. In the present example, among the embodiments described above, M=4, the configuration of the distribution part is the simple MZI of the aspect 1, the configuration of the aggregation part is the variable coupler type of the aggregation part aspect 1, the optical modulator array part has the basic configuration of the BPSK modulator and polarization multiplexing is performed by integrating these two series. Hence, the present modulator can be used as three modulators of polarization multiplexing 4-carrier BPSK modulation, polarization multiplexing 2-carrier QPSK modulation and polarization multiplexing 1-carrier 16QAM modulation. The present modulator is also realized by applying the complex integration technology where the silica-based planar light wave circuit (PLC) and the LN modulation array are combined. As the LN chip substrate, the X-cut substrate is used as in Example 1.

Also in the present configuration, as in Example 1, each TILF of the distribution part is configured in two stages to obtain low crosstalk. In the figure, the two-stage configuration is collectively symbolized as the TILFs.

When the polarization multiplexed signal is generated, normally, two sets of modulators are laid out, and the output light of these two modulators is polarization multiplexed in an orthogonal polarization relationship. Hence, basically, for two modulators in single polarization, an optical coupler for distributing CW input light to these two modulators, a polarized wave rotator and a polarization combination coupler are required. Therefore, although two sets of format variable modulators are likewise required for the format variable modulator this time, in the present example, an idea for the connection between the individual elements is provided, and thus the TILFs of the distribution part are reduced to only one set corresponding to single polarization. Specifically, the optical coupler that distributes the CW launched light to the two series is arranged not before the distribution part but after the distribution part, that is, before the optical modulator array. As is understood from FIG. 36, the launched light is immediately launched to the distribution part including the TILFs, is demultiplexed or branched in the distribution part, is thereafter distributed by four distribution couplers and is input to the BPSK modulator. As the eight BPSK modulators, BPSK modulators 50-1, 50-3, 50-5 and 50-7 for X polarized signals and BPSK modulators 50-2, 50-4, 50-6 and 50-8 for Y polarized signals are alternately aligned from above. Here, note that, since the modulators for X polarized signals and Y polarized signals use the X-cut substrate, the signal light when passing through these modulators is propagated in a polarization direction (TE polarization) horizontal to the substrate. These signals are multiplexed or combined by a 3 dB coupler or a VC for combination, and, in the signal light for Y polarization, a polarization direction is converted by the polarized wave rotator into a direction (TM polarization) perpendicular to the substrate, is multiplexed by a polarization combination coupler with the other signal light for X polarization and is output.

As described above, although the number of distribution optical couplers described above is increased, the optical coupler (each 3 dB coupler for polarized signal distribution) that distributes the input CW light to the two systems for X polarized signals and Y polarized signals is arranged between the distribution part and the optical modulator array part, and thus the distribution part is shared for X polarized signals and Y polarized signals, with the result that it is possible to reduce the number of distribution parts to only one set. Since, as compared with the area of the distribution optical coupler, the area of the distribution part including the TILFs and the like is extremely large, it is possible to significantly reduce the lay out area. Although, when various types of modulation formats are interchanged, the TIFLs and the like of the distribution part operate the variable phase shifter in a plurality of places as described above, that the use of only one set of distribution parts is required means that the number of operation places is not increased, it is advantageously possible to simplify the operation control and reduce the power consumption.

In the aggregation part, the circuits for the two systems for X polarized signals and Y polarized signals are laid out so as to be woven. The modulation signal light for X polarization is output from the variable optical coupler VC 25-1 and the modulation signal light for Y polarization is output from the variable optical coupler VC 25-2, and they pass through the polarized wave rotator and the polarization combination coupler, and are polarization multiplexed and output.

Figure 37:
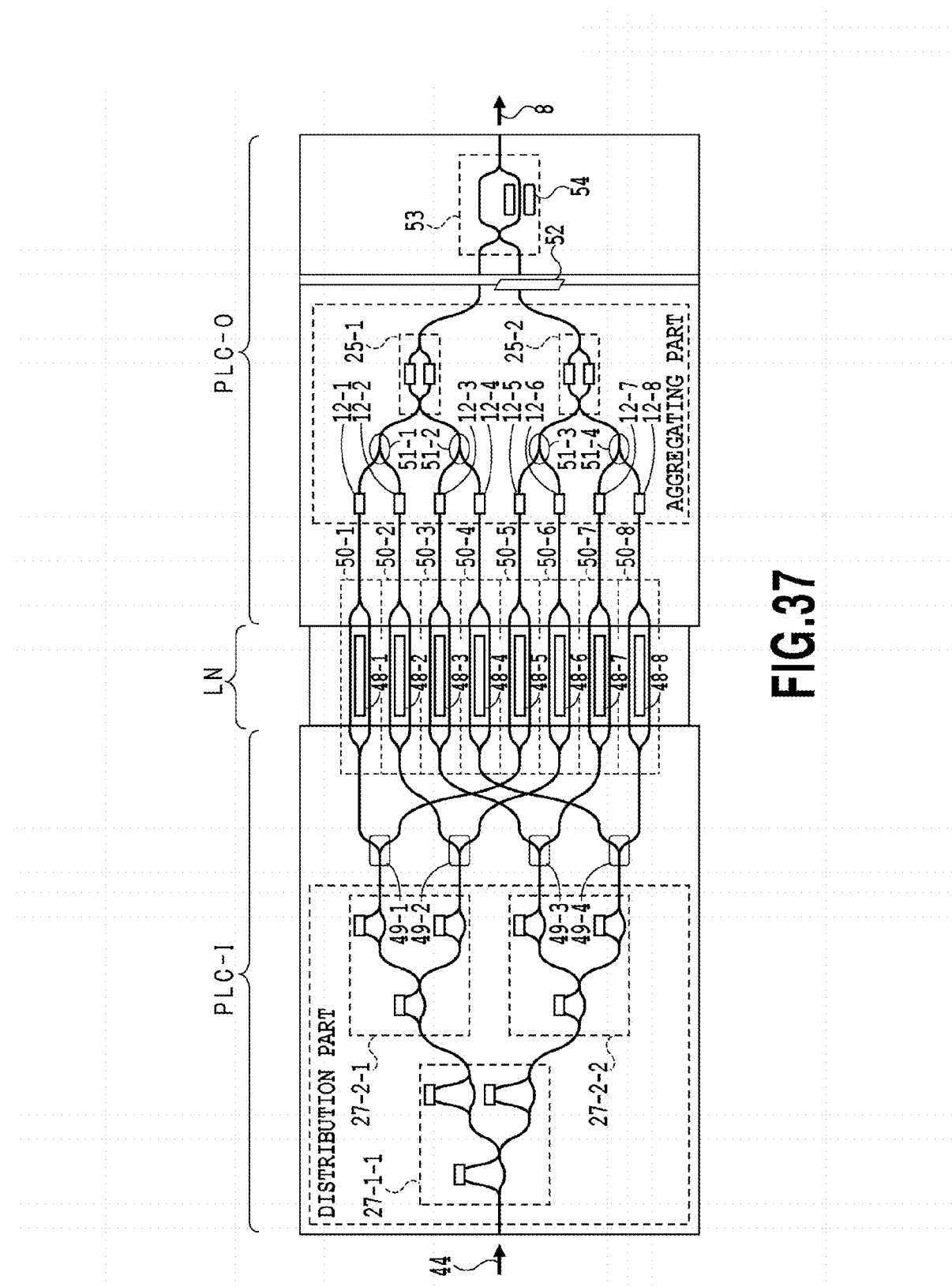
FIG. 37 is a configuration diagram of a variation of the format variable modulator with a polarization multiplexing function according to the third example of the present invention.
Figure 38:
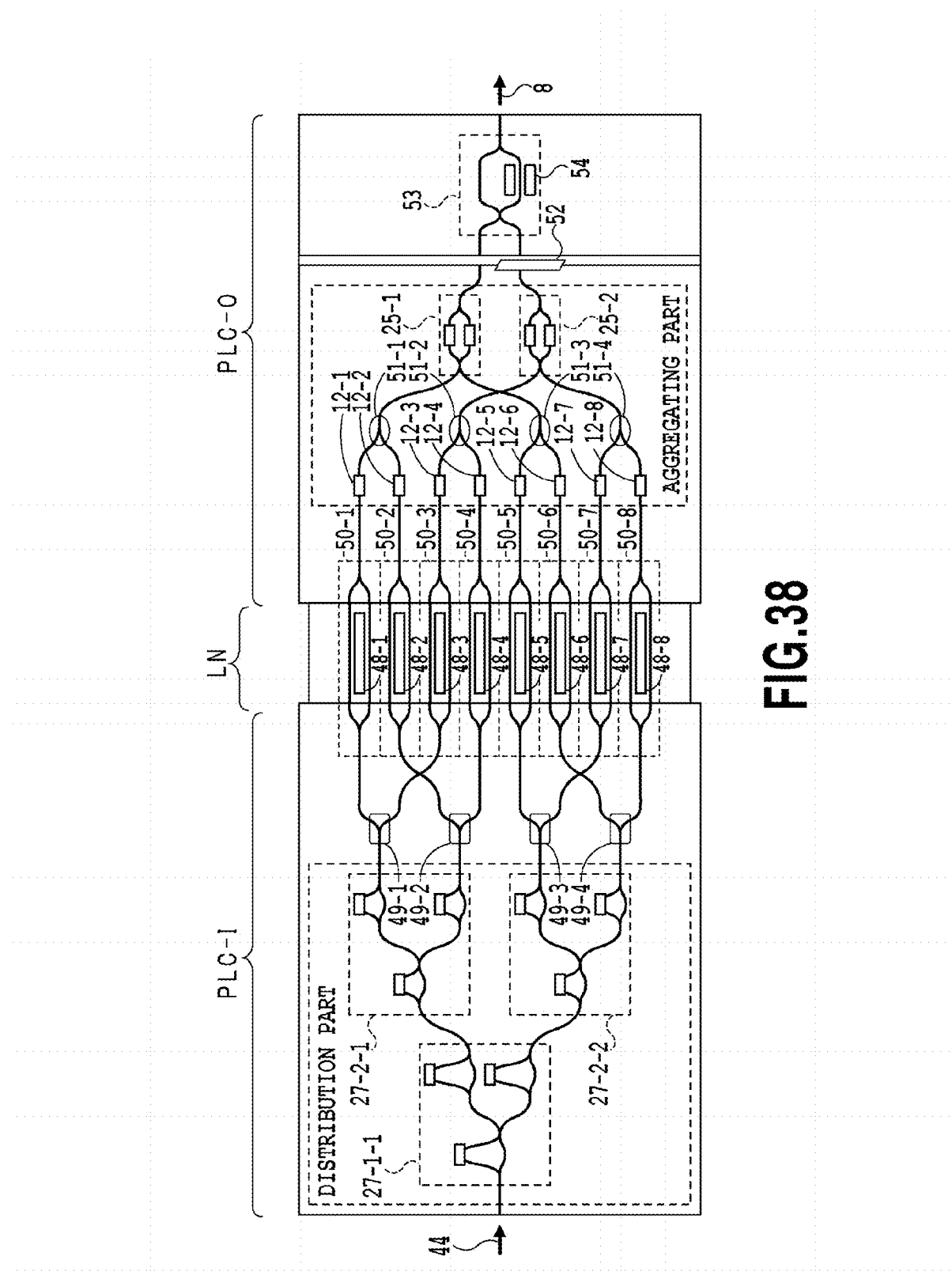
FIG. 38 is a configuration diagram of another variation of the format variable modulator with a polarization multiplexing function according to the third example of the present invention.

As a method of laying out the optical circuits for the two systems for X polarized signals and Y polarized signals, a method other than that in FIG. 31A is also possible. For example, as shown in FIG. 37, there is a layout in which the BPSK modulators 50-1 to 50-4 are used for X polarized signals, the BPSK modulators 50-5 to 50-8 are used for Y polarized signals, the outputs of the four distribution optical couplers described above are mutually woven and are connected to these BPSK modulators and the aggregation part for X polarized signals and the aggregation part for Y polarized signals are simply aligned vertically. As shown in FIG. 38, as another layout method, there is another layout in which the BPSK modulators 50-1, 50-2, 50-5 and 50-6 are used for X polarized signals, the BPSK modulators 50-3, 50-4, 50-7 and 50-8 are used for Y polarized signals, the outputs of the distribution optical couplers 49-1 and 49-2 are woven, the outputs of the distribution optical couplers 49-3 and 49-4 are woven and the aggregation part for X polarized signals and the aggregation part for Y polarized signals are woven only between the 3 dB optical coupler for combining and the VC. Any of those methods has the same configuration in terms of function because the connection relationship remains the same as the optical circuit though the order in which the BPSK modulator for X polarized signals and the BPSK modulator for Y polarization are aligned is only changed.

Although, in FIGS. 37 and 38, for ease of the drawing, the waveguide length between the 3 dB optical coupler for polarized signals and the BPSK modulator in each path appears to be different, they are designed to be equal in the actual layout. Strictly speaking, the path length of the TILF is calculated on the short arm side, and the distance from the input port to the output port of the present modulator is designed to be equal to each other in each path per BPSK modulation. In the configurations of Examples 1 and 2 and the Example 3 shown in FIG. 36, the design is naturally performed to achieve the equal length.

As the polarized wave rotator that converts the TE polarization light into the TM polarization light, a half-wave plate of a thin film with its main axis inclined at 45° is used. The light of polarization transmitting the half-wave plate of 45° is, when is seen on a Poincare sphere, polarization-converted into a position half-turned on a PQ axis that is a 45° linear polarization axis. Hence, since TE polarization is converted into TM polarization, and TM polarization is converted into TE polarization, it is operated as a TE/TM converter. The half-wave plate is inserted into a trench crossing the waveguide, and is fixed with an adhesive subjected to refractive index matching. The trench crossing the waveguide is produced to be inclined at eight degrees such that light reflected off the half-wave plate is prevented from being propagated as return light. The angle of a polarization retaining input fiver is adjusted such that the signal light input to the PLC-I is converted into TE polarization.

As the polarization combination coupler, an interferometer is used in which a stress relief trench is formed in one of two arm waveguides sandwiched between two optical couplers. In a quartz waveguide subjected to a glass high-temperature transparency-achieving step, in general, a high compression stress is generated due to a difference in coefficient of thermal expansion between a silicon substrate and quart glass, and thus birefringence B is generated. Since, in the stress relief trench part, the birefringence B is significantly low due to stress relief, the length of the stress relief trench and the waveguide length difference of the interferometer are adjusted, and thus it is possible to make a design such that the optical path length difference of equal length is achieved for TE polarization and that the optical path length difference of half wavelength is achieved for TM polarization. In the interferometer designed as described above, since TE polarization and TM polarization are propagated to different ports, it is possible to output, to the output port, both the signal light of TE polarization input to the upper input port and TM polarization input to the lower input port. Hence, the interferometer described above is operated as the polarization combination coupler.

In the clads on both sides of the thin film heater of the thermo-optic phase shifter used as the variable optical phase shifter, a heat insulation trench for reducing the power consumption of the thermo-optic phase shifter is provided (the illustration of which is omitted in FIGS. 36 to 38). Although not shown in the figure, an electrical wiring pattern for feeding a drive current to each thin film heater is formed on the chip.

Fabrication methods such as a method of fabricating each chip and a chip connection mounting method are the same as in Example 1.

In the present example, the multicarrier light source shown in FIG. 9B was also used to check the modulation operation. The light emission frequency spacing of each wavelength variable light source, that is, a carrier spacing, was set at 50 GHz. To the center electrodes of eight optical phase shifters for modulation that performs data modulation, the pseudo-random (PRBS) NRZ electrical signals of PN=11 stages which were delayed differently for each of the eight optical phase shifters were launched. The modulation symbol rate is 25 Gbaud. Hence, since the carrier spacing is twice the symbol rate, the light signal whose operation is checked in the present example is a normal FDM signal. Although the modulation symbol this time is set at 25 Gbaud for the convenience of an evaluation device, when at the carrier spacing of 50 GHz this time, the independency of each carrier signal can be maintained even if as described above, the modulation symbol rate is speeded up to 50 Gbaud which is the OFDM signal, for example, it is naturally possible to modulate at a symbol rate of 32 Gbaud which is used for 100 G transmission system.

When a 4-carrier BPSK modulation signal is generated, four carrier lights f1, f2, f3 and f4 are input from the multicarrier light source described above to the present modulator. By the same operation as in Example 1 at the time of four carriers, the TILF 27-1-1 is made to operate as a demultiplexer that divides the carrier light into two groups, that is, f1 and f3 to the side of the TILF 27-2-1 and f2 and f4 to the side of the TILF 27-2-2. The TILF 27-2-1 is made to operate as a demultiplexer that divides f1 and f3, that is, f1 to the side of the 3 dB coupler for distribution 49-1 and f3 to the side of the 3 dB coupler for distribution 49-2. The TILF 27-1-2 is made to operate as a demultiplexer that divides f2 and f4, that is, f2 to the side of the 3 dB coupler for distribution 49-3 and f4 to the side of the 3 dB coupler for distribution 49-4. Eight BPSK modulators are individually made to operate as a BPSK modulator. Each of the VCs 25-1 and 25-2 is adjusted so as to achieve 50% coupling.

Figure 39A:
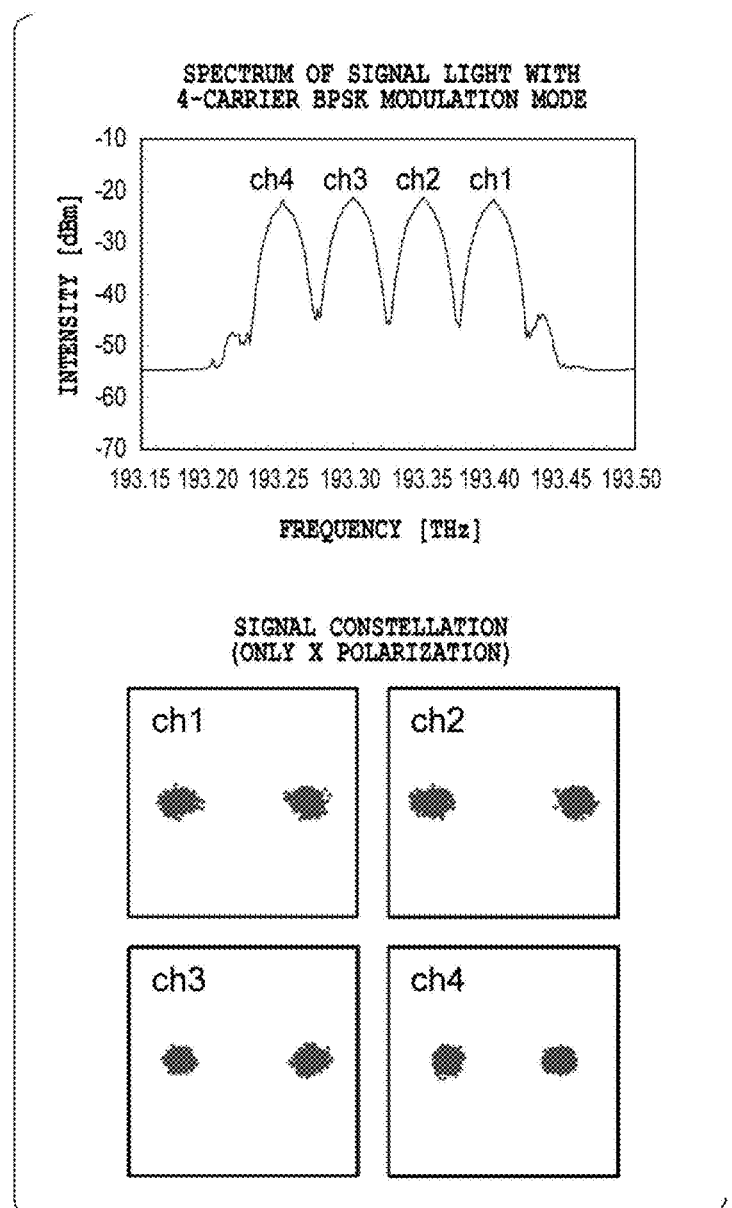
FIG. 39A is a diagram showing the light spectrum and the signal constellation of signal light output in the third example of the present invention when the 4-subcarrier BPSK modulation signal is generated.
Figure 39B:
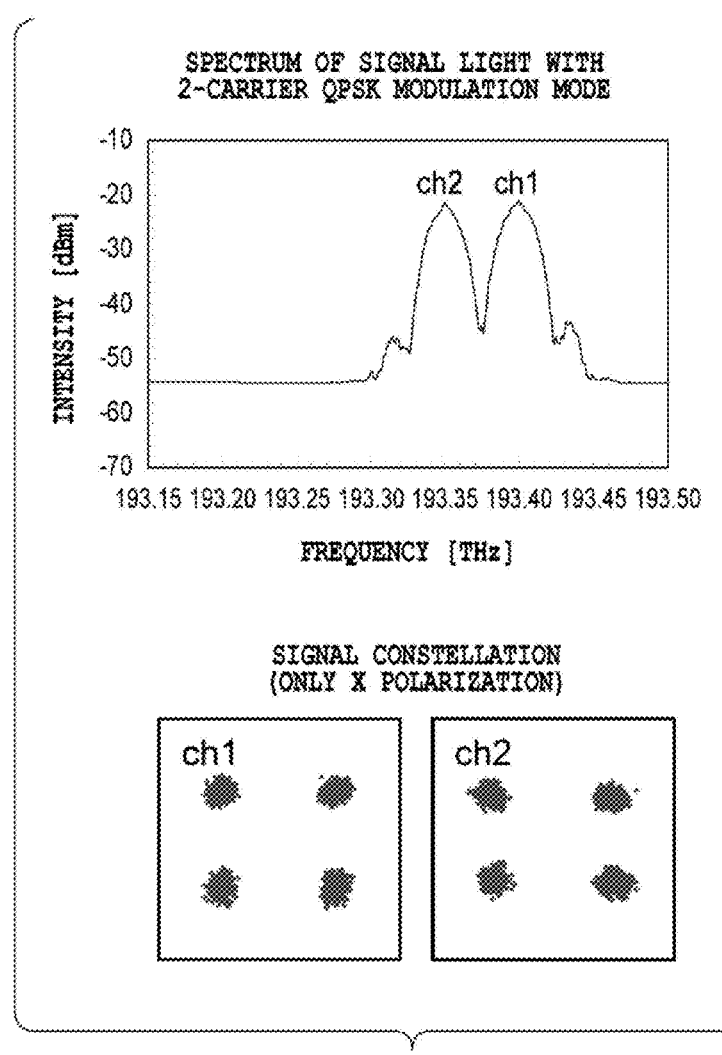
FIG. 39B is a diagram showing the light spectrum and the signal constellation of the signal light output in the third example of the present invention when the 2-carrier QPSK modulation signal is generated.

A light spectrum that is obtained by cutting out only X polarized signals at bulk PBS from the signal light output from the present modulator and by observing it is shown in the upper diagram of FIG. 39A; the signal constellation of each carrier is shown in the lower diagram of FIG. 39A. The same measurement result was obtained when only Y polarization was cut out and observed. As described above, it is found that it has been possible to generate the satisfactory polarization multiplexed 4-carrier BPSK modulation signal.

When a 2-carrier BPSK modulation signal is generated, two carrier lights f1 and f2 are input from the multicarrier light source described above to the present modulator. By the same operation as in Example 1 at the time of two carriers, the TILF 27-1-1 is made to operate as a demultiplexer that divides the carrier light, that is, f1 to the side of the TILF 27-2-1 and f2 to the side of the TILF 27-2-2. The TILF 27-2-1 is made to operate as the 3 dB coupler on f1, and the TILF 27-1-2 is made to operate as the 3 dB coupler on f2. With respect to the BPSK modulators, the BPSK modulators 50-1 and 50-3 are paired, the BPSK modulators 50-2 and 50-4 are paired, the BPSK modulators 50-5 and 50-7 are paired and the BPSK modulators 50-6 and 50-8 are paired, and they are made to operate as the QPSK modulator. Each of the VCs 25-1 and 25-2 is adjusted so as to achieve 50% coupling.

A light spectrum of X polarized signals of the output signal light and the signal constellation of each subcarrier are shown in FIG. 32B. The same measurement result was obtained at the time of Y polarization. As described above, it is found that it has been possible to generate the satisfactory polarization multiplexed 2-carrier QPSK modulation signal.

When 1-carrier 16QAM modulation signal is generated, only the carrier light f1 is input from the multicarrier light source described above to the present modulator. The TILF 27-1-1 is made to operate as the 2:1 coupler at f1, and the TILFs 27-2-1 and 27-1-2 are made to operate as the 3 dB coupler at f1. With respect to the BPSK modulators, four BPSK modulators 50-1, 50-3, 50-5 and 50-7 are grouped, and four BPSK modulators 50-2, 50-4, 50-6 and 50-8 are grouped, and they are made to operate as two groups of 16QAM modulators. The VCs 25-1 and 25-2 are adjusted to operate as the 2:1 coupler.

A relative phase relationship between a QPSK signal (large QPSK signal) where an electric field strength generated in the QPSK modulator including the BPSK modulators 50-1 and 50-3 is two and a QPSK signal (small QPSK signal) where an electric field strength generated in the QPSK modulator including the BPSK modulators 50-5 and 50-7 is one is adjusted by simultaneously changing the variable optical phase shifters 12-1 and 12-3 or the variable optical phase shifters 12-5 and 12-7. Likewise, a relative phase relationship between a large QPSK signal generated in the QPSK modulator including the BPSK modulators 50-2 and 50-4 and a small QPSK signal generated in the QPSK modulator including the BPSK modulators 50-6 and 50-8 is adjusted by simultaneously changing the variable optical phase shifters 12-2 and 12-4 or the variable optical phase shifters 12-6 and 12-8.

Figure 39C:
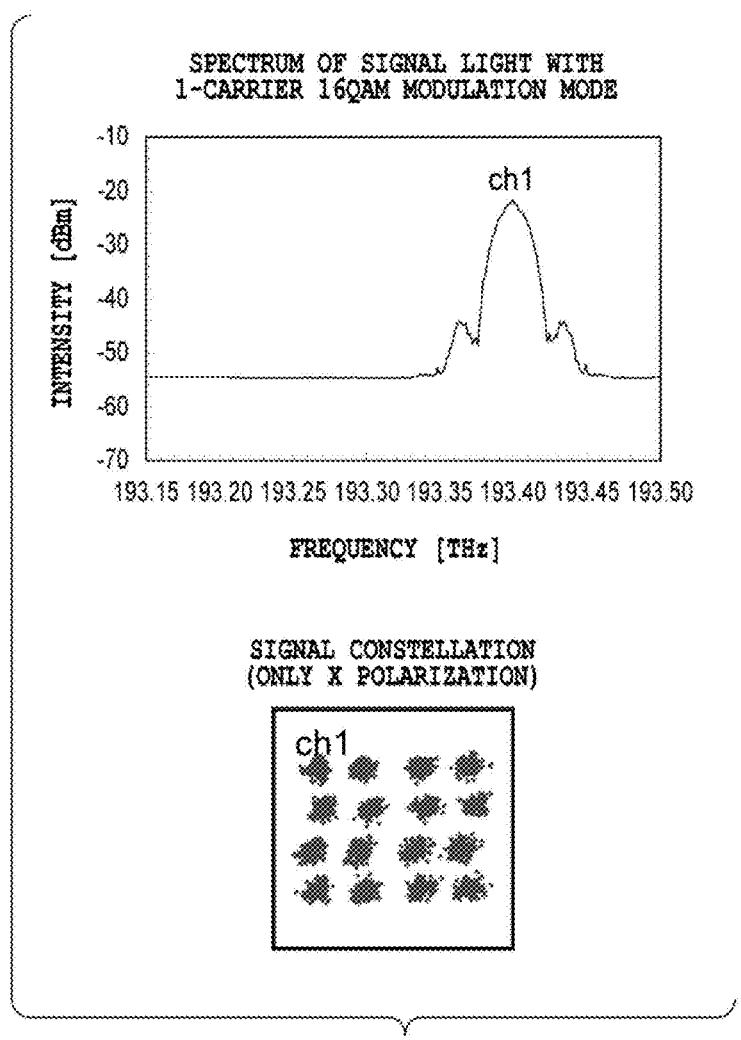
FIG. 39C is a diagram showing the light spectrum and the signal constellation of the signal light output in the third example of the present invention when the 1-carrier 16QAM modulation signal is generated.

A light spectrum of X polarized signals of the output signal light and the signal constellation of each subcarrier are shown in FIG. 39C. The same measurement result was obtained at the time of Y polarization. As described above, it is found that it has been possible to generate satisfactory polarization multiplexed 1-carrier 16QAM modulation signal.

As described above, also in the present example, the signal light in which the number of carriers and the multilevel number were different, that is, the signal light of a plurality of modulation formats in which the occupied bandwidth and the robustness to the SNR degradation were different were able to be dynamically switched and generated with the same modulator.

Although in the present example, in order to realize the polarization combiner, the adjustment of birefringence with the stress relief trench is utilized, as examples other than those, a method of utilizing a structural birefringence occurring when the waveguide width is increased in the horizontal direction to form a flat waveguide structure or a method of utilizing birefringence of the half-wave plate itself by inserting the half-wave plate into the waveguide at an angle of 0° or 90° with respect to the main axis may be used. If 3 dB principle loss is permitted, a normal 3 dB coupler may be used instead. However, since, with the polarization combiner, it is possible not only to avoid this principle loss but also to remove, with the polarization combiner, the polarization component which cannot be completely rotated by the polarized wave rotator described above and reduce polarization crosstalk, a normal polarization combiner may be preferably used.

Although in the examples described above, as the LN chip, the X-cut substrate is used, the Z-cut substrate may be used. In this case, the number of signal electrodes is twice that in the case of using the X-cut substrate. The Z-cut substrate which has a polarization inversion structure may be used. In this case, the number of signal electrodes is the same as that in the case of using the X-cut substrate.

In the examples discussed above, as the complex integration combination, the description has been given using the combination of the LN waveguide and the quartz PLC waveguide; this is because the LN waveguide has a high EO effect and a mainstream waveguide technology for a high-speed modulator, and the quartz waveguide is, as a passive waveguide, a waveguide that has the lowest loss, and this combination is excellent in realizing a complicated modulator with low loss. However, even if another material waveguide, for example, a combination between a waveguide using a multi-component oxide material, a semiconductor material or the like as a waveguide having an EO effect and a waveguide using, as a passive waveguide, silicon or a high molecular material or a waveguide itself having an EO effect is used to provide a monolithic configuration, it is naturally possible to obtain the same effects as indicated in the present example and the like.

Furthermore, since the constituent elements of the modulator can be realized with space-based devices, the modulator may be naturally formed with space-based device elements.

REFERENCE SIGNS LIST 1, 1a, 1b, 1-1 to 1-4 QPSK modulator (nest MZI modulator)
2, 2a to 2d, 2-1 to 2-N, 2(I), 2(Q) drive data electrical signal
3 differential output drive circuit
4 upper optical phase shifter for modulation
5 lower optical phase shifter for modulation
6 input CW light
7, 7a to 7j 3 dB optical coupler
8, 8-1, 8-2 output light signal
9 MZI modulator for Ich
10 MZI modulator for Qch
11, 11a, 11b π/2 optical phase shifter
12, 12a to 12l, 12-1 to 12-8, 12-1-1 to 4-16 optical phase adjuster (variable optical phase shifter)
13, 13-1 to 13-4 single MZI modulator (phase modulator, PSK modulator)
14 Z-cut LN substrate
15 waveguide
16 high-frequency center electrode
17 GND electrode
18 waveguide core
19 polarization direction
20 X-cut LN substrate
21 terminal resistor
22, 22a, 22b 2:1 optical coupler
23, 23-1-1 to 23-2-2 interleaving optical filter (ILF)
24 variable 1×M demultiplexing filter
25, 25-1 to 25-3, 25-1-1 to 25-4-2, 25-1-1-1 to 25-1-1-3 variable optical coupler
26 2-carrier CW light
27, 27-1-1 to 27-2-2, 27-1-1-1 to 27-2-2-3 tunable interleaving optical filter (TILF)
28 distribution part
29 optical modulator array 30 aggregation part
31 optical demultiplexing/branching switchable circuit
32 variable combination circuit or optical multiplexing/combining switchable circuit
33-1 to 33-N optical modulation means
34 tunable seed light source
35 sine wave signal
36 carrier light output
37a to 37d tunable light source
38 optical coupler
39 1×M coupler
40 M array delay line
41 multi-stage variable M×M coupler
42, 42-1-1 to 42-2-2 1×2 optical switch
43, 43-1-1 to 43-2-2 2×1 optical switch
44 input optical signal
45, 45-1-1 to 45-3-4 variable attenuator
46, 46-1 to 46-4 optical monitor
47 M×1 coupler
48, 48-1 to 48-8 electrode for data modulation
49, 49-1 to 49-4 3 dB optical coupler for each polarized signal distribution
50, 50-1 to 50-8 BPSK modulator
51, 51-1 to 51-4 3 dB optical coupler for combining
52 polarized wave rotator (half-wave plate)
53 polarization combining coupler
54 stress relief trench
55, 55-1 to 55-4 on/off optical switch
56, 56-1 to 56-2 high-frequency removal filter
57, 57-1-1 to 57-2-2 variable coupler incorporated TILF

The invention claimed is:

1. An optical modulator comprising:
a distribution part including an optical demultiplexing/branching switchable circuit that can switch between an optical demultiplexing function and an optical branching function;
an optical modulator array connected to the distribution part; and
an aggregation part connected to the optical modulator array, the aggregation part including a combining ratio variable combining circuit that can change a combining ratio and/or an optical multiplexing/combining switchable circuit that can switch between an optical multiplexing function and an optical combining function.

2. The optical modulator according to claim 1, wherein at least one of the optical demultiplexing/branching switchable circuit and the optical multiplexing/combining switchable circuit has a variable filter that can change multiplexing/demultiplexing characteristics.

3. The optical modulator according to claim 2, wherein the variable filter comprises a tunable interleaving filter or a plurality of tunable interleaving filters interconnected in a tree structure or in an inverted tree structure.

4. The optical modulator according to claim 3, wherein the tunable interleaving filter comprises a one-input one-output interleaving filter connected to each of two outputs of a one-input two-output interleaving filter or is configured such that the input and the output of the configuration are interchanged.

5. The optical modulator according to claim 2, wherein the variable filter includes, when $M=2^n$ (n is a natural number):
a one-input M-output optical coupler;
an M path delay circuit; and
an M-input M-output optical coupler in which $2^{n-1}$ two-input two-output optical couplers are prepared in n stages for paths from the delay circuit, in which a jth optical coupler in a kth stage (k is an integer of 1 to n, j is a natural number of 1 to $2^{n-1}$) couples an Xth path and a Yth path and which has, between the individual stages, an optical phase adjuster that adjusts a relative phase of each path, or is configured such that the input and the output of the configuration are interchanged,
wherein:

$$X=2^{n-k+1} \cdot \{(j-1)\mathrm{div}\ 2^{n-k}\}+\{(j-1)\mathrm{mod}\ 2^{n-k}\}+1$$

$$Y=2^{n-k+1} \cdot \{(j-1)\mathrm{div}\ 2^{n-k}\}+\{(j-1)\mathrm{mod}\ 2^{n-k}\}+1+2^{n-k}$$

where $(j-1)\ \mathrm{div}\ 2^{n-k}$ and $(j-1)\ \mathrm{mod}\ 2^{n-k}$ are respectively a quotient and a remainder obtained by dividing $(j-1)$ by $2^{n-k}$.

6. The optical modulator according to claim 1, wherein at least one of the optical demultiplexing/branching switchable circuit and the optical multiplexing/combining switchable circuit includes an interferometer filter having an optical coupler and a delay line, at least a portion of the optical coupler being a coupling-ratio variable optical coupler and the coupling-ratio being adjustable so that light passing through a portion of the delay line can be made to become zero, thereby causing an interference function to disappear and switching from the demultiplexing function to the branching function or from the multiplexing function to the combining function.

7. The optical modulator according to claim 1, wherein at least one of the optical demultiplexing/branching switchable circuit and the optical multiplexing/combining switchable circuit includes:
an optical multiplexer/demultiplexer,
a fixed branching ratio/combining ratio or variable optical brancher/combiner, and
an optical switch that selects and switches between the optical multiplexer/demultiplexer and the optical brancher/combiner.

8. The optical modulator according to claim 1, wherein the optical demultiplexing/branching switchable circuit comprises:
one-input two-output variable optical couplers connected with each other in a tree structure,
a two-input one-output optical switch inserted into one output of one of the variable optical couplers and the other input of the optical switch being an input port of the distribution part.

9. The optical modulator according to claim 1, wherein the combining ratio variable combining circuit is a variable optical coupler.

10. The optical modulator according to claim 9, wherein the variable optical coupler comprises a plurality of two-input one-output variable couplers connected with each other in an inverted tree structure.

11. The optical modulator according to claim 10, wherein the variable optical coupler further comprises a one-input one-output tunable interleaving filter in an input of the two-input one-output variable coupler in a final stage.

12. The optical modulator according to claim 9, wherein the variable optical coupler is an M-input coupler where $M=2^n$ (n is a natural number), and includes:
an M-input M-output optical coupler in which $2^{n-1}$ two-input two-output optical couplers are prepared in n stages for the M-input path, in which a jth optical coupler in a kth stage (k is an integer of 1 to n, j is a natural number of 1 to $2^{n-1}$) couples an Xth path and a Yth path and which has, between the individual stages, an optical phase adjuster that adjusts a relative phase of each path, and
an M-input one-output optical coupler,
wherein:

$$X=2^k \cdot \{(j-1)\mathrm{div}\ 2^{k-1}\}+\{(j-1)\mathrm{mod}\ 2^{k-1}\}+1$$

$$Y=2^k \cdot \{(j-1)\mathrm{div}\ 2^{k-1}\}+\{(j-1)\mathrm{mod}\ 2^{k-1}\}+1+2^{k-1}$$

where (j−1) div $2^{k-1}$ and (j−1) mod $2^{k-1}$ are respectively a quotient and a remainder obtained by dividing (j−1) by $2^{k-1}$.

13. The optical modulator according to claim 1, wherein
an optical coupler that distributes output light to two systems is connected to the distribution part,
the optical modulator array is connected to each of the two distributed systems,
the aggregation part is connected to each of the optical modulator arrays of the two systems,
a polarized wave rotator that converts one output light into a polarized wave whose polarization direction is perpendicular to a polarization direction of the other output light is provided on one side of the aggregation part and
the optical modulator includes an optical coupler that multiplexes the output lights from the aggregation part.

14. An optical transmitter comprising:
a multicarrier light source capable of changing the number of carriers generated; and
the optical modulator recited in claim 1;
wherein the optical modulator inputs carrier optical outputs generated from the multicarrier light source to modulate.

15. An optical modulator comprising:
a distribution part comprising an optical demultiplexing/branching circuit switchable between an optical demultiplexing function and an optical branching function;
an optical modulator array that modulates output light from the distribution part; and
an aggregation part that combines output light from the optical modulator array, the aggregation part comprising an optical multiplexing/combining circuit switchable between an optical multiplexing function and an optical combining function.

16. The optical modulator according to claim 15, wherein at least one of the optical demultiplexing/branching circuit and the optical multiplexing/combining circuit comprises a variable filter operable to change the multiplexing or demultiplexing characteristics of the respective circuit.

17. The optical modulator according to claim 16, wherein the variable filter comprises a tunable interleaving filter or a plurality of tunable interleaving filters interconnected in a tree structure or in an inverted tree structure.

18. The optical modulator according to claim 16, wherein the variable filter comprises:
a one-input M-output optical coupler, where M=$2^n$ and n is a natural number;
an M path delay circuit; and
an M-input M-output optical coupler comprising $2^{n-1}$ two-input two-output optical couplers prepared in n stages for paths from the delay circuit, in which a jth optical coupler in a kth stage (k is an integer of 1 to n, j is a natural number of 1 to $2^{n-1}$) couples an Xth path and a Yth path and which has, between the individual stages, an optical phase adjuster that adjusts a relative phase of each path, or is configured such that the input and the output of the configuration are interchanged, wherein:

$$X=2^{n-k+1}\cdot\{(j-1)\text{div }2^{n-k}\}+\{(j-1)\text{mod }2^{n-k}\}+1$$

$$Y=2^{n-k+1}\cdot\{(j-1)\text{div }2^{n-k}\}+\{(j-1)\text{mod }2^{n-k}\}+1+2^{n-k}$$

where (j−1) div $2^{n-k}$ and (j−1) mod $2^{n-k}$ are respectively a quotient and a remainder obtained by dividing (j−1) by $2^{n-k}$.

19. The optical modulator according to claim 15, wherein at least one of the optical demultiplexing/branching circuit and the optical multiplexing/combining circuit comprises an interferometer filter having an optical coupler and a delay line, at least a portion of the optical coupler being a coupling-ratio variable optical coupler having a coupling-ratio that is adjustable such that light passing through a portion of the delay line can be filtered out to cause an interference function to disappear so that the respective circuit switches from the optical demultiplexing function to the optical branching function or from the optical multiplexing function to the optical combining function.

20. An optical transmitter comprising:
a multicarrier light source that generates and outputs a plurality of optical carriers, the multicarrier light source operable to change the number of optical carriers generated and output; and
the optical modulator recited in claim 15, wherein the optical modulator receives and modulates the optical carrier outputs generated by the multicarrier light source.

* * * * *